(12) United States Patent
Brant

(10) Patent No.: US 7,662,895 B2
(45) Date of Patent: Feb. 16, 2010

(54) SYNDIOTACTIC PROPYLENE ELASTOMERS

(75) Inventor: Patrick Brant, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 804 days.

(21) Appl. No.: 11/285,135

(22) Filed: Nov. 22, 2005

(65) Prior Publication Data

US 2007/0117941 A1 May 24, 2007

(51) Int. Cl.
*C08F 10/06* (2006.01)
*C08F 4/6592* (2006.01)

(52) U.S. Cl. .................. 526/129; 526/127; 526/134; 526/160; 526/351; 525/240

(58) Field of Classification Search ............. 526/127, 526/129, 134, 160, 351; 525/240
See application file for complete search history.

(56) References Cited

U.S. PATENT DOCUMENTS

| | | | |
|---|---|---|---|
| 3,175,999 A | | 3/1965 | Natta et al. |
| 3,329,741 A | | 7/1967 | Schrage et al. |
| 3,511,824 A | | 5/1970 | Listner |
| 3,784,502 A | | 1/1974 | Gobran et al. |
| 4,335,225 A | | 6/1982 | Collette et al. |
| 4,826,939 A | | 5/1989 | Stuart, Jr. |
| 5,270,276 A | * | 12/1993 | Job .................. 502/123 |
| 5,272,003 A | | 12/1993 | Peacock |
| 5,326,824 A | | 7/1994 | Asanuma et al. |
| 5,373,059 A | | 12/1994 | Asanuma et al. |
| 5,374,685 A | | 12/1994 | Asanuma et al. |
| 5,476,914 A | | 12/1995 | Ewen et al. |
| 6,084,047 A | | 7/2000 | Holliday et al. |
| 6,184,326 B1 | | 2/2001 | Razavi et al. |
| 6,245,870 B1 | | 6/2001 | Razavi |
| 6,265,512 B1 | * | 7/2001 | Siedle et al. .......... 526/351 |
| 2003/0083434 A1 | | 5/2003 | Ouhadi et al. |

FOREIGN PATENT DOCUMENTS

| | | |
|---|---|---|
| EP | 0 351 392 | 1/1990 |
| EP | 0 433 987 | 6/1991 |
| EP | 0 697 436 | 2/1996 |
| EP | 0 773 238 | 5/1997 |
| WO | WO 94/24195 | 10/1994 |

OTHER PUBLICATIONS

Japanese Abstract—JP01152448A (Jun. 14, 1989).
Japanese Abstract—JP03025553 (Feb. 4, 1991).
Japanese Abstract—JP2824082 (Apr. 9, 1998).
Japanese Abstract—JP2837246 (Nov. 11, 1998).
"Mechanisms of Stereocontrol for Doubly Silylene-Bridged Cs- and C1-Symmetric Zirconocene Catalysts for Propylene Polymerization. Synthesis and Molecular Structure of $Li_2[1,2-Me_2Si)_2\{C_5H_2-4-(1R,2S,5R-menthyl)\}$ $\{C_5H-3,5-(CHMe_2)2)\}]$ 3 THF and $[(1,2-Me_2Si)_2(\eta5-C^5H_2-4-(1R,2S,5R-menthyl)\}\{\eta^5-C_5H-3,5-(CHMe_2)_2 )\}]ZrCl_2$," Veghini et al., J. Am Chem. Soc. 1999, vol. 121, p. 564-573.
"Ultrahigh Molecular Weight Polypropene Elastomers by High Activity "Dual-Side" Hafnocene Catalysts," Rieger et al., Macromolecules 2002, vol. 35, p. 5742-5743.

* cited by examiner

*Primary Examiner*—Roberto Rábago
(74) *Attorney, Agent, or Firm*—Catherine L. Bell

(57) ABSTRACT

Disclosed herein is an elastomeric composition comprising propylene, the composition further comprising a peak melting point temperature below about 110° C., a tensile set of 40% or less, and greater than or equal to about 60% [r]dyads, based on the total number of dyads present in the composition. A process to produce an elastomeric composition is also disclosed.

41 Claims, 1 Drawing Sheet

SYNDIOTACTIC PROPYLENE ELASTOMERS

FIELD OF THE INVENTION

This invention relates to an elastic polyolefin, a process to produce such an elastic polyolefin, and articles produced therefrom.

BACKGROUND OF THE INVENTION

Both crystalline and amorphous polyolefins are known. In particular, both crystalline and amorphous polypropylenes have been disclosed. Typical amorphous polypropylenes may be gummy materials of little strength. Highly crystalline polypropylenes may provide strength, but are generally not elastic.

Rubbery polypropylenes are also known. Such products may be produced directly by conventional polymerization using particular catalysts, by repeated extractions of conventional polypropylene, by chemical treatment of crystalline polypropylene, and/or by sequential polymerization processes. Representative rubbery polypropylenes are described in U.S. Pat. No. 3,329,741 to Schrage et al., U.S. Pat. No. 3,175,999 to Natta et al., U.S. Pat. No. 3,511,824 to Listner and U.S. Pat. No. 3,784,502 to Gobran et al. Other references directed to polyolefins having elastic character include the following:

U.S. Pat. No. 4,826,939 to Stuart is directed to a highly amorphous propylene-based olefin terpolymer made by a process wherein ethylene is very randomly incorporated into a chain along with propylene and hexene. The amorphous terpolymer of Stuart is very tacky and pressure sensitive, having a ring and ball softening point of about 75 to 120° C. The process of making the disclosed amorphous terpolymer comprises polymerizing the monomers in the presence of a traditional anionic coordination catalyst within a temperature range typical of a solution polymerization processes, about 140 to 250° C. However, these materials lack elastic character.

U.S. Pat. No. 4,335,225 to Collette et al. is directed to a semicrystalline or crystalline block polypropylene having excellent elastomeric properties, which can be made with the use of particular titanium, zirconium, or hafnium-based catalyst systems. However, Collette discloses very low yields in a slurry process. Also, the use of these catalysts requires very mild processing conditions because the catalysts are particularly sensitive to air, heat, and light. Accordingly, the teachings of Collette are not suitable nor readily adaptable to a solution process.

U.S. Pat. No. 6,084,047 to Holliday et al. is directed to an elastomeric polyolefin terpolymer comprising about 5 to 25 weight percent ethylene units, from greater than about 5 to about 40 weight percent hexene units, and about 35 to less than about 90 weight percent propylene units, wherein the total weight percent of monomer units equals 100 percent. The polyolefin terpolymer has a melt flow rate of about 0.01 to 500 grams per 10 minutes and a tensile set of about 65 to 120 percent, according to ASTM D-412.

U.S. Patent Application Publication No. US2003/0083434 A1 to Ouhadi et al. is directed to adhesive compositions comprising a thermoplastic elastomer and a block copolymer with rigid vinyl aromatic blocks and non-rigid blocks of dienes and vinyl aromatic monomers. Ouhadi does not disclose polypropylene based resins, but instead is directed to a dispersed phase within an at least partially vulcanized (crosslinked) rubber component.

Veghini et al. (Veghini, D.; Henling, M.; Burkhardt, T; Bercaw, J. *J. Am. Chem. Soc.* 1999, 121, 564-573) which is incorporated by reference herein disclose various catalysts which may produce syndiotactic polypropylene, yet the reference does not disclose resultant polymers having both high impact strength and high elasticity.

Rieger et al., (Rieger, B.; Troll, C.; *Macromolecules* 2002, 35, 5742-5743) is directed to so called ultra high molecular weight polypropylene elastomers produced using dual side hafnocene catalysts. In Rieger, the molecular weights range between 700,000 and 5,000,000, resulting in semi-crystalline polymers having only slight elastomeric properties. In fact, Rieger notes that thermoplastic polyolefins of low crystallinity suffer from high set values in stress-strain hysteresis testing.

Numerous references are directed to compositions comprising syndiotactic polypropylene. Examples include Japanese Patent Application 01-152448, Japanese Patent no. JP2824082, U.S. Pat. Nos. 5,476,914, 6,184,326, and 6,245,870 which are directed to vanadium catalysts capable of producing compositions comprising syndiotactic polypropylene having greater than 80% r dyads. However, the crystallinity of the syndiotactic rich polypropylene according to the references prevents the material from being elastomeric. In addition, these references are directed to syndiotactic specific propagation under "catalytic site control", resulting in "rmmr" segments being present in the polymer produced. This is in contrast to "chain end control" of the present invention, wherein "rrmr" segments are produced and essentially no "rmmr" segments are produced.

U.S. Pat. Nos. 5,326,824, 5,373,059, 5,374,685, and Japanese Patent Nos. JP3025553 are directed to compositions comprising functionalized syndiotactic polypropylene. However, the functionalized syndiotactic polypropylene disclosed in these references has greater than about 50% crystallinity, (e.g., [rrrr]>50%, more preferably [rrrr]>70%), and thus, the polymers so produced are not elastomeric.

The Japanese reference JP2837246 is directed to syndiotactic polypropylene having [rrrr]>80%, an intrinsic viscosity of about 0.01 to 10 dl/g, a Mw/Mn of 1.5 to about 20, a melting temperature Tm of about 130 to 170° C., and a $t_{1/2}$=2 minutes. The polymers produced according to JP2837246 are thus crystalline, have a melting temperature, and are not elastomeric. In addition, syndiotactic polypropylene produced using vanadium based catalysts result in materials having an ash content, when determined as described herein, of greater than about 1 weight %, due to residual materials from the catalyst being present.

Given the cost and relative viability of polypropylene, there remains a need in the polymer industry for a propylene-based polymer, which has both amorphous and elastomeric character. Such a product would preferably have the novel combination of both high impact strength and high elasticity. In addition, there exists a need for propylene-based polymers, which have crystallinity sufficient to provide function related thereto to an elastomer where an amorphous elastomer may not be suitable for use. In light of the above, it would be desirable to provide a propylene-based olefin which is elastomeric instead of tacky. It would be further desirable for such an elastomer to be produced via an economical process that does not require an exotic catalyst, multiple extractions, multiple processing steps, or other conditions.

SUMMARY OF THE INVENTION

This invention relates to a new class of elastic polymeric compositions. In particular, to a composition comprising elastomeric syndiotactic rich polyolefins. This invention further relates to a process for preparing such elastic polymers from propylene and optionally other olefins.

The present invention also relates to an elastomeric composition comprising propylene, the composition having a peak melting point temperature below about 110° C. determined in a first heating cycle, a tensile set of 40% or less, and greater than or equal to about 60% [r] dyads, based on the total number of dyads present in the composition.

The present invention further relates to a process to produce an elastomeric composition comprising the steps of:

A. providing propylene, and optionally one or more additional olefin monomers, a metallocene transition metal catalyst precursor, and an activator to a reactor; and B. catalytic polymerization in the reactor of the propylene and optionally the one or more other olefin monomers at a temperature, at a pressure, and for a period of time sufficient to produce the elastomeric composition, wherein the elastomeric composition has a peak melting point temperature in a first heating cycle below about 110° C.; a tensile set of 40% or less; and greater than or equal to about 60% [r] dyads, based on the total number of dyads present in the composition.

DETAILED DESCRIPTION OF THE INVENTION

Definition of General Terms

Figure 1:
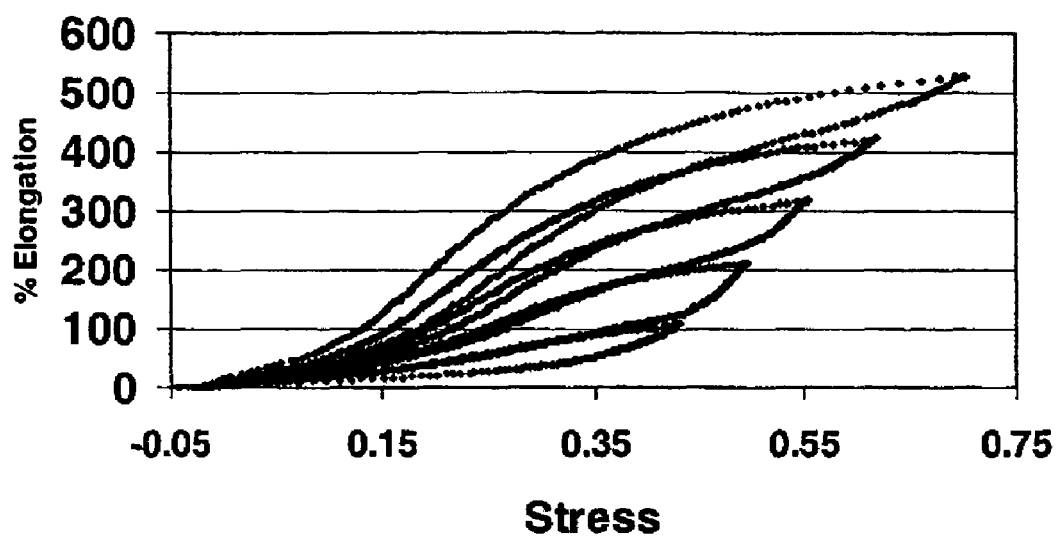
FIG. 1 is a hysterisis plot of stress vs. % elongation of the inventive polymer.

For the purposes of this invention and the claims thereto when a polymer is referred to as comprising an olefin, the olefin present in the polymer is the polymerized form of the olefin. As referred to herein, the terms catalyst precursor, pre-catalyst compound, and catalyst compound are used interchangeably. A catalyst system is a combination of a pre-catalyst, an activator, and optionally a support. An activator may also interchangeably referred to as a cocatalyst. A reactor is any container(s) in which a chemical reaction occurs. As used herein, the new numbering scheme for the Periodic Table Groups is used as set out in CHEMICAL AND ENGINEERING NEWS, 63(5), 27 (1985).

Further, for purposes of this invention, Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, TMS is trimethylsilyl, and a per fluoro radical is an organic radical having one or more available hydrogen atoms substituted with fluorine atoms. For purposes of this disclosure, the term oligomer refers to compositions having 2-75 mer units and the term polymer refers to compositions having 76 or more mer units. A mer is defined as a unit of an oligomer or polymer that originally corresponded to the olefin(s) used in the oligomerization or polymerization reaction. For example, the mer of polyethylene would be ethylene. Room temperature is 25° C., unless otherwise stated.

Characterization of Elastomeric Properties

Elastomeric compositions of the present invention may be characterized as having various physical properties, compositions, and methods of being produced. Unless stated otherwise, the following methods are used in characterization of the composition of the present invention:

Tensile set is determined according to ASTM D 412, using a Die C shaped dumbbell specimen.

Molecular weights (Mw, Mn & Mz) are determined using Gel Phase Chromatography (GPC) and an array of detectors as described in detail herein.

Tacticity (% [r] dyads, % [m] dyads, and the like, are determined using $^{13}C$ NMR according to the Ewen method described at pages 271 to 292 of "Catalytic Polymerization of Olefins, Proceedings of the International Symposium on Future Aspects of Olefin Polymerization, Tokyo, Japan, 4-6 Jul. 1995", Keii & Soga, Eds., Elsevier Science Publishers B.V., Amsterdam, 1986.

The composition of the present invention is elastic. One measure of elasticity that may be used to describe the elastomeric compositions of the present invention is "tensile set", which is defined for use herein as the elongation remaining in a compression molded specimen after it has been stretched at a particular rate to a particular elongation, and then allowed to recover at that same rate until the specimen is at zero stress. For purposes herein, percent tensile elongation (% El) is equal to the change in length divided by the original length of the specimen multiplied by 100%.

$$\% El = \frac{(\text{Test length} - \text{original length})}{\text{original length}} * 100\%$$

Tensile set is expressed herein as a percentage of the length of a sample in excess of the original length or distance after that sample has been elongated and allowed to recover to a point of zero stress. Accordingly, a tensile set value of 0% would indicate that upon recovery (e.g., relaxation of the elongated sample), the elastomer returned to the original length. A tensile set value of 100% would indicate that upon relaxation after elongation, the elastomer was twice the length of the original. The tensile set value of a particular material may be dependent on the rate of elongation, on the temperature, and the like. Tensile set may also include both permanent and recoverable components. The permanent component of the tensile set measurement is often referred to as "creep".

As noted above, tensile set is determined according to ASTM method D 412. In this method, test samples are die cut from sheets. The test procedure includes the following steps: two marks are precisely placed on each test sample at the ends of the gauge length of dumbbell shaped specimens. The initial length between these marks is measured for each sample. The samples are carefully mounted in the test fixture to provide uniform alignment and position. The fixture stretches the samples (i.e., elongation) at 20 inches (51 cm) per minute to 300% elongation and holds them for 10 minutes. The samples are then released from the fixture and allowed to relax for 10 minutes. After the relaxation period, the final distance between the marks is measured. Tensile set is expressed in percent and is calculated by dividing the change in length of the test sample by the initial length. The test is conducted at about 21 to 25° C. unless otherwise specified.

ASTM D 412 specifies a dumbbell shaped specimen. The specification describes 6 options for the sample dimensions. "Die C" is used herein unless otherwise specified. Die C has an overall length of 115 mm (4.5 inches) with a narrow section 33 mm (1.31 inches) long. This provides a gauge length (benchmark) 25 mm (1 inch) long and a gauge width of 6 mm (0.25 inch). Test specimens are first conditioned at ambient laboratory conditions for at least 24 hours prior to testing. Die C was used according to ASTM D-412 herein for determining other elastic properties including tensile strength at break, tensile modulus, and percent tensile elongation at break.

Elastic behavior may also be expressed according to stretch-recovery testing as % Recovery, wherein a film is elongated to 100%, 200%, and 300% of its original length, the stress is removed and the sample is allowed to relax for one hour. The degree to which a sample recovers is then measured. Recovery is expressed in percent, and is defined for us herein as:

$$\% \text{ Recovery} = \frac{(\text{length at maximum stretch} - \text{length of relaxation})}{(\text{length at maximum stretch} - \text{original length})} * 100\%.$$

Size-Exclusion Chromatography of Polymers

Molecular weight distribution (Mw/Mn) was characterized using Size-Exclusion Chromatography (SEC). Molecular weight (weight-average molecular weight, Mw, and number-average molecular weight, Mn, and Z-average molecular weight, Mz) were determined using a High Temperature Size Exclusion Chromatograph (either from Waters Corporation or Polymer Laboratories), equipped with a differential refractive index detector (DRI), an online light scattering detector, and a viscometer. Experimental details not described below, including how the detectors were calibrated, are described in: T. Sun, P. Brant, R. R. Chance, and W. W. Graessley, Macromolecules, Volume 34, Number 19, 6812-6820, (2001).

Three Polymer Laboratories PLgel 10 mm Mixed-B columns were used. The nominal flow rate was 0.5 cm³/min, and the nominal injection volume was 300 μL. The various transfer lines, columns and differential refractometer (the DRI detector) were contained in an oven maintained at 135° C.

Solvent for the SEC experiment was prepared by dissolving 6 grams of butylated hydroxy toluene as an antioxidant in 4 liters of Aldrich reagent grade 1,2,4 trichlorobenzene (TCB). The TCB mixture was then filtered through a 0.7 μm glass pre-filter and subsequently through a 0.1 μm Teflon filter. The TCB was then degassed with an online degasser before entering the SEC.

Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units are 1.463 g/ml at room temperature and 1.324 g/ml at 135° C. The injection concentration ranged from 1.0 to 2.0 mg/ml, with lower concentrations being used for higher molecular weight samples.

Prior to running each sample the DRI detector and the injector were purged. Flow rate in the apparatus was then increased to 0.5 ml/minute, and the DRI was allowed to stabilize for 8-9 hours before injecting the first sample. The LS laser was turned on for 1 to 1.5 hours before running samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the same as described below for the LS analysis. Units on parameters throughout this description of the SEC method are such that concentration is expressed in g/cm³, molecular weight is expressed in g/mole, and intrinsic viscosity is expressed in dL/g.

The light scattering detector used was a Wyatt Technology High Temperature mini-DAWN. The polymer molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_c c$$

Here, $\Delta R(\theta)$ is the measured excess Rayleigh scattering intensity at scattering angle $\theta$, c is the polymer concentration determined from the DRI analysis, $A_2$ is the second virial coefficient, $P(\theta)$ is the form factor for a monodisperse random coil (described in the above reference), and $K_o$ is the optical constant for the system:

$$K_o = \frac{4\pi^2 n^2 (dn/dc)^2}{\lambda^4 N_A}$$

in which $N_A$ is Avogadro's number, and (dn/dc) is the refractive index increment for the system. The refractive index, n=1.500 for TCB at 135° C. and λ=690 nm. In addition, $A_2$=0.0006 for propylene polymers and 0.0015 for butene polymers, and (dn/dc)=0.104 for propylene polymers and 0.098 for butene polymers.

A high temperature Viscotek Corporation viscometer was used, which has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the following equation:

$$\eta_s = c[\eta] + 0.3(c[\eta])^2$$

where c was determined from the DRI output.

The branching index (g') is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromotographic slices, i, between the integration limits. The branching index g' is defined as:

$$g' = \frac{[\eta]_{avg}}{k M_v^\alpha}$$

where k=0.0002288 and α=0.705 for propylene polymers, and k=0.00018. $M_v$ is the viscosity-average molecular weight based on molecular weights determined by LS analysis.

Peak melting point (Tm), peak crystallization temperature (Tc), and heat of melting were determined using differential scanning calorimetry (DSC). The DSC data was recorded in a first heating scan (a first heating cycle) by first cooling the sample to −100° C. and then gradually heating it to 200° C. at a rate of 10° C./minute. The sample was kept at 200° C. for 2 minutes before cooling the sample again to −100° C. at a rate of 10° C./minute. After holding the sample at −100 C for 2 minutes a second heating scan (second heating cycle) was applied. Both the first and second cycle thermal cycles were recorded and used to determine the heat of melting by methods known in the art.

Properties of the Elastomeric Composition

The elastomeric composition of the present invention may comprise any one of the following properties, either alone or in combination. In particular, the elastomeric compositions of the present invention may have a tensile set of 40% or less, when determined according to ASTM D-412 at 25° C. Preferably, the tensile set is less than or equal to about 30%, more preferably less than or equal to about 20%, more preferably less than or equal to about 15%, more preferably less than or equal to about 10%, with less than or equal to about 5% being more preferred.

The number average molecular weight (Mn) of the elastomeric composition of the present invention is preferably about 70,000 to about 1,000,000 g/mol. More preferably, Mn is greater than or equal to about 150,000, still more preferably greater than or equal to about 200,000, with greater than or equal to about 250,000 g/mol being still more preferred. Likewise, Mn is preferably less than or equal to about 700,000, still more preferably less than or equal to about 500,000, with less than or equal to about 400,000 g/mol being still more preferred.

The weight average molecular weight (Mw) of the elastomeric composition of the present invention is preferably about 140,000 to about 1,400,000 g/mol. More preferably, Mw is greater than or equal to about 300,000, still more preferably greater than or equal to about 400,000, with greater than or equal to about 500,000 g/mol being still more preferred. Likewise, Mw is preferably less than or equal to about 1,000,000, still more preferably less than or equal to about 900,000, with less than or equal to about 700,000 g/mol being still more preferred.

The z average molecular weight (Mz) of the elastomeric composition of the present invention is preferably about 210,000 to about 2,100,000 g/mol. More preferably, Mz is greater than or equal to about 450,000, still more preferably greater than or equal to about 600,000, with greater than or equal to about 750,000 g/mol being still more preferred. Likewise, Mz is preferably less than or equal to about 2,000,000, still more preferably less than or equal to about 1,000,000, with less than or equal to about 900,000 g/mol being still more preferred.

The molecular weight distribution MWD (Mw/Mn) of the elastomeric composition of the present invention is preferably about 1.5 to about 6.5. More preferably, MWD is greater than or equal to about 1.6, still more preferably greater than or equal to about 1.65, with greater than or equal to about 1.7 being still more preferred. Likewise, MWD is preferably less than or equal to about 5.0, still more preferably less than or equal to about 4.0, with less than or equal to about 3.5 being still more preferred.

The g' index of the elastomeric composition of the present invention is preferably about 1.05 to about 1.55. More preferably, g' is greater than or equal to about 1.15, still more preferably greater than or equal to about 1.2, with greater than or equal to about 1.3 being still more preferred. Likewise, g' is preferably less than or equal to about 1.50, still more preferably less than or equal to about 1.45 with less than or equal to about 1.40 being still more preferred.

The peak melting point temperature (Tm) (i.e., the melting point) of the elastomeric composition of the present invention is preferably below about 110° C., and is preferably determined using the first heat scan following the DSC procedure described in detail herein. The first melt peak melting temperature (Tm) is preferably about 60° C. to about 110° C., more preferably, Tm is greater than or equal to about 65, still more preferably greater than or equal to about 70, with greater than or equal to about 75 being still more preferred. Likewise, Tm is preferably less than or equal to about 100, still more preferably less than or equal to about 95, with less than or equal to about 90° C. being still more preferred.

The heat of melting of the elastomeric composition of the present invention is preferably about 1 to about 30 J/g, determined using the DSC procedure described in detail herein. More preferably, the heat of melting of the present invention is less than or equal to about 25 J/g, still more preferably less than or equal to about 20 J/g.

The melt flow rate (MFR) of the elastomeric composition of the present invention, determined according to ASTM D-1238, is preferably about 0.1 to about 500 g/10 min. More preferably, the MFR is greater than or equal to about 0.2, still more preferably greater than or equal to about 0.4, with greater than or equal to about 0.8 g/10 min. being still more preferred. Likewise, the MFR is preferably less than or equal to about 500 g/10 min., still more preferably less than or equal to about 300, with less than or equal to about 100 g/10 min. being still more preferred.

Polyolefin Elastomer Tacticity

The elastomeric compositions of the present invention comprise an olefin polymer or oligomer, preferably polypropylene. Suitable olefin polymers ("polyolefins" or "polyolefin polymers") in general, and in particular poly-alpha-olefin polymers comprising propylene and/or other C4 or higher alpha-olefin monomers, may comprise hydrocarbyl groups that are pendant from the polymer backbone chain. These pendant hydrocarbyl groups may be arranged in different stereochemical configurations determined relative to the polymer backbone chain. These arrangements include atactic, isotactic, and/or syndiotactic configurations.

The degree and type of tacticity of a polyolefin polymer have been discovered to affect the physical properties of a composition comprising the polymer. Other determinants of such a composition may include the type and relative concentration of monomers, comonomers, oligomers, the weight average molecular weight (Mw) of the polymer(s) present, the molecular weight distribution (MWD) of the polymer(s) present, the crystallinity of the polymer(s), and the like.

Tacticity may also be related to the degree of crystallinity that a poly-alpha-olefin polymer or copolymer is capable of obtaining. As used herein, the tacticity of an elastomer, reflects the stereochemical regularity of hydrocarbyl groups which are pendent to the polymer molecule backbone (i.e., the tacticity of the elastomer).

Several types of tacticity have been described in poly-alpha-olefins, including atactic, normal isotactic, isotactic stereoblock, syndiotactic, and hemiisotactic. Although all of these tacticity configurations have been primarily demonstrated in the case of polypropylene, in theory each is equally possible for polymers comprised of one or more C3 or higher alpha-olefin, cyclic olefin or internal olefin.

Atactic Polyolefin Elastomers

Atactic poly-olefins are also referred to herein as amorphous polyolefins. An atactic polyolefin may be characterized as having hydrocarbyl groups pendent to the polymer molecule backbone that assume no regular order with reference to the backbone. This random, or atactic, structure is represented by a polymer backbone of alternating methylene and methine carbons, with randomly oriented branches substituting the methine carbons. The methine carbons randomly have R and S configurations, creating adjacent pairs of like configuration (a "meso" or "m" dyad) or of unlike configuration (a "racemic" or "r" dyad). The atactic form of a polymer may contain approximately equal fractions of meso and racemic dyads ([m]=[r]). Importantly, atactic poly-alpha-olefins, particularly atactic polypropylene, may be characterized by being soluble in aliphatic and aromatic solvents at ambient temperature or above. Since atactic polymers exhibit no regular order or repeating unit configurations in the polymer chain, such atactic polymers may appear to be amorphous. As used herein, an atactic polymer may lack a molecular lattice structure, may have a poorly defined melting point, or my not have a discernable melting point.

Isotactic Polyolefin Elastomers

Isotactic poly-olefins are characterized as having pendent hydrocarbyl groups ordered in space to the same side or plane of the polymer backbone chain. Using isotactic polypropylene as an example, the isotactic structure is typically described as having the pendent methyl groups attached to the ternary carbon atoms of successive monomeric units on the same side of a hypothetical plane through the carbon backbone chain of the polymer and bisecting the angle between pendant groups, e.g., the methyl groups are all above or below the plane as shown below:

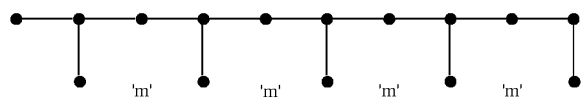

the degree of isotactic regularity is measured by NMR techniques. Bovey's NMR nomenclature for an isotactic pentad is . . . mmmm . . . with each "m" representing a "meso" dyad or successive methyl groups on the same side in the plane.

In an isotactic poly-alpha-olefin, all of the monomer units have the same stereochemical configuration, with the exception of random errors, which may appear along the polymer. Such random errors almost always appear as isolated inversions of configuration which may be corrected in the very next alpha-olefin monomer insertion to restore the original R or S configuration of the propagating polymer chain. Single insertions of inverted configuration give rise to isolated rr triads, which distinguish this isotactic structure in its NMR from the isotactic stereoblock form shown below:

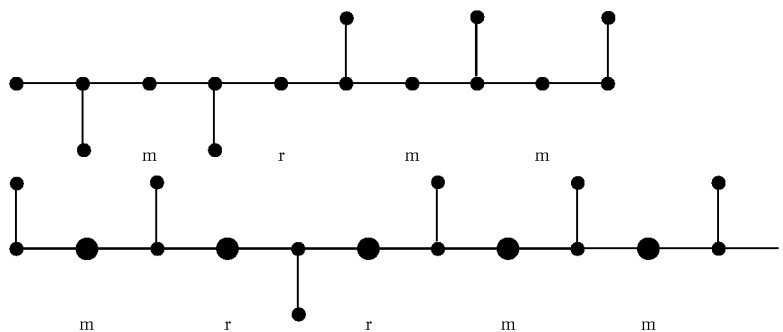

This isotactic stereoblock form of polyolefin may result from "site chirality exchange" and/or "chain end control" mechanisms during formation of a isotactic stereoblock poly-alpha-olefin polymer. Deviation or inversion in the regularity of the structure of the chains lowers the degree of isotacticity and hence the crystallinity of which the polymer is capable.

Syndiotactic Polyolefin Elastomers

Syndiotactic polyolefins are those wherein the hydrocarbyl groups pendent to the polymer molecular backbone alternate sequentially in order from one side or plane to the opposite side or plane relative to the polymer backbone, as shown below:

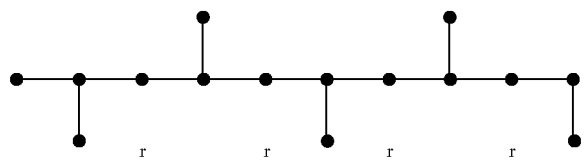

In NMR nomenclature, this pentad is described as . . . rrrr . . . in which each r represents a "racemic" dyad, i.e., successive methyl groups on alternate sides of the plane (see J. A. Ewen's chapter in "Catalytic Polymerization of Olefins", Proceedings of the International Symposium on Future Aspects of Olefin Polymerization, Tokyo, Japan, 4-6 Jul. 1995", Keii & Soga, Eds., Elsevier Science Publishers B.V., Amsterdam, 1986. P 271 (the Ewen method). The percentage of r dyads in the chain determines the degree of syndiotacticity of the polymer, and is related to the crystallinity of the polymer.

The molecular chain backbone of a syndiotactic polymer can be considered to be a copolymer of olefins with alternating stereochemical configurations. Highly syndiotactic polymers may be highly crystalline and thus may have defined melting points similar to their isotactic polymorphs and thus may be characterized in part by their melting point temperature.

Polyolefin Elastomer Crystallinity

The amount or purity of tacticity in an elastomer is related to the crystallinity of that elastomer. Both isotactic and syndiotactic polyolefins may possess various levels of crystallinity. For purpose herein, a crystalline polyolefin has greater than about 50% crystallinity. As used herein, both isotactic polyolefins and syndiotactic polyolefins having a "high" amount of crystallinity include at least a portion of that polymer that is not soluble toluene at or above room temperature. Polyolefins having a "high" amount of crystallinity may also be characterized, at least in part, by a defined melting point temperature or temperature range.

Contrary to crystalline polyolefin elastomers, amorphous polyolefin elastomers typically have less than about 20% crystallinity. An essentially amorphous polyolefin elastomer, and in particular essentially amorphous polypropylene elastomer may be characterized as being essentially soluble in xylene, toluene, hexane, cyclohexane, and/or the like, at or above room temperature. As used herein, an essentially amorphous polyolefin elastomer may include a homopolymer, a copolymer, and/or an oligomer, or blend thereof (collectively referred to as an amorphous polyolefin elastomer), and is considered amorphous for purposes herein if at least about 95 wt % of the amorphous polyolefin elastomer is soluble in toluene at room temperature, based on the total weight of the amorphous polyolefin present. Amorphous polyolefin elastomers may also be characterized as having no, or a little discernable melting point or melting point range.

Syndiotactic Rich Polypropylene Elastomers

In a preferred embodiment, the elastomeric composition of the present invention comprises syndiotactic rich polypropylene, abbreviated here as "srPP". The srPP may comprise at least about 60% r-dyads, based on the total number of dyads present in the composition, as determined according to the Ewen method described at pages 271 to 292 of "Catalytic Polymerization of Olefins, Proceedings of the International Symposium on Future Aspects of Olefin Polymerization, Tokyo, Japan, 4-6 Jul. 1995", Keii & Soga, Eds., Elsevier Science Publishers B.V., Amsterdam, 1986. In a preferred embodiment, srPP may include about at least about 65% r dyads, preferably at least about 70% r dyads, preferably at least about 79% r dyads, based on the total number of r and m dyads present in the polymer.

Preferred elastomeric compositions of the present invention may comprise syndiotactic rich polypropylene (a-srPP) having about 60% r-dyads to about 79% r-dyads, based on the total number of dyads present in the composition (e.g., the propylene based polymer). In another preferred embodiment, the elastomeric composition may comprise srPP having about 65% r dyads to about 75% r dyads, preferably about 60% r dyads to about 75% r dyads, preferably about 60% r dyads to about 70% r dyads, preferably about 65% r dyads to about 70% r dyads, based on the total number of r-dyads present in the composition.

The elastomeric composition may comprise an amorphous syndiotactic rich polypropylene having about 50% to about 69% r-triads, based on the total number of triads present in the composition. In a preferred embodiment, the elastomeric composition includes a srPP having at least about 55%, preferably at least about 69%, more preferably at least about 60% r-triads, based on the total number of triads present in the composition. Likewise, the elastomeric composition includes an amorphous srPP having less than about 45%, preferably less than about 40%, more preferably less than about 35% r-triads, based on the total number of triads present in the composition, but greater than 30% r-triads.

Elastomeric Composition

In addition to propylene, the syndiotactic rich polypropylene elastomer of the present invention may include other alpha olefins within the base polymer. The elastomeric composition may thus comprise a polymer or oligomer of propylene, and/or one or more of the monomers disclosed herein. For example, srPP may include ethylene ($C_2$) and from $C_4$ to $C_{40}$. Examples of alpha olefins include butene-1, pentene-1, hexene-1, heptene-1, octene-1, nonene-1, decene-1, undecene-1, dodecene-1, tridecene-1, tetradecene-1, pentadecene-1, hexadecene-1, heptadecene-1, octadecene-l, and branched olefins including 3-methylbutene-1,3-methylpentene-1,4-methylpentene-1,3,5,5-trimethylhexene-1,5-ethyl-1-nonene, and 4,4-dimethylpentene-1.

The elastomeric composition produced herein may be a copolymer of one or more linear or branched $C_3$ to $C_{30}$ prochiral alpha-olefins, and/or $C_5$ to $C_{30}$ ring containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalyst(s).

Preferred monomers may also include aromatic-group-containing monomers containing up to about 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer may further comprise at least one polymerizable double bond such that after polymerization, the aromatic structure will be pendant from the polymer backbone. The aromatic-group containing monomer may further be substituted with one or more hydrocarbyl groups including, but not limited to, C to $C_{10}$ alkyl groups. Additionally, two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, paramethyl styrene, 4-phenyl-1-butene, and allyl benzene.

Non aromatic cyclic group containing monomers may also be included. These monomers may contain up to about 30 carbon atoms. Suitable non-aromatic cyclic group containing monomers preferably have at least one polymerizable olefinic group that is either pendant on the cyclic structure or is part of the cyclic structure. The cyclic structure may also be further substituted by one or more hydrocarbyl groups such as, but not limited to, $C_1$ to $C_{10}$ alkyl groups. Preferred non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantane, and the like.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene. Particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins, with or without substituents at various ring positions.

The amount of a monomer or monomers other than propylene, when present in the elastomer composition, may be greater than about 0.001% by weight (wt %), based on the total weight of the composition. Preferably, the amount of the other monomer or monomers is greater than or equal to about 0.1 wt %, more preferably greater than or equal to about 1 wt %. The other monomer or monomers may also be present in the elastomer composition at about 10 wt % or less. Preferably, the amount of the other monomer or monomers is less than or equal to about 5 wt %, more preferably less than or equal to about 1 wt %.

In a preferred embodiment, the elastomeric composition of the present invention comprises srPP having less than or equal to about 10 wt % ethylene, based on the total weight of the elastomeric composition. More preferably, the elastomeric composition of the present invention comprises srPP having about 1 to about 8 wt % ethylene, with about 2 to about 6 wt % ethylene being more preferred.

In another embodiment, the elastomeric composition of the present invention may comprise a blend, combination, or mixture of polymers, wherein each of the polymers comprises propylene. Preferably, a mixture of one or more syndiotactic rich polymers. Accordingly, the present invention may comprise a blend of an amorphous syndiotactic rich polymer with other polymers, so long as the resultant blend comprises the limitations recited in the appended claims.

In another embodiment, the composition of this invention may further comprise from 1 to 50, preferably 5 to 20 weight % of a polypropylene having an MFR of 10 and 1000 dg/min (ASTM 1238, condition e), preferably having a melting point of 149 to 165° C. This polypropylene may be a homopolymer or a copolymer and may be syndiotactic or isotactic.

Preparation of Elastomers

The elastomeric compositions disclosed herein may be produced by contacting the propylene and one or more catalysts and/or one or more catalyst precursors, one or more activators, and optionally one or more monomers (i.e., the components), under polymerization conditions suitable to produce an oligomer or polymer. The components may be contacted in a solution, bulk, gas or slurry polymerization process or a combination thereof, preferably a solution phase or bulk phase polymerization process. Thus this invention further relates to a process to produce the elastomeric compositions described above comprising the steps of contacting one or more catalysts, one or more activators, propylene, and/or one or more monomers. In another embodiment the one or more catalysts, and one or more monomers, and optionally one or more activators are contacted to produce an oligomer or polymer.

In a preferred embodiment, a process to produce an elastomeric composition comprises the steps of:

A. providing propylene, and optionally one or more additional olefin monomers, a metallocene catalyst precursor, and an activator to a reactor;

B. catalytic polymerization in the reactor of the propylene and optionally the one or more other olefin monomers at a temperature, at a pressure, and for a period of time sufficient to produce the elastomeric composition, wherein the elastomeric composition comprises a peak melting point temperature below about 110° C., determined using the DSC procedure described herein, a tensile set of 40% or less determined according to ASTM D412, and greater than or equal to about 60% [r] dyads, based on the total number of dyads present in the composition.

The components of the polymerization reaction are preferably contacted with the catalyst (i.e., the catalyst precursor in combination with the activator) within one or more reactors. One or more reactors may be in series or in parallel to produce the present invention. Catalyst component and activator may be provided (e.g., delivered) to the reactor as a solution or slurry, either separately to the reactor, activated in-line just prior to the reactor, or preactivated and pumped as an activated solution or slurry to the reactor. A preferred operation is two solutions activated in-line. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst components can be added to the first reactor in the series. The catalyst component may also be added to more than one reactor, and/or added such that one component is added to first reactor and another component to another reactor or reactors.

Elastomers of high molecular weight and low crystallinity can be prepared utilizing the catalysts disclosed herein under traditional solution processes or by introducing propylene gas into a slurry as a polymerization diluent, in which the catalyst suspension is suspended. Typical propylene pressures will be between 10 and 1000 psig (69-6895 kPa) and the polymerization diluent temperature will typically be between −10 and 160° C. The process can be carried out in a stirred tank reactor or a tubular reactor, or more than one operated in series or in parallel. See the general disclosure of U.S. Pat. No. 5,001,205 for general process conditions. All documents are incorporated by reference for description of polymerization processes, ionic activators and useful scavenging compounds.

In general the pre-catalyst and the activator are combined in ratios of about 1:10,000 to about 1:1, in other embodiments the combined catalysts compounds and the activator are combined in ratios of 1:1 to 100:1. When alumoxane or aluminum alkyl activators are used, the combined pre-catalyst-to-activator molar ratio is from 1:5000 to 10:1, alternatively from 1:1000 to 10:1; alternatively, 1:500 to 2:1; or 1:300 to 1:1. When ionizing activators are used, the combined pre-catalyst-to-activator molar ratio is from 10:1 to 1:10; 5:1 to 1:5; 2:1 to 1:2; or 1.2:1 to 1:1. The activator preferably comprises aluminum. Multiple activators may be used, including using mixtures of alumoxanes or aluminum alkyls with ionizing activators.

The temperature of the reactor or reactors may be controlled to within about plus or minus 10° C. of a particular set point for a particular polymerization process using a combination of steam and water. Preferably, the reactor or reactors are controlled to within about plus or minus 5° C., with about plus or minus 1° C. being more preferred.

Polymerization Processes

The elastomeric composition may be produced utilizing a process having a temperature of about −60° C. to 150° C., −20° C. to 125° C., or 0° C. to 100° C. Some embodiments select polymerization pressures (gauge) from 0 kPa-35 MPa or 500 kPa-15 MPa. In a preferred embodiment, conditions that favor polymerization production include using aluminum alkyls (as activator or scavenger, etc.) and/or selecting a titanium, zirconium, and/or hafnium catalyst compound where $Ar^1$ and or $Ar^2$ comprises phenyl and/or mesityl.

Preferred polymerization processes may be run in the presence of various liquids, particularly aprotic organic liquids. Preferably the homogeneous catalyst system, propylene, ethylene, alpha-olefins, and product are soluble in these liquids. A supported (heterogeneous) catalyst system may also be used, but will form a slurry rather than a solution. Suitable liquids for both homo- and heterogeneous catalyst systems, include alkanes, alkenes, cycloalkanes, selected halogenated hydrocarbons, aromatic hydrocarbons, and in some cases, hydrofluorocarbons. Useful solvents specifically include hexane, toluene, cyclohexane, and benzene.

Gas Phase Polymerization

Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352, 749, 5,405,922, 5,436,304, 5,453,471, 5,462,999, 5,616,661 and 5,668,228 all of which are fully incorporated herein by reference.)

The reactor pressure in a gas phase process may vary from about 10 psig (69 kPa) to about 500 psig (3448 kPa), preferably from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 70° C. to 110° C., and most preferably in the range of from about 70° C. to about 95° C. In another embodiment when high density polyethylene is desired then the reactor temperature is typically between 70 and 105° C.

The productivity of the catalyst or catalyst system in a gas phase system is influenced by the partial pressure of the main monomer. The preferred mole percent of the main monomer, preferably ethylene, is from about 25 to 90 mole percent and the comonomer partial pressure is in the range of from about 138 kPa to about 517 kPa, preferably about 517 kPa to about 2069 kPa, which are typical conditions in a gas phase polymerization process. Also in some systems the presence of comonomer can increase productivity.

In a preferred embodiment, the reactor utilized in the present invention is capable of producing more than 500 lbs of polymer per hour (227 Kg/hr) to about 200,000 lbs/hr (90,900 Kg/hr) or higher, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and preferably greater than 65,000 lbs/hr (29,000 Kg/hr) to greater than 100,000 lbs/hr (45,500 Kg/hr), and most preferably over 100,000 lbs/hr (45,500 Kg/hr).

Other gas phase processes contemplated by the process of the invention include those described in U.S. Pat. Nos. 5,627, 242, 5,665,818 and 5,677,375, and European publications EP-A-0 794 200, EP-A-0 802 202 and EP-B-634 421 all of which are herein fully incorporated by reference.

In another preferred embodiment the catalyst system in is liquid form and is introduced into the gas phase reactor into a resin particle lean zone. For information on how to introduce a liquid catalyst system into a fluidized bed polymerization into a particle lean zone, please see U.S. Pat. No. 5,693,727, which is incorporated by reference herein.

Slurry Phase Polymerization

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process should be operated above the reaction diluent critical temperature and pressure. Preferably, a hexane or an isobutane medium is employed.

In one embodiment, a preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. The preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. The reactor is maintained at a pressure of 3620 kPa to 4309 kPa and at a temperature in the range of about 60° C. to about 104° C. depending on the desired polymer melting characteristics. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In another embodiment, the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

In another embodiment in the slurry process of the invention the total reactor pressure is in the range of from 400 psig (2758 kPa) to 800 psig (5516 kPa), preferably 450 psig (3103 kPa) to about 700 psig (4827 kPa), more preferably 500 psig (3448 kPa) to about 650 psig (4482 kPa), most preferably from about 525 psig (3620 kPa) to 625 psig (4309 kPa).

In yet another embodiment in the slurry process of the invention the concentration of predominant monomer in the reactor liquid medium is in the range of from about 1 to 10 weight percent, preferably from about 2 to about 7 weight percent, more preferably from about 2.5 to about 6 weight percent, most preferably from about 3 to about 6 weight percent.

Another process of the invention is where the process, preferably a slurry or gas phase process is operated in the absence of or essentially free of any scavengers, such as triethylaluminum, trimethylaluminum, tri-isobutylaluminum and tri-n-hexylaluminum and diethyl aluminum chloride, dibutyl zinc and the like. This process is described in PCT publication WO 96/08520 and U.S. Pat. No. 5,712,352, which are herein fully incorporated by reference.

In another embodiment the process is run with scavengers. Typical scavengers include trimethyl aluminum, tri-isobutyl aluminum and an excess of alumoxane or modified alumoxane.

In a preferred embodiment, the process of U.S. Pat. No. 6,562,920 is used herein.

Homogeneous, Bulk or Solution Phase Polymerization

In a preferred method, the catalysts described herein can be used advantageously in homogeneous solution processes. Generally this involves polymerization in a continuous reactor in which the polymer formed and the starting monomer and catalyst materials supplied, are agitated to reduce or avoid concentration gradients. Suitable processes operate above the melting point of the polymers at high pressures, from 1 to 3000 bar (10-30,000 MPa), in which the monomer acts as diluent or in solution polymerization using a solvent.

Temperature control in the reactor is obtained by balancing the heat of polymerization with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds may also be used. The reactor temperature depends on the catalyst used. In general, the reactor temperature preferably can vary between about 0° C. and about 160° C., more preferably from about 10° C. to about 140° C., and most preferably from about 40° C. to about 120° C. In series operation, the second reactor temperature is preferably higher than the first reactor temperature. In parallel reactor operation, the temperatures of the two reactors are independent. The pressure can vary from about 1 mm Hg to 2500 bar (25,000 MPa), preferably from 0.1 bar to 1600 bar (1-16,000 MPa), most preferably from 1.0 to 500 bar (10-5000 MPa).

Each of these processes may also be employed in single reactor, parallel or series reactor configurations. The liquid processes comprise contacting olefin monomers with the above described catalyst system in a suitable diluent or solvent and allowing said monomers to react for a sufficient time to produce the desired polymers. Hydrocarbon solvents are suitable, both aliphatic and aromatic. Alkanes, such as hexane, pentane, isopentane, and octane, are preferred.

The process can be carried out in a continuous stirred tank reactor, batch reactor or plug flow reactor, or more than one reactor operated in series or parallel. These reactors may have or may not have internal cooling and the monomer feed my or may not be refrigerated. See the general disclosure of U.S. Pat. No. 5,001,205 for general process conditions. See also, international application WO 96/33227 and WO 97/22639.

Catalysts

Any pre-catalyst compound (also referred to herein as a catalyst precursor compound or as a catalyst precursor) that when activated can produce the desired elastomer may be used in the practice of this invention. Pre-catalyst compounds suitable for use in the process of the present invention include metallocene transition metal compounds containing one, two, or three cyclopentadienyl ligands per metal atom.

In an embodiment, so called bulky ligand metallocene compounds (pre-catalysts) may be useful in this invention. Metallocenes include half and full sandwich compounds having one or more bulky ligands bonded to at least one metal atom. Typical bulky ligand metallocene compounds are generally described as containing one or more bulky ligand(s) and one or more leaving group(s) bonded to at least one metal atom. The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably, the ring(s) or ring system(s) are composed of carbon atoms such as but not limited to those cyclopentadienyl ligands or cyclopentadienyl-type ligand structures or other similar functioning ligand structure such as a pentadienyl, a cyclooctatetraendiyl, a cyclobutadienyl, or a substituted allyl ligand. Other ligands that can function similarly to a cyclopentadienyl-type ligand include amides, phosphides, imines, phosphinimines, amidinates, and ortho-substituted phenoxides. The metal atom is preferably selected from Groups 3 through 15 and the lanthanide or actinide series of the Periodic Table of Elements. Preferably the metal is a transition metal from Groups 3 through 12, more preferably Groups 4, 5 and 6, and most preferably the transition metal is from Group 4.

In one embodiment, the catalyst composition of the invention includes one or more bulky ligand metallocene catalyst compounds represented by the formula:

$$L^A L^B MQ^*_n \qquad (1)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/or heteroatom containing cyclopentadienyl-type ligands.

Non-limiting examples of bulky ligands include cyclopentadienyl ligands, cyclopentaphenanthreneyl ligands, indenyl ligands, benzindenyl ligands, fluorenyl ligands, dibenzo[b,h] fluorenyl ligands, benzo[b]fluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, boratobenzene ligands and the like, including hydrogenated versions thereof, for example tetrahydroindenyl ligands.

Additional description of metallocene compounds which comprise, or can be alkylated to comprise, at least one ligand capable of abstraction via protonation to form a metal cation appear in the patent literature, for example EP-A-0 129 368, U.S. Pat. Nos. 4,871,705, 4,937,299, 5,324,800 EP-A-0418 044, EP-A-0 591 756, WO-A-92/00333 and WO-A-94/01471. Such metallocene compounds can be described for this invention as mono or biscylopentadienyl substituted Group 3, 4, 5, 6, 9, 10, or 11 metal compounds wherein the cyclopentadienyl substituents may be themselves substituted with one or more groups and may be bridged to each other, or may be bridged through a heteroatom to the central metal group. The size and constituency of the cyclopentadienyl substituents and bridging elements are not critical to the preparation of the ionic catalyst systems of the invention but should be selected in the literature described manner to enhance the polymerization activity and polymer characteristics being sought. Preferably the cyclopentadienyl (or substituted cyclopentadienyl, such as indenyl or substituted indenyl and fluorenyl and substituted fluorenyl) rings, when bridged to each other, will be hydrocarbyl-substituted (C1-C 12) in the 2 position and will additionally comprise alkyl, cycloalkyl, aryl, alkylaryl and or arylalkyl substituents, the latter as either of fused or pendant ring structures including multi-ring structures, for example, those of U.S. Pat. Nos. 5,278,264 and 5,304,614. Such substituents should each have essentially hydrocarbyl characteristics and will typically contain up to 30 carbon atoms but may be hetero-atom containing with not more than 1-3 non-hydrogen/carbon atoms, e.g., N, S, O, P, and Si (see U.S. patent application Nos. 20010049331 and 20030191215 which are fully incorporated by reference herein.)

In one embodiment, $L^A$ and $L^B$ may be any other ligand structure capable of π-bonding to M. In yet another embodiment, the atomic molecular weight (MW) of $L^A$ or $L^B$ exceeds 60 a.m.u.; preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of Formula 1 only one of either $L^A$ or $L^B$ is present.

Independently, each $L^A$ and $L^B$ may be unsubstituted or substituted with a combination of substituent groups R*. Non-limiting examples of substituent groups R* include one or more from the group selected from hydrogen, or linear or branched alkyl radicals, alkenyl radicals, alkynyl radicals, cycloalkyl radicals, aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals or combination thereof. In a preferred embodiment, substituent groups R* have up to 50 non-hydrogen atoms, preferably from 1 to 30 carbon, that can also be substituted with halogens or heteroatoms or the like. Non-limiting examples of alkyl substituents R* include methyl, ethyl, pro-pyl, butyl, pentyl, hexyl, cyclopentyl, cyclohexyl, benzyl or phenyl groups and the like, including all their isomers, for example tertiary butyl, isopropyl, and the like.

Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methyl-bis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide.

Non-hydrogen substituents R* include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R* groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group, R*, may also be a diradical bonded to L at one end and forming a carbon sigma bond to the metal M. Other ligands may be bonded to the metal M, such as at least one leaving group Q*.

In one embodiment, Q* is a monoanionic labile ligand having a sigma-bond to M. Depending on the oxidation state of the metal, the value for n is 0, 1 or 2 such that Formula 1 above represents a neutral bulky ligand metallocene catalyst compound. Non-limiting examples of Q* ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q*'s form a part of a fused ring or ring system. Other examples of Q* ligands include those substituents for R* as described above and including cyclobutyl, cyclohexyl, heptyl, tolyl, trifluoromethyl, tetramethylene (both Q*), pentamethylene (both Q*), methylidene (both Q*), methoxy, ethoxy, propoxy, phenoxy, bis(N-methylanilide), dimethylamide, dimethylphosphide radicals and the like.

In another embodiment, the catalyst composition of the invention may include one or more bulky ligand metallocene catalyst compounds where $L^A$ and $L^B$ of Formula 1 are bridged to each other by at least one bridging group, A*, as represented by Formula 2.

$$L^A A^* L^B M Q^*_n \qquad (2)$$

The compounds of Formula 2 are known as bridged, bulky ligand metallocene catalyst compounds. $L^A$, $L^B$, M, Q* and n are as defined above. Non-limiting examples of bridging group A* include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A* contains a carbon, silicon or germanium atom, most preferably A* contains at least one silicon atom or at least one carbon atom. The bridging group A* may also contain substituent groups R* as defined above including halogens and iron.

Non-limiting examples of bridging group A* may be represented by R'$_2$C, R'$_2$CCR'$_2$, R'$_2$Si, R'$_2$SiCR'$_2$, R'$_2$SiSiR'$_2$ R'$_2$Ge, R'P, R'N, R'B where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of Formula 2 have two or more bridging groups A* (EP 664 301 B1). In another embodiment, the bulky ligand metallocene catalyst compounds are those where the R* substituents on the bulky ligands $L^A$ and $L^B$ of Formulas 1 and 2 are substituted with the same or different number of substituents on each of the bulky ligands. In another embodiment, the bulky ligands $L^A$ and $L^B$ of Formulas 1 and 2 are different from each other.

Other bulky ligand metallocene catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference for the purposes of U.S. prosecution practice.

In another embodiment, the catalyst compositions of the invention may include bridged heteroatom, mono-bulky ligand metallocene compounds. These types of catalysts and catalyst systems are described in, for example, PCT publication WO 92/00333, WO 94/07928, WO 91/04257, WO 94/03506, W096/00244, WO 97/15602 and WO 99/20637 and U.S. Pat. Nos. 5,057,475, 5,096,867, 5,055,438, 5,198, 401, 5,227,440 and 5,264,405 and European publication EP-A-0 420 436, all of which are herein fully incorporated by reference.

In another embodiment, the catalyst composition of the invention includes one or more bulky ligand metallocene catalyst compounds represented by Formula

$$L^C A^* J^* M Q^*_n \quad (3)$$

where M is a Group 3 to 16 metal atom or a metal selected from the Group of actinides and lanthanides of the Periodic Table of Elements, preferably M is a Group 3 to 12 transition metal, and more preferably M is a Group 4, 5 or 6 transition metal, and most preferably M is a Group 4 transition metal in any oxidation state, and is especially titanium; $L^C$ is a substituted or unsubstituted bulky ligand bonded to M; J* is bonded to M; A* is bonded to J* and $L^C$; J* is a heteroatom ancillary ligand; and A* is a bridging group; Q* is a univalent anionic ligand; and n is the integer 0, 1 or 2. In Formula 3 above, $L^C$, A* and J* form a fused ring system. In an embodiment, $L^C$ of Formula 3 is as defined above for $L^A$. A*, M and Q* of Formula 3 are as defined above in Formula 1. In Formula 3, J* is a heteroatom containing ligand in which J* is an element with a coordination number of three from Group 15 or an element with a coordination number of two from Group 16 of the Periodic Table of Elements. Preferably J* contains a nitrogen, phosphorus, oxygen or sulfur atom with nitrogen being most preferred. In an embodiment of the invention, the bulky ligand metallocene catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin.

Examples of these bulky ligand metallocene catalyst compounds are described in WO 96/33202, WO 96/34021, WO 97/17379 and WO 98/22486 and EP-A1-0 874 005 and U.S. Pat. Nos. 5,637,660, 5,539,124, 5,554,775, 5,756,611, 5,233, 049, 5,744,417, and 5,856,258 all of which are herein incorporated by reference.

In one embodiment, the bulky ligand metallocene compounds (pre-catalysts) are those complexes based on bidentate ligands containing pyridine or quinoline moieties, such as those described in U.S. application Ser. No. 09/103,620 filed Jun. 23, 1998, now U.S. Pat No. 6,103,657, which is herein incorporated by reference. In another embodiment, the bulky ligand metallocene catalyst compounds are those described in PCT publications WO 99/01481 and WO 98/42664, which are fully incorporated herein by reference.

In another embodiment, the bulky ligand metallocene catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In another embodiment, the bulky ligand metallocene catalyst compounds are those described in PCT publications WO 99/01481 and WO 98/42664, which are fully incorporated herein by reference.

Useful Group 6 bulky ligand metallocene catalyst systems are described in U.S. Pat. No. 5,942,462, which is incorporated herein by reference. Still other useful catalysts include those multinuclear metallocene catalysts as described in WO 99/20665 and U.S. Pat. No. 6,010,794, and transition metal metaaracyle structures described in EP 0 969 101 A2, which are herein incorporated herein by reference. Other metallocene catalysts include those described in EP 0 950 667 A1, double cross-linked metallocene catalysts (EP 0 970 074 A1), tethered metallocenes (EP 970 963 A2) and those sulfonyl catalysts described in U.S. Pat. No. 6,008,394, which are incorporated herein by reference.

It is also contemplated that in one embodiment the bulky ligand metallocene catalysts, described above, include their structural or optical or enantiomeric isomers (meso and racemic isomers, for example see U.S. Pat. No. 5,852,143, incorporated herein by reference) and mixtures thereof.

It is further contemplated that any one of the bulky ligand metallocene catalyst compounds, described above, have at least one fluoride or fluorine containing leaving group as described in U.S. Pat. No. 6,632,901.

The Group 15 containing metal compounds utilized in the catalyst composition of the invention are prepared by methods known in the art, such as those disclosed in EP 0 893 454 A1, U.S. Pat. No. 5,889,128 and the references cited in U.S. Pat. No. 5,889,128 which are all herein incorporated by reference. U.S. Pat. No. 6,271,325 discloses a gas or slurry phase polymerization process using a supported bisamide catalyst, which is also incorporated herein by reference.

For additional information of Group 15 containing metal compounds, please see Mitsui Chemicals, Inc. in EP 0 893 454 A1 which discloses transition metal amides combined with activators to polymerize olefins.

In one embodiment the Group 15 containing metal compound is allowed to age prior to use as a polymerization. It has been noted on at least one occasion that one such catalyst compound (aged at least 48 hours) performed better than a newly prepared catalyst compound.

Preferred Metallocene Catalysts

The catalyst system useful to produce the elastomeric composition of the present invention comprises at least one compound capable of producing the above described elastomeric composition, preferably the elastomeric composition comprising syndiotactic rich polypropylene. Accordingly, any catalysts, including supported catalysts, which can be used together or in series, that can also produce the desired polypropylene elastomeric composition can be utilized in this invention to produce the elastomeric composition of the present invention. Preferred catalysts include cyclopentadienyl transition metals compounds and derivatives thereof used in conjunction with an alumoxane and/or a compatible non-coordinating anion.

The preferred metallocene catalysts used in this invention can more specifically be represented by one of the following general formulae:

(4)

(5)

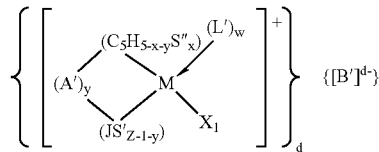

(6)

wherein:

(A-Cp) is either (Cp), (Cp*) or Cp-A'-Cp*; Cp and Cp* are the same or different cyclopentadienyl rings substituted with from zero to five substituent groups S'', each substituent group S'' being, independently, a C1-C40 radical group which is a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radicals, or Cp and Cp* are cyclopentadienyl rings in which any two adjacent S'' groups are joined forming a $C_4$ to $C_{20}$ ring to give a saturated or unsaturated polycyclic cyclopentadienyl ligand; Cp and Cp* may also have one or two carbon atoms within the ring replaced by a Group 15 or 16 element especially, S, O, N or P;

A' is a bridging group;

$(C_5H_{5-y-x}S''_x)$ is a cyclopentadienyl ring substituted with from zero to five S'' radicals as defined above;

x is from 0 to 5 denoting the degree of substitution;

M is titanium, zirconium or hafnium;

$X_1$ is a hydride radical, hydrocarbyl radical, substituted-hydrocarbyl radical, hydrocarbyl-substituted organometalloid radical or halocarbyl-substituted organometalloid radical which radical may optionally be covalently bonded to both or either M and L or L' or all or any M, S'' or S', and provided that $X_1$ is not a substituted or unsubstituted cyclopentadienyl ring;

$(JS'_{z-1-y})$ is a heteroatom ligand in which J is an element from Group 15 of the Periodic Table of Elements with a coordination number of 3 or an element from Group 16 with a coordination number of 2; S' is a radical group which is a hydrocarbyl, substituted hydrocarbyl, halocarbyl, substituted halocarbyl, hydrocarbyl-substituted organometalloid, or halocarbyl-substituted organometalloid; and z is the coordination number of the element J;

y is 0 or 1;

L is an olefin, diolefin or aryne ligand. L' is the same as L, and can additionally be an amine, phosphine, ether, or sulfide ligand, or any other neutral Lewis base; L' can also be a second transition metal compound of the same type such that the two metal center M and M* are bridged by $X_1$ and $X'_1$, wherein M* has the same meaning as M, $X'_1$, $X_2$ and $X'_2$ have the same meaning as $X_1$, where such dimeric compounds which are precursors to the cationic portion of the catalyst are represented by the formula:

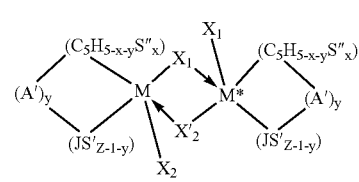

(7)

wherein w is an integer from 0 to 3;

B' is a chemically stable, non-nucleophilic anionic complex having a molecular diameter about or greater than 4 angstroms or an anionic Lewis-acid activator resulting from the reaction of a Lewis-acid activator with the precursor to the cationic portion of the catalyst system described in formulae 1-4. When B' is a Lewis-acid activator, $X_1$ can also be an alkyl group donated by the Lewis-acid activator; and d is an integer representing the charge of B'.

The catalysts are preferably prepared by combining at least two components, an activator and a catalyst precursor. In one preferred method, the first component is a cyclopentadienyl derivative of a Group 4 metal compound containing at least one ligand which will combine with the second component or at least a portion thereof such as a cation portion thereof. The second component is an ion-exchange compound comprising a cation which will irreversibly react with at least one ligand contained in said Group 4 metal compound (first component) and a non-coordinating anion which is either a single coordination complex comprising a plurality of lipophilic radicals covalently coordinated to and shielding a central formally charge-bearing metal or metalloid atom or an anion comprising a plurality of boron atoms such as polyhedral boranes, carboranes and metallacarboranes.

In general, suitable anions for the second component may be any stable and bulky anionic complex having the following molecular attributes: 1) the anion should have a molecular diameter greater than 4 angstroms; 2) the anion should form stable ammonium salts; 3) the negative charge on the anion should be delocalized over the framework of the anion or be localized within the core of the anion; 4) the anion should be a relatively poor nucleophile; and 5) the anion should not be a powerful reducing to oxidizing agent. Anions meeting these criteria—such as polynuclear boranes, carboranes, metallacarboranes, polyoxoanions and anionic coordination complexes are well described in the chemical literature.

The cation portion of the second component may comprise Bronsted acids such as protons or protonated Lewis bases or may comprise Lewis acids such as ferricinum, tropylium, triphenylcarbenium or silver cations.

In another preferred method, the second component is a Lewis-acid complex which will react with at least one ligand of the first component, thereby forming an ionic species described in formulae 4-6 with the ligand abstracted from the first component now bound to the second component. Alumoxanes and especially methylalumoxane, the product formed from the reaction of trimethylaluminum in an aliphatic or aromatic hydrocarbon with stoichiometric quantities of water, are particularly preferred Lewis-acid second components. Modified alumoxanes are also preferred. Alumoxanes are well known in the art and methods for their preparation are illustrated by U.S. Pat. Nos. 4,542,199; 4,544, 762; 5,015,749; and 5,041,585. A technique for preparing modified alumoxanes has been disclosed in U.S. Pat. No. 5,041,584, in EPA 0 516 476, and in EPA 0 561 476, which are incorporated by reference herein.

Upon combination of the first and second components, the second component reacts with one of the ligands of the first component, thereby generating an anion pair consisting of a Group 4 metal cation and the aforementioned anion, which anion is compatible with and non-coordinating towards the Group 4 metal cation formed from the first component. The anion of the second compound must be capable of stabilizing the Group 4 metal cation's ability to function as a catalyst and must be sufficiently labile to permit displacement by an olefin, diolefin or an acetylenically unsaturated monomer during polymerization. The catalysts of this invention may be supported. U.S. Pat. No. 4,808,561, issued Feb. 28, 1989; U.S. Pat. No. 4,897,455 issued Jan. 3, 1990; U.S. Pat. No. 5,057, 475 issued Oct. 15, 1991; U.S. patent application Ser. No. 459,921, now abandoned, (published as PCT International publication WO 91/09882), Canadian Patent 1,268,753, U.S. Pat. No. 5,240,894 and WO 94 03506 disclose such supported catalysts and the methods to produce such and are herein incorporated by reference.

The Group 4 metal compounds; i.e., titanium, zirconium and hafnium metallocene compounds, useful as first compounds (pre-catalysts) in the preparation of the preferred metallocene catalysts of this invention are cyclopentadienyl derivatives of titanium, zirconium and hafnium. In general, useful titanocenes, zirconocenes and hafnocenes may be represented by the following general formulae:

  (8)

  (9)

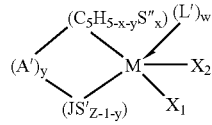  (10)

wherein:

(A-Cp) is either (Cp)(Cp*) or Cp-A'-Cp*; Cp and Cp* are the same or different cyclopentadienyl rings substituted with from zero to five substituent groups S", each substituent group S" being, independently, a radical group which is a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radicals, or Cp and Cp* are cyclopentadienyl rings in which any two adjacent S" groups are joined forming a $C_4$ to $C_{20}$ ring to give a saturated or unsaturated polycyclic cyclopentadienyl ligand;

A' is a bridging group;

y is 0 or 1;

$(C_5H_{5-y-x}S"_x)$ is a cyclopentadienyl ring substituted with from zero to five S" radicals as defined above;

x is from 0 to 5 denoting the degree of substitution;

$(JS'_{z-1-y})$ is a heteroatom ligand in which J is an element from Group 15 of the Periodic Table of Elements with a coordination number of 3 or an element from Group 16 with a coordination number of 2, S' is a radical group which is a hydrocarbyl, substituted hydrocarbyl, halocarbyl, substituted halocarbyl, hydrocarbyl-substituted organometalloid, or halocarbyl-substituted organometalloid; and z is the coordination number of the element J;

L is an olefin, diolefin or aryne ligand. L' is the same as L and can additionally be an amine, phosphine, ether, or sulfide ligand, or any other neutral Lewis base; L' can also be a second transition metal compound of the same type such that the two metal centers M and M* are bridged by $X_1$ and $X'_1$, wherein M* has the same meaning as M, $X'_1$ has the same meaning as $X_1$ and $X'_2$ has the same meaning as $X_2$ where such dimeric compounds which are precursors to the cationic portion of the catalyst are represented by formula 7 above;

w is an integer from 0 to 3; and $X_1$ and $X_2$ are, independently, hydride radicals, hydrocarbyl radicals, substituted hydrocarbyl radicals, halocarbyl radicals, substituted halocarbyl radicals, and hydrocarbyl- and halocarbyl-substituted organometalloid radicals, substituted pnictogen radicals, or substituted chalcogen radicals; or $X_1$ and $X_2$ are joined and bound to the metal atom to form a metallacycle ring containing from about 3 to about 20 carbon atoms; or $X_1$ and $X_2$ together can be an olefin, diolefin or aryne ligand; or when Lewis-acid activators, such as methylalumoxane, which are capable of donating an $X_1$ ligand as described above to the transition metal component are used, $X_1$ and $X_2$ may independently be a halogen, alkoxide, aryloxide, amide, phosphide or other univalent anionic ligand or both $X_1$ and $X_2$ can also be joined to form a anionic chelating ligand and with the proviso that $X_1$ and $X_2$ are not a substituted or unsubstituted cyclopentadienyl ring.

Illustrative compounds of formula 8 include: bis(cyclopentadienyl)hafnium dimethyl, ethylenebis(tetrahydroindenyl) zirconium dihidryde, bis(pentamethyl)zirconium diethyl, dimethylsilyl(1-fluorenyl)(cyclopentadienyl)titanium dichloride and the like. Illustrative compounds of the formula 9 type are: bis(cyclopentadienyl)(1,3-butadiene)zirconium, bis(cyclopentadienyl)(2,3-dimethyl-1,3-butadiene)zirconium, bis(pentamethylcyclopentadienyl)(benzene)zirconium, bis(pentamethylcyclopentadienyl)titanium ethylene and the like.

Illustrative compounds of formula 10 include: dimethylsilyl(tetramethylcyclopentadienyl)(t-butylamido)zirconium dichloride, ethylene(methylcyclopentadienyl)(phenylamido) titanium dimethyl, methylphenylsilyl(indenyl)(phenyphosphido)hafnium dihydride and (pentamethylcyclopentadienyl)(di-t-butylamido)hafnium dimethoxide.

The conditions under which complexes containing neutral Lewis base ligands such as ether or those which form dimeric compounds is determined by the steric bulk of the ligands about the metal center. For example, the t-butyl group in $Me_2Si(Me_4C_5)(N-t-Bu)ZrCl_2$ has greater steric requirements that the phenyl in $Me_2Si(Me_4C_5)(NPh)ZrCl_2.Et_2O$ thereby not permitting ether coordination in the former compound in its solid state. Similarly, due to the decreased steric bulk of the trimethylsilylcyclopentadienyl group in $[Me_2Si (Me_3SiC_5H_3)(N-t-Bu)ZrCl_2]_2$ versus that of the tetramethylcyclopentadienyl group in $Me_2Si(Me_4C_5)(N-t-Bu)ZrCl_2$, the former compound is dimeric and the latter is not.

In an embodiment, the preferred catalyst is represented by equation 17:

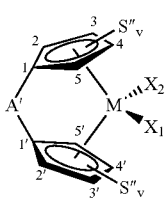

(17)

wherein A', M, $X_1$ and $X_2$ are as previously defined. Substituents $S''_v$ are independently defined as S" in equations 8-9 where the subscript "v" denotes the carbon atom on the Cp-ring to which the substituent is bonded.

Preferred examples include:

dimethylsilylbis(indenyl) zirconium dichloride, dimethylsilylbis(indenyl) zirconium dimethyl, diphenylsilylbis(indenyl) zirconium dichloride, diphenylsilylbis(indenyl) zirconium dimethyl, methylphenylsilylbis(indenyl) zirconium dichloride, methylphenylsilylbis(indenyl) zirconium dimethyl, ethylenebis(indenyl) zirconium dichloride, ethylenebis(indenyl) zirconium dimethyl, methylenebis(indenyl) zirconium dichloride, methylenebis(indenyl) zirconium dimethyl, dimethylsilylbis(indenyl) hafnium dichloride, dimethylsilylbis(indenyl) hafnium dimethyl, diphenylsilylbis(indenyl) hafnium dichloride, diphenylsilylbis(indenyl) hafnium dimethyl, methylphenylsilylbis(indenyl) hafnium dichloride, methylphenylsilylbis(indenyl) hafnium dimethyl, ethylenebis(indenyl) hafnium dichloride, ethylenebis(indenyl) hafnium dimethyl, methylenebis(indenyl) hafnium dichloride, methylenebis(indenyl) hafnium dimethyl, dimethylsilylbis(tetrahydroindenyl) zirconium dichloride, dimethylsilylbis(tetrahydroindenyl) zirconium dimethyl, diphenylsilylbis(tetrahydroindenyl) zirconium dichloride, diphenylsilylbis(tetrahydroindenyl) zirconium dimethyl, methylphenylsilylbis(tetrahydroindenyl) zirconium dichloride, methylphenylsilylbis(tetrahydroindenyl) zirconium dimethyl, ethylenebis(tetrahydroindenyl) zirconium dichloride, ethylenebis(tetrahydroindenyl) zirconium dimethyl, methylenebis(tetrahydroindenyl) zirconium dichloride, methylenebis(tetrahydroindenyl) zirconium dimethyl, dimethylsilylbis(tetrahydroindenyl) hafnium dichloride, dimethylsilylbis(tetrahydroindenyl) hafnium dimethyl, diphenylsilylbis(tetrahydroindenyl) hafnium dichloride, diphenylsilylbis(tetrahydroindenyl) hafnium dimethyl, methylphenylsilylbis(tetrahydroindenyl) hafnium dichloride, methylphenylsilylbis(tetrahydroindenyl) hafnium dimethyl, ethylenebis(tetrahydroindenyl) hafnium dichloride, ethylenebis(tetrahydroindenyl) hafnium dimethyl, methylenebis(tetrahydroindenyl) hafnium dichloride, methylenebis(tetrahydroindenyl) hafnium dimethyl, dimethylsilylbis(2-methylindenyl) zirconium dichloride, dimethylsilylbis(2-methylindenyl) zirconium dimethyl, diphenylsilylbis(2-methylindenyl) zirconium dichloride, diphenylsilylbis(2-methylindenyl) zirconium dimethyl, methylphenylsilylbis(2-methylindenyl) zirconium dichloride, methylphenylsilylbis(2-methylindenyl) zirconium dimethyl, ethylenebis(2-methylindenyl) zirconium dichloride, ethylenebis(2-methylindenyl) zirconium dimethyl, methylenebis(2-methylindenyl) zirconium dichloride, methylenebis(2-methylindenyl) zirconium dimethyl, dimethylsilylbis(2-methylindenyl) hafnium dichloride, dimethylsilylbis(2-methylindenyl) hafnium dimethyl, diphenylsilylbis(2-methylindenyl) hafnium dichloride, diphenylsilylbis(2-methylindenyl) hafnium dimethyl, methylphenylsilylbis(2-methylindenyl) hafnium dichloride, methylphenylsilylbis(2-methylindenyl) hafnium dimethyl, ethylenebis(2-methylindenyl) hafnium dichloride, ethylenebis(2-methylindenyl) hafnium dimethyl, methylenebis(2-methylindenyl) hafnium dichloride, methylenebis(2-methylindenyl) hafnium dimethyl, dimethylsilylbis(2-methyl4-phenylindenyl) zirconium dichloride, diphenylsilylbis(2-methyl4-phenylindenyl) zirconium dimethyl, diphenylsilylbis(2-methyl4-phenylindenyl) zirconium dichloride, diphenylsilylbis(2-methyl-4-phenylindenyl) zirconium dimethyl, methylphenylsilylbis(2-methyl-4-phenylindenyl) zirconium dichloride, methylphenylsilylbis(2-methyl4-phenylindenyl) zirconium dimethyl, ethylenebis(2-methyl4-phenylindenyl) zirconium dichloride, ethylenebis(2-methyl4-phenylindenyl) zirconium dimethyl, methylenebis(2-methyl-4-phenylindenyl) zirconium dichloride, methylenebis(2-methyl4-phenylindenyl) zirconium dimethyl, dimethylsilylbis(2-methyl-4-phenylindenyl) hafnium dichloride, dimethylsilylbis(2-methyl-4-phenylindenyl) hafnium dimethyl, diphenylsilylbis(2-methyl-4-phenylindenyl) hafnium dichloride, diphenylsilylbis(2-methyl4-phenylindenyl) hafnium dimethyl, methylphenylsilylbis(2-methyl-4-phenylindenyl) hafnium dichloride, methylphenylsilylbis(2-methyl4-phenylindenyl) hafnium dimethyl, ethylenebis(2-methyl4-phenylindenyl) hafnium dichloride, ethylenebis(2-methyl4-phenylindenyl) hafnium dimethyl, methylenebis(2-methyl4-phenylindenyl) hafnium dichloride, methylenebis(2-methyl4-phenylindenyl) hafnium dimethyl, dimethylsilylbis(4,7-dimethylindenyl) zirconium dichloride, dimethylsilylbis(4,7-dimethylindenyl) zirconium dimethyl, diphenylsilylbis(4,7-dimethylindenyl) zirconium dichloride, diphenylsilylbis(4,7-dimethylindenyl) zirconium dimethyl, methylphenylsilylbis(4,7-dimethylindenyl) zirconium dichloride, methylphenylsilylbis(4,7-dimethylindenyl) zirconium dimethyl, ethylenebis(4,7-dimethylindenyl) zirconium dichloride, ethylenebis(4,7-dimethylindenyl) zirconium dimethyl, methylenebis(4,7-dimethylindenyl) zirconium dichloride, methylenebis(4,7-dimethylindenyl) zirconium dimethyl, dimethylsilylbis(4,7-dimethylindenyl) hafnium dichloride, dimethylsilylbis(4,7-dimethylindenyl) hafnium dimethyl, diphenylsilylbis(4,7-dimethylindenyl) hafnium dichloride, diphenylsilylbis(4,7-dimethylindenyl) hafnium dimethyl, methylphenylsilylbis(4,7-dimethylindenyl) hafnium dichloride, methylphenylsilylbis(4,7-dimethylindenyl) hafnium dimethyl, ethylenebis(4,7-dimethylindenyl) hafnium dichloride, ethylenebis(4,7-dimethylindenyl) hafnium dimethyl, methylenebis(4,7-dimethylindenyl) hafnium dichloride, methylenebis(4,7-dimethylindenyl) hafnium dimethyl, dimethylsilylbis(2-methyl-4-napthylindenyl) zirconium dichloride, dimethylsilylbis(2-methyl-4-napthylindenyl) zirconium dimethyl, diphenylsilylbis(2-methyl-4-napthylindenyl) zirconium dichloride, diphenylsilylbis(2-methyl4-napthylindenyl) zirconium dimethyl, methylphenylsilylbis(2-methyl4-napthylindenyl) zirconium dichloride, methylphenylsilylbis(2-methyl-4-napthylindenyl) zirconium dimethyl, ethylenebis(2-methyl4-napthylindenyl) zirconium dichloride, ethylenebis(2-methyl4-napthylindenyl) zirconium dimethyl, methylenebis(2-methyl-4-napthylindenyl) zirconium dichloride, methylenebis(2-methyl4-napthylindenyl) zirconium dimethyl, dimethylsilylbis(2-methyl4-napthylindenyl) hafnium dichloride, dimethylsilylbis(2-methyl4-napthylindenyl) hafnium dimethyl, diphenylsilylbis(2-methyl-4-napthylindenyl) hafnium dichloride, diphenylsilylbis(2-methyl4-napthylindenyl) hafnium dimethyl, methylphenylsilylbis(2-methyl-4-napthylindenyl) hafnium dichloride, methylphenylsilylbis(2-methyl-4-napthylindenyl) hafnium dimethyl, ethylenebis(2-methyl4-napthylindenyl) hafnium dichloride, ethylenebis(2-methyl-4-napthylindenyl) hafnium dimethyl, methylenebis(2-methyl4-napthylindenyl) hafnium dichloride, methylenebis(2-methyl4-napthylindenyl) hafnium dimethyl, dimethylsilylbis(2,3-dimethylcyclopentadienyl) zirconium dichloride, dimethylsilylbis(2,3-dimethylcyclopentadienyl) zirconium dimethyl, diphenylsilylbis(2,3-dimethylcyclopentadienyl) zirconium dichloride, diphenylsilylbis(2,3-dimethylcyclopentadienyl) zirconium dimethyl, methylphenylsilylbis(2,3-dimethylcyclopentadienyl) zirconium dichloride, methylphenylsilylbis(2,3-dimethylcyclopentadienyl) zirconium dimethyl, ethylenebis(2,3-dimethylcyclopentadienyl) zirconium dichloride, ethylenebis(2,3-dimethylcyclopentadienyl) zirconium dimethyl, methylenebis(2,3-dimethylcyclopentadienyl) zirconium dichloride, methylenebis(2,3-dimethylcyclopentadienyl) zirconium dimethyl, dimethylsilylbis(2,3-dimethylcyclopentadienyl) hafnium dichloride, dimethylsilylbis(2,3dimethylcyclopentadienyl) hafnium dimethyl, diphenylsilylbis(2,3-dimethylcyclopentadienyl) hafnium dichloride, diphenylsilylbis(2,3-dimethylcyclopentadienyl) hafnium dimethyl, methylphenylsilylbis(2,3-dimethylcyclopentadienyl) hafnium dichloride, methylphenylsilylbis(2,3-dimethylcyclopentadienyl) hafnium dimethyl, ethylenebis(2,3-dimethylcyclopentadienyl) hafnium dichloride, ethylenebis(2,3-dimethylcyclopentadienyl) hafnium dimethyl, methylenebis(2,3-dimethylcyclopentadienyl) hafnium dichloride, methylenebis(2,3-dimethylcyclopentadienyl) hafnium dimethyl, dimethylsilylbis(3-trimethylsilylcyclopentadienyl) zirconium dichloride, dimethylsilylbis(3-trimethylsilylcyclopentadienyl) zirconium dimethyl, diphenylsilylbis(3-trimethylsilylcyclopentadienyl) zirconium dichloride, diphenylsilylbis(3-trimethylsilylcyclopentadienyl) zirconium dimethyl, methylphenylsilylbis(3-trimethylsilylcyclopentadienyl) zirconium dichloride, methylphenylsilylbis(3-trimethylsilylcyclopentadienyl) zirconium dimethyl, ethylenebis(3-trimethylsilylcyclopentadienyl) zirconium dichloride, ethylenebis(3-trimethylsilylcyclopentadienyl) zirconium dimethyl, methylenebis(3-trimethylsilylcyclopentadienyl) zirconium dichloride, methylenebis(3-trimethylsilylcyclopentadienyl) zirconium dimethyl, dimethylsilylbis(3-trimethylsilylcyclopentadienyl) hafnium dichloride, dimethylsilylbis(3-trimethylsilylcyclopentadienyl) hafnium dimethyl, diphenylsilylbis(3-trimethylsilylcyclopentadienyl) hafnium dichloride, diphenylsilylbis(3-trimethylsilylcyclopentadienyl) hafnium dimethyl, methylphenylsilylbis(3-trimethylsilylcyclopentadienyl) hafnium dichloride, methylphenylsilylbis(3-trimethylsilylcyclopentadienyl) hafnium dimethyl, ethylenebis(3-trimethylsilylcyclopentadienyl) hafnium dichloride, ethylenebis(3-trimethylsilylcyclopentadienyl) hafnium dimethyl, methylenebis(3-trimethylsilylcyclopentadienyl) hafnium dichloride, methylenebis(3-trimethylsilylcyclopentadienyl) hafnium dimethyl, dimethylsilylbis(indenyl) zirconium dichloride, dimethylsilylbis(indenyl) zirconium dimethyl, ethylenebis(indenyl) zirconium dichloride, ethylenebis(indenyl) zirconium dimethyl, dimethylsilylbis(tetrahydorindenyl) zirconium dichloride, dimethylsilylbis(tetrahydorindenyl) zirconium dimethyl, ethylenebis(tetrahydorindenyl) zirconium dichloride, ethylenebis(tetrahydorindenyl) zirconium dimethyl, dimethylsilylbis(2-methylindenyl) zirconium dichloride, dimethylsilylbis(2-methylindenyl) zirconium dimethyl, ethylenebis(2-methylindenyl) zirconium dichloride, ethylenebis(2-methylindenyl) zirconium dimethyl, dimethylsilylbis(2-methyl-4 phenylindenyl) zirconium dichloride, dimethylsilylbis(2-methyl-4-phenylindenyl) zirconium dimethyl, ethylenebis(2-methyl-4-phenylindenyl) zirconium dichloride, ethylenebis(2-methyl-4-phenylindenyl) zirconium dimethyl, dimethylsilylbis(4,7-dimethylindenyl) zirconium dichloride, dimethylsilylbis(4,7-dimethylindenyl) zirconium dimethyl, ethylenebis(4,7-dimethylindenyl) zirconium dichloride, ethylenebis(4,7-dimethylindenyl) zirconium dimethyl, dimethylsilylbis(indenyl) hafnium dichloride, dimethylsilylbis(indenyl) hafnium dimethyl, ethylenebis(indenyl) hafnium dichloride, ethylenebis(indenyl) hafnium dimethyl, dimethylsilylbis(tetrahydorindenyl) hafnium dichloride, dimethylsilylbis(tetrahydorindenyl) hafnium dimethyl, ethylenebis(tetrahydorindenyl) hafnium dichloride, ethylenebis(tetrahydorindenyl) hafnium dimethyl, dimethylsilylbis(2-methylindenyl) hafnium dichloride, dimethylsilylbis(2-methylindenyl) hafnium dimethyl, ethylenebis(2-methylindenyl) hafnium dichloride, ethylenebis(2-methylindenyl) hafnium dimethyl, dimethylsilylbis(2-methyl-4-phenylindenyl) hafnium dichloride, dimethylsilylbis(2-methyl-4-phenylindenyl) hafnium dimethyl, ethylenebis(2-methyl-4-phenylindenyl) hafnium dichloride, ethylenebis(2-methyl-4-phenylindenyl) hafnium dimethyl, dimethylsilylbis(4,7-dimethylindenyl) hafnium dichloride, dimethylsilylbis(4,7-dimethylindenyl) hafnium dimethyl, ethylenebis(4,7-dimethylindenyl) hafnium dichloride, ethylene bis(4,7-dimethylindenyl) hafnium dimethyl, and the like.

Metallocene precursors which may be useful to provide tacticity control include those where (A-Cp) is (Cp) (Cp*), both Cp and Cp* have substituents on the cyclopentadienyl rings of sufficient steric bulk to restrict rotation of the cyclopentadienyl ligands such that the aforementioned symmetry conditions are satisfied. Preferable chiral racemic metallocenes of this type include:

bis(tricyclo[5.2.1.0$^{2,6}$]deca-2,5-dienyl) zirconium and -hafnium dimethyl, bis((1R)-9,9-dimethyltricyclo[6.1.1.0$^{2,6}$] deca-2,5-dienyl) zirconium dimethyl, bis(tricyclo[5.2.1.0$^{2,6}$] deca-2,5,8-trienyl) zirconium dimethyl, bis(tricyclo[5.2.2.0$^{2,6}$]undeca-2,5,8-trienyl)zirconium and -hafnium dimethyl and bis((1R,8R)-7,7,9,9-tetramethyl[6.1.1.0$^{2,6}$]deca-2,5-dienyl) zirconium and -hafnium dimethyl.

Preferred metallocene precursors for the production of elastomers having enhanced syndiotactic character are also those of Equation 17 where S" are independently chosen such that the two Cp-ligands have substantially different steric bulk. In order to produce a syndiotactic polymer the pattern of the groups substituted on the Cp-rings is important. Thus, by steric difference or sterically different as used herein, it is intended to imply a difference between the steric characteristics of the Cp and Cp* rings that renders each to be symmetrical with respect to the A bridging group but different with respect to each other that controls the approach of each successive monomer unit that is added to the polymer chain. The steric difference between the Cp and Cp* rings act to block the approaching monomer from a random approach such that the monomer is added to the polymer chain in the syndiotactic configuration.

Preferable metallocene precursors for the production of syndiotactic polymers useful as elastomers are those of Equation 17 where S" are independently chosen such that 1) the steric difference between the two Cp-ligands is maximized and 2) there remains a plane of symmetry through the metal center and the $C_1$ and $C_{1'}$ carbon atoms of the Cp-rings in Equation 17. Thus, complexes such as Me$_2$C(N$^5$—C$_5$H$_4$)(1-fluorenyl)MMe$_2$ (where M=Ti, Zr, or Hf) which possess this symmetry are preferred, and generally produce the syndiotactic polymer with higher degrees of stereoregularity than similar, but less symmetric, systems. Additionally, in the above equation, 1-fluorenyl may be substituted with 3,8-di-t-butylfluorenyl, octahydrofluorenyl or 3,3,6,6,9,9,12,12-octamethyl-4,4,5,5,10,10,11,11-octahydrodibenzo[b,h]fluorene. Because catalysts precursors of this type often lose there ability to control the stereoregularity of the polymer under high temperature reaction conditions, in an embodiment in which it may be beneficial to insure higher crystallinity in the material, using these catalysts at lower reactor temperatures, preferably at temperatures below 80° C. may be required.

In addition, formation of an amorphous polymer fraction may be enhanced utilizing a catalyst precursor that is a mono-cyclopentadienyl transition metal component illustrated in equation 18:

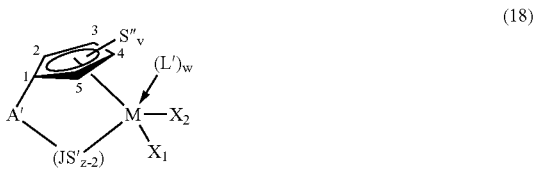

(18)

where A', J, S', $X_1$, $X_2$, L', z and w as are previously defined and M is titanium. Substituent $S''_v$ is defined to be the same as S" in equation 10 where the subscript "v" denotes the carbon atom on the cyclopentadienyl ring to which the substituent is bonded and where there can be zero, two or four substituents, S", on the cyclopentadienyl ring provided that the cyclopentadienyl ring is symmetrically substituted. Symmetrically substituted is defined to mean that the cyclopentadienyl ring is substituted in the 2 and 5 positions and/or 3 and 4 positions with S" groups that are of approximately of the same steric bulk. Typically the size of these S" groups are within 2 carbons of each other. Thus a cyclopentadienyl substituted at the 2 and the 5 positions with methyl and ethyl respectively, or substituted at the 3 and the 4 positions with hexyl and octyl, respectively, would be considered symmetric. Likewise, the cyclopentadienyl ring may be substituted at all four sites with S" groups and be considered symmetric as long as each of the symmetrical pairs are of similar steric bulk. Additionally, two adjacent S"-groups in the 3 and 4 position may be linked to form a ring provided that the new ring is also symmetrically substituted.

Catalyst systems of this type are known to impart 2,1-mistakes when incorporating C3 and higher olefins. The pre-catalysts where S' is bonded to the nitrogen ligand (J) via a 3° carbon (for example when S' is tert-butyl or 1-adamantyl) have fewer 2,1-mistakes then when S' is bonded to the nitrogen ligand (J) via a 1° carbon (for example when S' is n-butyl, methyl, or benzyl) or 2° carbon (for example when S' is cyclododecyl, cyclohexyl, or sec-butyl). The 2,1-mistakes in the polymer backbone impart $(CH_2)_2$ units that can be beneficial to the polymer properties. Lower Mw versions of such polymers can be produced by changing process condition, for example, by increasing reactor temperature. For additional information, see U.S. Pat. No. 5,723,560, which is incorporated herein by reference.

Preferred examples of mono-cyclopentadienyl transition metal compounds include:
dimethylsilyl(tetramethylcyclopentadienyl)(cyclododecylamido) titanium dichloride, dimethylsilyl(tetramethylcyclopentadienyl)(cyclohexylamido) titanium dichloride, dimethylsilyl(tetramethylcyclopentadienyl)(1-adamantylamido) titanium dichloride, dimethylsilyl(tetramethylcyclopentadienyl)(t-butylamido) titanium dichloride, dimethylsilyl(tetramethylcyclopentadienyl)(s-butylamido) titanium dichloride, dimethylsilyl(tetramethylcyclopentadienyl)(n-butylamido) titanium dichloride, dimethylsilyl(tetramethylcyclopentadienyl)(exo-2-norbornylamido) titanium dichloride, diethylsilyl(tetramethylcyclopentadienyl)(cyclododecylamido) titanium dichloride, diethylsilyl(tetramethylcyclopentadienyl)(exo-2-norbornylamido) titanium dichloride, diethylsilyl(tetramethylcyclopentadienyl)(cyclohexylamido) titanium dichloride, diethylsilyl(tetramethylcyclopentadienyl)(1-adamantylamido) titanium dichloride, diethylsilyl(tetramethylcyclopentadienyl)(t-butylamido) titanium dichloride, methylene(tetramethylcyclopentadienyl)(cyclododecylamido) titanium dichloride, methylene(tetramethylcyclopentadienyl)(exo-2-norbornylamido) titanium dichloride, methylene(tetramethylcyclopentadienyl)(cyclohexylamido) titanium dichloride, methylene(tetramethylcyclopentadienyl)(1-adamantylamido) titanium dichloride, methylene(tetramethylcyclopentadienyl)(t-butylamido) titanium dichloride, ethylene(tetramethylcyclopentadienyl)(cyclododecylamido) titanium dichloride, ethylene(tetramethylcyclopentadienyl)(exo-2-norbornylamido) titanium dichloride, ethylene(tetramethylcyclopentadienyl)(cyclohexylamido) titanium dichloride, ethylene(tetramethylcyclopentadienyl)(1-adamantylamido) titanium dichloride, ethylene(tetramethylcyclopentadienyl)(t-butylamido) titanium dichloride, dimethylsilyl(tetramethylcyclopentadienyl)(cyclododecylamido) titanium dimethyl, dimethylsilyl(tetramethylcyclopentadienyl)(cyclohexylamido) titanium dimethyl, dimethylsilyl(tetramethylcyclopentadienyl)(1-adamantylamido) titanium dimethyl, dimethylsilyl(tetramethylcyclopentadienyl)(t-butylamido) titanium dimethyl, dimethylsilyl(tetramethylcyclopentadienyl)(s-butylamido) titanium dimethyl, dimethylsilyl(tetramethylcyclopentadienyl)(n-butylamido) titanium dimethyl, dimethylsilyl(tetramethylcyclopentadienyl)(exo-2-norbornylamido) titanium dimethyl, diethylsilyl(tetramethylcyclopentadienyl)(cyclododecylamido) titanium dimethyl, diethylsilyl(tetramethylcyclopentadienyl)(exo-2-norbornylamido) titanium dimethyl, diethylsilyl(tetramethylcyclopentadienyl)(cyclohexylamido) titanium dimethyl, diethylsilyl(tetramethylcyclopentadienyl)(1-adamantylamido) titanium dimethyl, diethylsilyl(tetramethylcyclopentadienyl)(t-butylamido) titanium dimethyl, methylene(tetramethylcyclopentadienyl)(cyclododecylamido) titanium dimethyl, methylene(tetramethylcyclopentadienyl)(exo-2-norbornylamido) titanium dimethyl, methylene(tetramethylcyclopentadienyl)(cyclohexylamido) titanium dimethyl, methylene(tetramethylcyclopentadienyl)(1-adamantylamido) titanium dimethyl, methylene(tetramethylcyclopentadienyl)(t-butylamido) titanium dimethyl, ethylene(tetramethylcyclopentadienyl)(cyclododecylamido) titanium dimethyl, ethylene(tetramethylcyclopentadienyl)(exo-2-norbornylamido) titanium dimethyl, ethylene(tetramethylcyclopentadienyl)(cyclohexylamido) titanium dimethyl, ethylene(tetramethylcyclopentadienyl)(1-adamantylamido) titanium dimethyl, ethylene(tetramethylcyclopentadienyl)(t-butylamido) titanium dimethyl, dimethylsilyl(2,5-dimethylcyclopentadienyl)(cyclododecylamido) titanium dichloride, dimethylsilyl(2,5-dimethylcyclopentadienyl)(exo-2-norbornylamido) titanium dichloride, dimethylsilyl(2,5-dimethylcyclopentadienyl)(cyclohexylamido) titanium dichloride, dimethylsilyl(2,5-dimethylcyclopentadienyl)(1-adamantylamido) titanium dichloride, dimethylsilyl(2,5-dimethylcyclopentadienyl)(t-butylamido) titanium dichloride, dimethylsilyl(3,4-dimethylcyclopentadienyl)(cyclododecylamido) titanium dichloride, dimethylsilyl(3,4-dimethylcyclopentadienyl)

(exo-2-norbornylamido) titanium dichloride, dimethylsilyl (3,4-dimethylcyclopentadienyl)(cyclohexylamido) titanium dichloride, dimethylsilyl(3,4-dimethylcyclopentadienyl)(1-adamantylamido) titanium dichloride, dimethylsilyl(3,4-dimethylcyclopentadienyl)(t-butylamido) titanium dichloride, dimethylsilyl(2-ethyl-5-methylcyclopentadienyl)(cyclododecylamido) titanium dichloride, dimethylsilyl(2-ethyl-5-methylcyclopentadienyl)(exo-2-norbornylamido) titanium dichloride, dimethylsilyl(2-ethyl-5-methylcyclopentadienyl)(cyclohexylamido) titanium dichloride, dimethylsilyl(2-ethyl-5-methylcyclopentadienyl)(1-adamantylamido) titanium dichloride, dimethylsilyl(2-ethyl-5-methylcyclopentadienyl)(t-butylamido) titanium dichloride, dimethylsilyl(3-ethyl-4-methylcyclopentadienyl)(cyclododecylamido) titanium dichloride, dimethylsilyl(3-ethyl-4-methylcyclopentadienyl)(exo-2-norbornylamido) titanium dichloride, dimethylsilyl(3-ethyl-4-methylcyclopentadienyl)(cyclohexylamido) titanium dichloride, dimethylsilyl(3-ethyl-4-methylcyclopentadienyl)(1-adamantylamido) titanium dichloride, dimethylsilyl(3-ethyl-4-methylcyclopentadienyl)(t-butylamido) titanium dichloride, dimethylsilyl(2-ethyl-3-hexyl-5-methyl-4-octylcyclopentadienyl)(cyclododecylamido) titanium dichloride, dimethylsilyl(2-ethyl-3-hexyl-5-methyl4-octylcyclopentadienyl)(exo-2-norbornylamido) titanium dichloride, dimethylsilyl(2-ethyl-3-hexyl-5-methyl-4-octylcyclopentadienyl)(cyclohexylamido) titanium dichloride, dimethylsilyl(2-ethyl-3-hexyl-5-methyl4-octylcyclopentadienyl)(1-adamantylamido) titanium dichloride, dimethylsilyl(2-ethyl-3-hexyl-5-methyl-4-octylcyclopentadienyl)(t-butylamido) titanium dichloride, dimethylsilyl(2-tetrahydroindenyl)(cyclododecylamido) titanium dichloride, dimethylsilyl(2-tetrahydroindenyl)(exo-2-norbornylamido) titanium dichloride, dimethylsilyl(2-tetrahydroindenyl)(cyclohexylamido) titanium dichloride, dimethylsilyl(2-tetrahydroindenyl)(1-adamantylamido) titanium dichloride, dimethylsilyl(2-tetrahydroindenyl)(t-butylamido) titanium dichloride, dimethylsilyl(2,5-dimethylcyclopentadienyl)(cyclododecylamido) titanium dimethyl, dimethylsilyl(2,5-dimethylcyclopentadienyl)(exo-2-norbornylamido) titanium dimethyl, dimethylsilyl(2,5-dimethylcyclopentadienyl)(cyclohexylamido) titanium dimethyl, dimethylsilyl(2,5-dimethylcyclopentadienyl)(1-adamantylamido) titanium dimethyl, dimethylsilyl(2,5-dimethylcyclopentadienyl)(t-butylamido) titanium dimethyl, dimethylsilyl(3,4-dimethylcyclopentadienyl)(cyclododecylamido) titanium dimethyl, dimethylsilyl(3,4-dimethylcyclopentadienyl)(exo-2-norbornylamido) titanium dimethyl, dimethylsilyl(3,4-dimethylcyclopentadienyl)(cyclohexylamido) titanium dimethyl, dimethylsilyl(3,4-dimethylcyclopentadienyl)(1-adamantylamido) titanium dimethyl, dimethylsilyl(3,4-dimethylcyclopentadienyl)(t-butylamido) titanium dimethyl, dimethylsilyl(2-ethyl-5-methylcyclopentadienyl)(cyclododecylamido) titanium dimethyl, dimethylsilyl(2-ethyl-5-methylcyclopentadienyl)(exo-2-norbornylamido) titanium dimethyl, dimethylsilyl(2-ethyl-5-methylcyclopentadienyl)(cyclohexylamido) titanium dimethyl, dimethylsilyl(2-ethyl-5-methylcyclopentadienyl)(1-adamantylamido) titanium dimethyl, dimethylsilyl(2-ethyl-5-methylcyclopentadienyl)(t-butylamido) titanium dimethyl, dimethylsilyl(3-ethyl-4-methylcyclopentadienyl)(cyclododecylamido) titanium dimethyl, dimethylsilyl(3-ethyl-4-methylcyclopentadienyl)(exo-2-norbornylamido) titanium dimethyl, dimethylsilyl(3-ethyl-4-methylcyclopentadienyl)(cyclohexylamido) titanium dimethyl, dimethylsilyl(3-ethyl-4-methylcyclopentadienyl)(1-adamantylamido) titanium dimethyl, dimethylsilyl(3-ethyl-4-methylcyclopentadienyl)(t-butylamido) titanium dimethyl, dimethylsilyl(2-ethyl-3-hexyl-5-methyl-4-octylcyclopentadienyl)(cyclododecylamido) titanium dimethyl, dimethylsilyl(2-ethyl-3-hexyl-5-methyl-4-octylcyclopentadienyl)(exo-2-norbornylamido) titanium dimethyl, dimethylsilyl(2-ethyl-3-hexyl-5-methyl4-octylcyclopentadienyl)(cyclohexylamido) titanium dimethyl, dimethylsilyl(2ethyl-3-hexyl-5-methyl4-octylcyclopentadienyl)(1-adamantylamido) titanium dimethyl, dimethylsilyl(2-ethyl-3-hexyl-5-methyl4-octylcyclopentadienyl)(t-butylamido) titanium dimethyl, dimethylsilyl(2-tetrahydroindenyl)(cyclododecylamido) titanium dimethyl, dimethylsilyl(2-tetrahydroindenyl)(exo-2-norbornylamido) titanium dimethyl, dimethylsilyl(2-tetrahydroindenyl)(cyclohexylamido) titanium dimethyl, dimethylsilyl(2-tetrahydroindenyl)(1-adamantylamido) titanium dimethyl, dimethylsilyl(2-tetrahydroindenyl)(t-butylamido) titanium dimethyl, dimethylsilyl(tetramethylcyclopentadienyl)(cyclododecylamido) titanium dichloride, dimethylsilyl(tetramethylcyclopentadienyl)(t-butylamido) titanium dichloride, dimethylsilyl(tetramethylcyclopentadienyl)(cyclohexylamido) titanium dichloride, dimethylsilyl(tetramethylcyclopentadienyl)(1-adamantylamido) titanium dichloride, dimethylsilyl(tetramethylcyclopentadienyl)(exo-2-norbornylamido) titanium dichloride, dimethylsilyl(tetramethylcyclopentadienyl)(cyclododecylamido) titanium dimethyl, dimethylsilyl(tetramethylcyclopentadienyl)(t-butylamido) titanium dimethyl, dimethylsilyl(tetramethylcyclopentadienyl)(cyclohexylamido) titanium dimethyl, dimethylsilyl(tetramethylcyclopentadienyl)(1-adamantylamido) titanium dimethyl, dimethylsilyl(tetramethylcyclopentadienyl)(exo-2-norbornylamido) titanium dimethyl, and the like.

Additionally, compounds of formula 20 may be used to produce the elastomer disclosed herein.

In this case, $S''_V$ are independently chosen such that the metallocene

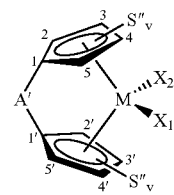

(20)

framework has a plane of symmetry that bisects M and A'. Substituents $S''_v$ are independently defined to be the same as S'' in equation 8-9 where the subscript "v" denotes the carbon atom on the cyclopentadienyl ring to which the substituent is bonded and where there can be zero to four substituents, S'',on the cyclopentadienyl ring provided that the cyclopentadienyl ring is symmetrically substituted. Symmetrically substituted is defined to mean that the cyclopentadienyl ring is substituted in the 2 and 2' positions and/or 3 and 3' positions and/or 4 and 4' positions and/or 5 and 5' positions with S'' groups that are of approximately of the same steric bulk. Typically the size of these S'' groups are within 2 carbons of each other. Thus a cyclopentadienyl substituted at the 2 and the 2' positions with methyl and ethyl respectively, or substituted at the 3 and the 3' positions with hexyl and octyl, respectively, would be considered symmetric. Likewise, the cyclopentadienyl ring may be substituted at all four sites with S'' groups and be considered symmetric as long as each of the symmetrical pairs are of similar steric bulk. Additionally, two adjacent S''-groups may be linked to form a ring provided that the new ring is also symmetrically substituted. Such complexes such as meso-Me$_2$Si(indenyl)$_2$ZrMe$_2$ meso-CH$_2$CH$_2$ (indenyl)$_2$ZrCl$_2$ are well known in the art and generally produce amorphous polymers useful in this invention.

Preferred meso-metallocene compounds which, according to the present invention, include the meso versions of:

dimethylsilylbis(indenyl) zirconium dichloride, dimethylsilylbis(indenyl) zirconium dimethyl, diphenylsilylbis(indenyl) zirconium dichloride, diphenylsilylbis(indenyl) zirconium dimethyl, methylphenylsilylbis(indenyl) zirconium dichloride, methylphenylsilylbis(indenyl) zirconium dimethyl, ethylenebis(indenyl) zirconium dichloride, ethylenebis(indenyl) zirconium dimethyl, methylenebis(indenyl) zirconium dichloride, methylenebis(indenyl) zirconium dimethyl, dimethylsilylbis(indenyl) hafnium dichloride, dimethylsilylbis(indenyl) hafnium dimethyl, diphenylsilylbis(indenyl) hafnium dichloride, diphenylsilylbis(indenyl) hafnium dimethyl, methylphenylsilylbis(indenyl) hafnium dichloride, methylphenylsilylbis(indenyl) hafnium dimethyl, ethylenebis(indenyl) hafnium dichloride, ethylenebis(indenyl) hafnium dimethyl, methylenebis(indenyl) hafnium dichloride, methylenebis(indenyl) hafnium dimethyl, dimethylsilylbis(tetrahydroindenyl) zirconium dichloride, dimethylsilylbis(tetrahydroindenyl) zirconium dimethyl, diphenylsilylbis(tetrahydroindenyl) zirconium dichloride, diphenylsilylbis(tetrahydroindenyl) zirconium dimethyl, methylphenylsilylbis(tetrahydroindenyl) zirconium dichloride, methylphenylsilylbis(tetrahydroindenyl) zirconium dimethyl, ethylenebis(tetrahydroindenyl) zirconium dichloride, ethylenebis(tetrahydroindenyl) zirconium dimethyl, methylenebis(tetrahydroindenyl) zirconium dichloride, methylenebis(tetrahydroindenyl) zirconium dimethyl, dimethylsilylbis(tetrahydroindenyl) hafnium dichloride, dimethylsilylbis(tetrahydroindenyl) hafnium dimethyl, diphenylsilylbis(tetrahydroindenyl) hafnium dichloride, diphenylsilylbis(tetrahydroindenyl) hafnium dimethyl, methylphenylsilylbis(tetrahydroindenyl) hafnium dichloride, methylphenylsilylbis(tetrahydroindenyl) hafnium dimethyl, ethylenebis(tetrahydroindenyl) hafnium dichloride, ethylenebis(tetrahydroindenyl) hafnium dimethyl, methylenebis(tetrahydroindenyl) hafnium dichloride, methylenebis(tetrahydroindenyl) hafnium dimethyl, dimethylsilylbis(2-methylindenyl) zirconium dichloride, dimethylsilylbis(2-methylindenyl) zirconium dimethyl, diphenylsilylbis(2-methylindenyl) zirconium dichloride, diphenylsilylbis(2-methylindenyl) zirconium dimethyl, methylphenylsilylbis(2-methylindenyl) zirconium dichloride, methylphenylsilylbis(2-methylindenyl) zirconium dimethyl, ethylenebis(2-methylindenyl) zirconium dichloride, ethylenebis(2-methylindenyl) zirconium dimethyl, methylenebis(2-methylindenyl) zirconium dichloride, methylenebis(2-methylindenyl) zirconium dimethyl, dimethylsilylbis(2-methylindenyl) hafnium dichloride, dimethylsilylbis(2-methylindenyl) hafnium dimethyl, diphenylsilylbis(2-methylindenyl) hafnium dichloride, diphenylsilylbis(2-methylindenyl) hafnium dimethyl, methylphenylsilylbis(2-methylindenyl) hafnium dichloride, methylphenylsilylbis(2-methylindenyl) hafnium dimethyl, ethylenebis(2-methylindenyl) hafnium dichloride, ethylenebis(2-methylindenyl) hafnium -dimethyl, methylenebis(2-methylindenyl) hafnium dichloride, methylenebis(2methylindenyl) hafnium dimethyl, dimethylsilylbis(2-methyl4-phenylindenyl) zirconium dichloride, diphenylsilylbis(2-methyl-4-phenylindenyl) zirconium dimethyl, diphenylsilylbis(2-methyl-4-phenylindenyl) zirconium dichloride, diphenylsilylbis(2-methyl4-phenylindenyl) zirconium dimethyl, methylphenylsilylbis(2-methyl4-phenylindenyl) zirconium dichloride, methylphenylsilylbis(2-methyl4-phenylindenyl) zirconium dimethyl, ethylenebis(2-methyl4-phenylindenyl) zirconium dichloride, ethylenebis(2-methyl-4-phenylindenyl) zirconium dimethyl, methylenebis(2-methyl-4-phenylindenyl) zirconium dichloride, methylenebis(2-methyl4-phenylindenyl) zirconium dimethyl, dimethylsilylbis(2-methyl4-phenylindenyl) hafnium dichloride, dimethylsilylbis(2-methyl-4-phenylindenyl) hafnium dimethyl, diphenylsilylbis(2-methyl4-phenylindenyl) hafnium dichloride, diphenylsilylbis(2-methyl4-phenylindenyl) hafnium dimethyl, methylphenylsilylbis(2-methyl4-phenylindenyl) hafnium dichloride, methylphenylsilylbis(2-methyl4-phenylindenyl) hafnium dimethyl, ethylenebis(2-methyl4-phenylindenyl) hafnium dichloride, ethylenebis(2-methyl4-phenylindenyl) hafnium dimethyl, methylenebis(2-methyl4-phenylindenyl) hafnium dichloride, methylenebis(2-methyl4-phenylindenyl) hafnium dimethyl, dimethylsilylbis(4,7-dimethylindenyl) zirconium dichloride, dimethylsilylbis(4,7-dimethylindenyl) zirconium dimethyl, diphenylsilylbis(4,7-dimethylindenyl) zirconium dichloride, diphenylsilylbis(4,7-dimethylindenyl) zirconium dimethyl, methylphenylsilylbis(4,7-dimethylindenyl) zirconium dichloride, methylphenylsilylbis(4,7-dimethylindenyl) zirconium dimethyl, ethylenebis(4,7-dimethylindenyl) zirconium dichloride, ethylenebis(4,7-dimethylindenyl) zirconium dimethyl, methylenebis(4,7-dimethylindenyl) zirconium dichloride, methylenebis(4,7-dimethylindenyl) zirconium dimethyl, dimethylsilylbis(4,7-dimethylindenyl) hafnium dichloride, dimethylsilylbis(4,7-dimethylindenyl) hafnium dimethyl, diphenylsilylbis(4,7-dimethylindenyl) hafnium dichloride, diphenylsilylbis(4,7-dimethylindenyl) hafnium dimethyl, methylphenylsilylbis(4,7-dimethylindenyl) hafnium dichloride, methylphenylsilylbis(4,7-dimethylindenyl) hafnium dimethyl, ethylenebis(4,7-dimethylindenyl) hafnium dichloride, ethylenebis(4,7-dimethylindenyl) hafnium dimethyl, methylenebis(4,7-dimethylindenyl) hafnium dichloride, methylenebis(4,7-dimethylindenyl) hafnium dimethyl, dimethylsilylbis(indenyl) zirconium dichloride, dimethylsilylbis(indenyl) zirconium dimethyl, ethylenebis(indenyl) zirconium dichloride, ethylenebis(indenyl) zirconium dimethyl, dimethylsilylbis(indenyl) hafnium dichloride, dimethylsilylbis(indenyl) hafnium dimethyl, ethylenebis(indenyl) hafnium dichloride, ethylenebis(indenyl) hafnium dimethyl, dimethylsilylbis(tetrahydroindenyl) zirconium dichloride, dimethylsilylbis(tetrahydroindenyl) zirconium dimethyl, ethylenebis(tetrahydroindenyl) zirconium dichloride, ethylenebis(tetrahydroindenyl) zirconium dimethyl, dimethylsilylbis(tetrahydroindenyl) hafnium dichloride, dimethylsilylbis(tetrahydroindenyl) hafnium dimethyl, ethylenebis(tetrahydroindenyl) hafnium dichloride, ethylenebis(tetrahydroindenyl) hafnium dimethyl, dimethylsilylbis(2-methylindenyl) zirconium dichloride, dimethylsilylbis(2-methylindenyl) zirconium dimethyl, ethylenebis(2-methylindenyl) zirconium dichloride, ethylenebis(2-methylindenyl) zirconium dimethyl, dimethylsilylbis(2-methylindenyl) hafnium dichloride, dimethylsilylbis(2-methylindenyl) hafnium dimethyl, ethylenebis(2-methylindenyl) hafnium dichloride, and ethylenebis(2-methylindenyl) hafnium dimethyl Most preferred for use herein are catalysts that produce syndiotactic polypropylene depending on the polymerization temperatures. Preferred catalyst precursors are illustrated in equation 19:

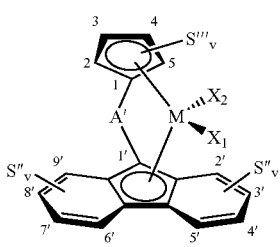

(19)

wherein A', M, $X_1$ and $X_2$ are as previously defined. Substituents $S''_v$ and $S'''_v$ are independently defined as S" in equations 8-9 where the subscript "v" denotes the carbon atom on the Cp-ring or Flu-ring (fluorenyl-ring) to which the substituent is bonded.

Accordingly, the catalyst is represented by Formula 19a:

Formula 19a

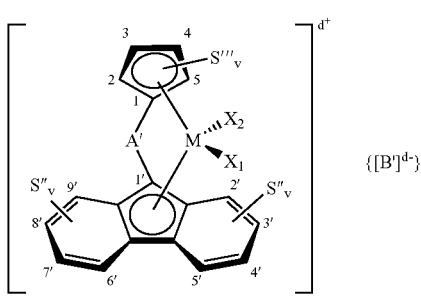

wherein A' is a bridging group comprising a divalent radical;

M is titanium, zirconium or hafnium;

$X_1$, and $X_2$ are independently a hydride radical, hydrocarbyl radical, substituted-hydrocarbyl radical, hydrocarbyl-substituted organometalloid radical or halocarbyl-substituted organometalloid radical which radical may optionally be covalently bonded to all or any M, S" or S"', and provided that $X_1$ and X2 are not a substituted or unsubstituted cyclopentadienyl ring;

S" and S"' are independently a C1-C40 radical group which is a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radical;

subscript v denotes the number of carbon to which each S" or S"' is attached;

d is an integer representing the charge of B'; and

B' is an activator.

Preferably metallocene precursors for producing elastomers having largely amorphous character (when used as catalysts under higher reactor temperature conditions) are those of Equation 19 where $S'''_v$ are independently chosen such that the metallocene framework has a plane of symmetry containing the metal center and bisecting the Flu- and Cp-rings. The A' ligand need not be symmetrical—for example dimethylsilyl or methylphenylsilyl will not effect the stereochemisty of the polymer produced. Substituent $S'''_v$ is defined to be the same as S" in equation 8-9 where the subscript "v" denotes the carbon atom on the cyclopentadienyl ring to which the substituent is bonded and where there can be zero, two or four substituents, S"', on the cyclopentadienyl ring provided that the cyclopentadienyl ring is symmetrically substituted. Symmetrically substituted is defined to mean that the cyclopentadienyl ring is substituted in the 2 and 5 positions and/or 3 and 4 positions with S"' groups that are of approximately of the same steric bulk. Typically the size of these S"' groups are within 2 carbons of each other. Thus a cyclopentadienyl substituted at the 2 and the 5 positions with methyl and ethyl respectively, or substituted at the 3 and the 4 positions with hexyl and octyl, respectively, would be considered symmetric. Likewise, the cyclopentadienyl ring may be substituted at all four sites with S"' groups and be considered symmetric as long as each of the symmetrical pairs are of similar steric bulk. Additionally, two adjacent S"'-groups in the 3 and 4 position may be linked to form a ring provided that the new ring is also symmetrically substituted. Because of the distant placement of the $S''_v$ substituents on the fluorenyl ring, these substituents need not be symmetrically placed on the fluorenyl ring. Hence, the fluorenyl ring may be substituted with form 0-7 substituents that may be the same or different. Two or more adjacent S"-groups may optionally be linked to form a ring.

Preferred metallocene transition metal catalyst precursor compounds which, according to the present invention, provide catalyst include: isopropylidene(cyclopentadienyl)(fluorenyl) zirconium dichloride, isopropylidene(cyclopentadienyl)(fluorenyl) zirconium dimethyl, methylene(cyclopentadienyl)(fluorenyl) zirconium dichloride, methylene(cyclopentadienyl)(fluorenyl) zirconium dimethyl, diphenylmethylene(cyclopentadienyl)(fluorenyl) zirconium dichloride, diphenylmethylene(cyclopentadienyl)(fluorenyl) zirconium dimethyl, di(p-triethylsilylphenyl)methylene(cyclopentadienyl)(fluorenyl) zirconium dichloride, di(p-triethylsilylphenyl)methylene(cyclopentadienyl)(fluorenyl) zirconium dimethyl, di(p-trimethylsilylphenyl)methylene(cyclopentadienyl)(fluorenyl) zirconium dichloride, di(p-trimethylsilylphenyl)methylene(cyclopentadienyl)(fluorenyl) zirconium dimethyl, diphenylsilyl(cyclopenta+dienyl)(fluorenyl) zirconium dichloride, diphenylsilyl (cyclopentadienyl)(fluorenyl) zirconium dimethyl, dimethylsilyl(cyclopentadienyl)(fluorenyl) zirconium dichloride, dimethylsilyl(cyclopentadienyl)(fluorenyl) zirconium dimethyl, methylphenylsilyl(cyclopentadienyl)(fluorenyl) zirconium dichloride, methylphenylsilyl(cyclopentadienyl)(fluorenyl) zirconium dimethyl, isopropylidene (cyclopentadienyl)(fluorenyl) hafnium dichloride, isopropylidene(cyclopentadienyl)(fluorenyl) hafnium dimethyl, methylene(cyclopentadienyl)(fluorenyl) hafnium dichloride, methylene(cyclopentadienyl)(fluorenyl) hafnium dimethyl, diphenylmethylene(cyclopentadienyl)(fluorenyl) hafnium dichloride, diphenylmethylene(cyclopentadienyl)(fluorenyl) hafnium dimethyl, di(p-triethylsilylphenyl)methylene(cyclopentadienyl)(fluorenyl) hafnium dichloride, di(p-triethylsilylphenyl)methylene(cyclopentadienyl)(fluorenyl) hafnium dimethyl, di(p-trimethylsilylphenyl)methylene(cyclopentadienyl)(fluorenyl) hafnium dichloride, di(p-trimethylsilylphenyl)methylene(cyclopentadienyl)(fluorenyl) hafnium dimethyl, diphenylsilyl(cyclopentadienyl)(fluorenyl) hafnium dichloride, diphenylsilyl(cyclopentadienyl)(fluorenyl) hafnium dimethyl, dimethylsilyl(cyclopentadienyl)(fluorenyl) hafnium dichloride, dimethylsilyl (cyclopentadienyl)(fluorenyl) hafnium dimethyl, methylphenylsilyl(cyclopentadienyl)(fluorenyl) hafnium dichloride, methylphenylsilyl(cyclopentadienyl)(fluorenyl) hafnium dimethyl, isopropylidene(cyclopentadienyl)(3,8-di-t-butylfluorenyl) zirconium dichloride, isopropylidene(cyclopentadienyl)(3,8-di-t-butylfluorenyl) zirconium dimethyl, methylene(cyclopentadienyl)(3,8-di-t-butylfluorenyl) zirconium dichloride, methylene(cyclopentadienyl)(3,8-di-t-butylfluorenyl) zirconium dimethyl, diphenylmethylene(cyclopentadienyl)(3,8-di-t-butylfluorenyl) zirconium dichloride, diphenylmethylene(cyclopentadienyl)(3,8-di-t-butylfluorenyl) zirconium dimethyl, di(p-triethylsilylphenyl)methylene (cyclopentadienyl)(3,8-di-t-butylfluorenyl) zirconium dichloride, di(p-triethylsilylphenyl)methylene(cyclopentadienyl)(3,8-di-t-butylfluorenyl) zirconium dimethyl, di(p-trimethylsilylphenyl)methylene(cyclopentadienyl)(3,8-di-t-butylfluorenyl) zirconium dichloride, di(p-trimethylsilylphenyl)methylene(cyclopentadienyl)(3,8-di-t-butylfluorenyl) zirconium dimethyl, diphenylsilyl (cyclopentadienyl)(3,8-di-t-butylfluorenyl) zirconium dichloride, diphenylsilyl(cyclopentadienyl)(3,8-di-t-butylfluorenyl) zirconium dimethyl, dimethylsilyl(cyclopentadienyl)(3,8-di-t-butylfluorenyl) zirconium dichloride, dimethylsilyl(cyclopentadienyl)(3,8-di-t-butylfluorenyl) zirconium dimethyl, methylphenylsilyl(cyclopentadienyl)(3,8-di-t-butylfluorenyl) zirconium dichloride, methylphenylsilyl(cyclopentadienyl)(3,8-di-t-butylfluorenyl) zirconium dimethyl, isopropylidene(cyclopentadienyl)(3,8-di-t-butylfluorenyl) hafnium dichloride, isopropylidene(cyclopentadienyl)(3,8-di-t-butylfluorenyl) hafnium dimethyl, methylene(cyclopentadienyl)(3,8-di-t-butylfluorenyl) hafnium dichloride, methylene(cyclopentadienyl)(3,8-di-t-butylfluorenyl) hafnium dimethyl, diphenylmethylene(cyclopentadienyl)(3,8-di-t-butylfluorenyl) hafnium dichloride, diphenylmethylene(cyclopentadienyl)(3,8-di-t-butylfluorenyl) hafnium dimethyl, di(p-triethylsilylphenyl)methylene(cyclopentadienyl)(3,8-di-t-butylfluorenyl) dichloride, di(p-triethylsilylphenyl)methylene(cyclopentadienyl)(3,8-di-t-butylfluorenyl) hafnium dimethyl, di(p-trimethylsilylphenyl)methylene(cyclopentadienyl)(3,8-di-t-butylfluorenyl) hafnium dichloride, di(p-trimethylsilylphenyl)methylene (cyclopentadienyl)(3,8-di-t-butylfluorenyl) hafnium dimethyl, diphenylsilyl(cyclopentadienyl)(3,8-di-t-butylfluorenyl) hafnium dichloride, diphenylsilyl(cyclopentadienyl)(3,8-di-t-butylfluorenyl) hafnium dimethyl, dimethylsilyl(cyclopentadienyl)(3,8-di-t-butylfluorenyl) hafnium dichloride, dimethylsilyl(cyclopentadienyl)(3,8-di-t-butylfluorenyl) hafnium dimethyl, methylphenylsilyl(cyclopentadienyl)(3,8-di-t-butylfluorenyl) hafnium dichloride, methylphenylsilyl(cyclopentadienyl)(3,8-di-t-butylfluorenyl) hafnium dimethyl, isopropylidene(cyclopentadienyl)(3,3,6,6,9,9,12,12-octamethyl-4,4,5,5,8,8,9,9-octahydrodibenzyl[b,h]fluorenyl) zirconium dichloride, isopropylidene (cyclopentadienyl)(3,3,6,6,9,9,12,12-octamethyl4,4,5,5,8,8,9,9-octahydrodibenzyl[b,h]fluorenyl) zirconium dimethyl, methylene(cyclopentadienyl)(3,3,6,6,9,9,12,12-octamethyl4,4,5,5,8,8,9,9-octahydrodibenzyl[b,h]fluorenyl) zirconium dichloride, methylene(cyclopentadienyl)(3,3,6,6,9,9,12,12-octamethyl-4,4,5,5,8,8,9,9-octahydrodibenzyl[b,h]fluorenyl) zirconium dimethyl, diphenylmethylene(cyclopentadienyl)(3,3,6,6,9,9,12,12-octamethyl-4,4,5,5,8,8,9,9-octahydrodibenzyl[b,h]fluorenyl) zirconium dichloride, diphenylmethylene(cyclopentadienyl)(3,3,6,6,9,9,12,12-octamethyl-4,4,5,5,8,8,9,9-octahydrodibenzyl[b,h]fluorenyl) zirconium dimethyl, di(p-triethylsilylphenyl)methylene(cyclopentadienyl)(3,3,6,6,9,9,12,12-octamethyl4,4,5,5,8,8,9,9-octahydrodibenzyl[b,h]fluorenyl) zirconium dichloride, di(p-triethylsilylphenyl)methylene(cyclopentadienyl)(3,3,6,6,9,9,12,12-octamethyl-4,4,5,5,8,8,9,9-octahydrodibenzyl[b,h]fluorenyl) zirconium dimethyl, di(p-trimethylsilylphenyl)methylene(cyclopentadienyl)(3,3,6,6,9,9,12,12-octamethyl-4,4,5,5,8,8,9,9-octahydrodibenzyl[b,h]fluorenyl) zirconium dichloride, di(p-trimethylsilylphenyl)methylene(cyclopentadienyl)(3,3,6,6,9,9,12,12-octamethyl-4,4,5,5,8,8,9,9-octahydrodibenzyl[b,h]fluorenyl) zirconium dimethyl, diphenylsilyl(cyclopentadienyl)(3,3,6,6,9,9,12,12-octamethyl-4,4,5,5,8,8,9,9-octahydrodibenzyl[b,h]fluorenyl) zirconium dichloride, diphenylsilyl(cyclopentadienyl)(3,3,6,6,9,9,12,12-octamethyl-4,4,5,5,8,8,9,9-octahydrodibenzyl[b,h]fluorenyl) zirconium dimethyl, dimethylsilyl(cyclopentadienyl)(3,3,6,6,9,9,12,12-octamethyl-4,4,5,5,8,8,9,9-octahydrodibenzyl[b,h]fluorenyl) zirconium dichloride, dimethylsilyl(cyclopentadienyl)(3,3,6,6,9,9,12,12-octamethyl4,4,5,5,8,8,9,9-octahydrodibenzyl[b,h]fluorenyl) zirconium dimethyl, methylphenylsilyl(cyclopentadienyl)(3,3,6,6,9,9,12,12-octamethyl-4,4,5,5,8,8,9,9-octahydrodibenzyl[b,h]fluorenyl) zirconium dichloride, methylphenylsilyl(cyclopentadienyl)(3,3,6,6,9,9,12,12-octamethyl-4,4,5,5,8,8,9,9-octahydrodibenzyl[b,h]fluorenyl) zirconium dimethyl, isopropylidene(cyclopentadienyl)(3,3,6,6,9,9,12,12-octamethyl-4,4,5,5,8,8,9,9-octahydrodibenzyl[b,h]fluorenyl) hafnium dichloride, isopropylidene(cyclopentadienyl)(3,3,6,6,9,9,12,12-octamethyl-4,4,5,5,8,8,9,9-octahydrodibenzyl[b,h]fluorenyl) hafnium dimethyl, methylene(cyclopentadienyl)(3,3,6,6,9,9,12,12-octamethyl-4,4,5,5,8,8,9,9-octahydrodibenzyl[b,h]fluorenyl) hafnium dichloride, methylene(cyclopentadienyl)(3,3,6,6,9,9,12,12-octamethyl-4,4,5,5,8,8,9,9-octahydrodibenzyl[b,h]fluorenyl) hafnium dimethyl, diphenylmethylene(cyclopentadienyl)(3,3,6,6,9,9,12,12-octamethyl-4,4,5,5,8,8,9,9-octahydrodibenzyl[b,h]fluorenyl) hafnium dichloride, diphenylmethylene(cyclopentadienyl)(3,3,6,6,9,9,12,12-octamethyl-4,4,5,5,8,8,9,9-octahydrodibenzyl[b,h]fluorenyl) hafnium dimethyl, di(p-triethylsilylphenyl)methylene(cyclopentadienyl)(3,3,6,6,9,9,12,12-octamethyl4,4,5,5,8,8,9,9-octahydrodibenzyl[b,h]fluorenyl) hafnium dichloride, di(p-triethylsilylphenyl)methylene(cyclopentadienyl)(3,3,6,6,9,9,12,12-octamethyl4,4,5,5,8,8,9,9-octahydrodibenzyl[b,h]fluorenyl) hafnium dimethyl, di(p-trimethylsilylphenyl)methylene(cyclopentadienyl)(3,3,6,6,9,9,12,12-octamethyl-4,4,5,5,8,8,9,9-octahydrodibenzyl[b,h]fluorenyl) hafnium dichloride, di(p-trimethylsilylphenyl)methylene(cyclopentadienyl)(3,3,6,6,9,9,12,12-octamethyl4,4,5,5,8,8,9,9-octahydrodibenzyl[b,h]fluorenyl) hafnium dimethyl, diphenylsilyl(cyclopentadienyl)(3,3,6,6,9,9,12,12-octamethyl-4,4,5,5,8,8,9,9-octahydrodibenzyl[b,h]fluorenyl) hafnium dichloride, diphenylsilyl(cyclopentadienyl)(3,3,6,6,9,9,12,12-octamethyl4,4,5,5,8,8,9,9-octahydrodibenzyl[b,h]fluorenyl) hafnium dimethyl, dimethylsilyl(cyclopentadienyl)(3,3,6,6,9,9,12,12-octamethyl-4,4,5,5,8,8,9,9-octahydrodibenzyl[b,h]fluorenyl) hafnium dichloride, dimethylsilyl(cyclopentadienyl)(3,3,6,6,9,9,12,12-octamethyl4,4,5,5,8,8,9,9-octahydrodibenzyl[b,h]fluorenyl) hafnium dimethyl, methylphenylsilyl(cyclopentadienyl)(3,3,6,6,9,9,12,12-octamethyl-4,4,5,5,8,8,9,9-octahydrodibenzyl[b,h]fluorenyl) hafnium dichloride, methylphenylsilyl(cyclopentadienyl)(3,3,6,6,9,9,12,12-octamethyl-4,4,5,5,8,8,9,9-octahydrodibenzyl[b,h]fluorenyl) hafnium dimethyl, and the like.

Other preferred species are: di(p-triethylsilylphenyl)methylene(cyclopentadienyl)(3,8-di-t-butylfluorenyl) zirconium dichloride, di(p-triethylsilylphenyl)methylene(cyclopentadienyl)(3,8-di-t-butylfluorenyl) hafnium dichloride, di(p-triethylsilylphenyl)methylene(cyclopentadienyl)(3,8-di-t-butylfluorenyl) zirconium dimethyl, di(p-triethylsilylphenyl)methylene(cyclopentadienyl)(3,8-di-t-butylfluorenyl) hafnium dimethyl, di(p-triethylsilylphenyl)methylene(cyclopentadienyl)(3,3,6,6,9,9,12,12-octamethyl-4,4,5,5,8,8,9,9-octahydrodibenzyl[b,h]fluorenyl) zirconium dichloride, di(p-triethylsilylphenyl)methylene(cyclopentadienyl)(3,3,6, 6,9,9,12,12-octamethyl-4,4,5,5,8,8,9,9-octahydrodibenzyl [b,h]fluorenyl) hafnium dichloride, di(p-triethylsilylphenyl) methylene(cyclopentadienyl)(3,3,6,6,9,9,12,12-octamethyl-4,4,5,5,8,8,9,9-octahydrodibenzyl[b,h]fluorenyl) zirconium dimethyl, and di(p-triethylsilylphenyl)methylene(cyclopentadienyl)(3,3,6,6,9,9,12,12-octamethyl-4,4,5,5,8,8,9,9-octahydrodibenzyl[b,h]fluorenyl) hafnium dimethyl.

A most preferred catalyst comprises diphenylmethylene (cyclopentadienyl)(fluorenyl) hafnium dimethyl, preferably using dimethylaniliniumtetrakis(pentafluorophenyl)borate as an activator.

Catalyst Supports

The catalyst precursor composition and catalyst systems described herein may include a support material or carrier. One or more catalyst components and/or one or more activators may be deposited on, contacted with, vaporized with, bonded to, or incorporated within, adsorbed or absorbed in and/or on, one or more supports or carriers. Preferably, the activators are bound to a silica support to produce a silica bound activator.

The support is preferably a porous material, for example, talc, inorganic oxides and inorganic chlorides. Other support materials include resinous materials such as polystyrene; functionalized and/or crosslinked organic supports such as polystyrene divinyl benzene polyolefins; and/or polymeric compounds such as zeolites, clays, or any other organic or inorganic support materials, and the like, and combinations comprising at least one of the foregoing support materials.

Preferred support materials include inorganic oxides comprising Group 2, 3, 4, 5, 13 or 14 metal oxides including silica, fumed silica, alumina (WO 99/60033), silica-alumina and combinations comprising at least one of the foregoing. Other suitable supports include magnesia, titania, zirconia, magnesium chloride (U.S. Pat. No. 5,965,477), montmorillonite (European Patent EP-B1 0 511 665), phyllosilicate, zeolites, talc, clays (U.S. Pat. No. 6,034,187) and the like. Combinations of support materials suitable for use herein include silica-chromium, silica-alumina, silica-titania, and the like. Additional support materials include porous acrylic polymers as described in EP 0 767 184 B1, which is incorporated herein by reference, nanocomposites as described in PCT WO 99/47598, aerogels as described in WO 99/48605, spherulites as described in U.S. Pat. No. 5,972,510, and polymeric beads as described in WO 99/50311, which are all herein incorporated by reference.

It is preferred that the support material have a surface area in the range of from about 10 to about 700 $m^2$/g, pore volume in the range of from about 0.1 to about 4.0 cc/g and average particle size in the range of from about 5 to about 500 μm. More preferably, the surface area of the support material is in the range of from about 50 to about 500 $m^2$/g, pore volume of from about 0.5 to about 3.5 cc/g and average particle size of from about 10 to about 200 μm. Most preferably the surface area of the support material is in the range is from about 100 to about 400 $m^2$/g, pore volume from about 0.8 to about 3.0 cc/g and average particle size is from about 5 to about 100 μm. The average pore size of the carrier of the invention typically has pore size in the range of from 10 to 1000 Å, preferably 50 to about 500 Å, and most preferably 75 to about 350 Å.

Metal oxide supports include metal/metalloid oxides having surface hydroxyl groups exhibiting a $pK_a$ equal to or less than that observed for amorphous silica, i.e., $pK_a$ less than or equal to about 11. These metal oxide compositions may additionally contain oxides of other metals, such as those of Al, K, Mg, Na, Si, Ti and Zr and should preferably be deactivated. By deactivated, it is meant that treatments including thermal and chemical means are employed to remove water and free oxygen. In addition, in a deactivated support, the number of free and/or reactive hydroxyl groups (i.e., SiOH) in and/or on the surface of the support is reduced as compared to a non-deactivated support. The support is preferably deactivated prior to forming a covalently bound anionic activator. When a silica support is used, the covalently bound anionic activator may be referred to herein as a silica bound activator (abbreviated herein as SBA). Examples of suitable SBA may be found in U.S. Pat. No. 5,643,847 at Column 2, line 40 to Column 12, line 40, and U.S. Pat. No. 6,590,055 at Column 3, line 7 to Column 11, line 57, which are each incorporated herein by reference for U.S. Patent Practice.

When the support comprises silica, after both calcination followed by chemical dehydration, the concentration of SiOH groups per gram of treated support is sufficient to allow formation of a catalyst precursor composition. The SiOH functional groups present facilitate formation of covalently bound anionic activators. Accordingly, the concentration of SiOH functional groups on or within the silica support can be about 0.05 mmol/g support (millimole per gram support) to about 1 mmole/g support. Within this range, a concentration of SiOH functional groups of less than or equal to about 0.8 mmol/g support can be employed, with less than or equal to about 0.7 mmol/g support preferred, and less than or equal to about 0.6 mmol/g support more preferred. Also preferred within this range is a concentration of SiOH functional groups on or within the silica support of greater than or equal to about 0.07 mmol/g support, with greater than or equal to about 0.1 mmol/g support more preferred.

Activators and Activation Methods for Catalyst Compounds

An activator is defined as any combination of reagents that increases the rate at which a catalyst oligomerizes and/or polymerizes unsaturated monomers, such as olefins to produce oligimers and/or polymers. An activator may also affect the molecular weight, degree of branching, comonomer content, or other properties of the oligomer and/or polymer produced. The catalyst precursor according to the invention may be activated for oligomerization and or polymerization catalysis in any manner sufficient to allow coordination or cationic oligomerization and or polymerization.

A successful olefin oligomerization and/or polymerization catalysts may contain a formal anionic ligand, such as hydride or hydrocarbyl, with an adjacent (cis) coordination site accessible to an unsaturated monomer. Coordination of an unsaturated monomer to the cis coordination site allows a migratory insertion reaction to form a metal alkyl. Repetition of this process causes chain growth. An activator is thus any combination of reagents that facilitates formation of a transition metal complex containing cis-coordinated olefin and hydride or hydrocarbyl.

Activation of a catalyst can be achieved by removal of formal anionic or neutral ligands of higher binding affinity than the unsaturated monomer. This removal process, referred to as abstraction, may have a kinetic rate that is first-order or non-first order with respect to the activator. Activators that remove formal anonic ligands are termed ionizing activators. Activators that remove formal neutral ligands are termed non-ionizing activators. Activators are typically strong Lewis-acids, which may play either the role of ionizing or non-ionizing activator.

Activation may be a one step or multi step process. One step in this process may include coordinating a hydride or hydrocarbyl group to a metal complex. A separate activation step is removal of formal anionic or neutral ligands of higher binding affinity than the unsaturated monomer. These activation steps may occur in series or in parallel. These steps may also occur in the presence of olefin, and/or prior to exposure to olefin. More than one sequence of activation steps is possible to achieve activation.

The activator may also act to coordinate a hydride or hydrocarbyl group to a catalyst. Activation may be effected by substitution of catalyst functional groups with a hydride, hydrocarbyl or substituted hydrocarbyl group. This substitution may be effected with appropriate hydride or alkyl reagents of group 1, 2, 12, and/or 13 elements, as is known in the art. To achieve activation, it may be necessary to also remove formal anionic or neutral ligands of higher binding affinity than the particular unsaturated monomer being used.

The activator may also act to coordinate a hydride or hydrocarbyl group to the catalyst. If the catalyst does not contain formal anionic ligands, then a hydride, hydrocarbyl or substituted hydrocarbyl may be coordinated to a metal using electrophilic proton or alkyl transfer reagents represented by $H^+(LB)_nA^-$, $(R^4)^+(LB)_nA^-$. $R^4$ is a hydrocarbyl or a substituted hydrocarbyl; LB is a Lewis-base, n=0, 1 or 2. Non-limiting examples of preferred Lewis-bases include diethyl ether, dimethyl ether, ethanol, methanol, water, acetonitrile, and/or N,N-dimethylaniline. $A^-$ is an anion, preferably a substituted hydrocarbon, a functional group, or a non-coordinating anion. Non-limiting examples of $A^-$ include halides, carboxylates, phosphates, sulfates, sulfonates, borates, aluminates, alkoxides, thioalkoxides, anionic substituted hydrocarbons, and/or anionic metal complexes.

Alumoxane and Aluminum Alkyl Activators

One or more alumoxanes may be utilized as an activator herein. Alumoxanes, also referred to as aluminoxanes, are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 B1, EP 0 516 476 A, EP 0 594 218 A1 and WO 94/10180.

When the activator is an alumoxane (modified or unmodified), some embodiments select the maximum amount of activator at a 5000-fold molar excess Al/M over the catalyst precursor (per metal catalytic site). The minimum activator-to-catalyst-precursor is typically a 1:1 molar ratio.

Alumoxanes may be produced by the hydrolysis of the respective trialkylaluminum compound. Modified methyl alumoxane may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in U.S. Pat. No. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publications WO 94/10180 and WO 99/15534, all of which are herein fully incorporated by reference. It may be preferable to use a visually clear methylalumoxane. A cloudy or gelled alumoxane can be filtered to produce a clear solution or clear alumoxane can be decanted from the cloudy solution. Another preferred alumoxane is a modified methyl alumoxane (MMAO) cocatalyst type 3A (commercially available from Akzo Chemicals, Inc. under the trade name Modified Methylalumoxane type 3A, covered under patent number U.S. Pat No. 5,041,584).

Aluminum alkyl or organoaluminum compounds which may be utilized as activators (or scavengers) include trimethylaluminum, triethylaluminum, triisobutylaluminum, tri-n-hexylaluminum, tri-n-octylaluminum, and the like.

Ionizing Activators

An ionizing or stoichiometric activator, neutral or ionic, may also be used herein. Examples include tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or a combination comprising at least one of the foregoing. Furthermore, a neutral or ionic activator may be used alone or in combination with other activators including alumoxane or modified alumoxane activators.

Examples of neutral stoichiometric activators include tri-substituted boron, tri-substituted phosphorus, tri-substituted tellurium, tri-substituted aluminum, tri-substituted gallium, tri-substituted indium, or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Examples include those described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198, 401, 5,066,741, 5,206,197, 5,241,025, 5,384,299 and 5,502, 124 and U.S. patent application Ser. No. 08/285,380, filed Aug. 3, 1994, now abandoned, all of which are herein fully incorporated by reference.

Preferred activators include a cation and an anion component, and may be represented by the following formula:

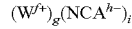

$W^{f+}$ is a cation component having the charge f+

NCAh− is a non-coordinating anion having the charge h− f is an integer from 1 to 3.

H is an integer from 1 to 3.

G and h are constrained by the relationship: (g)×(f)=(h)×(i)

The cation component, ($W^{f+}$) may include Bronsted acids such as protons or protonated Lewis bases or reducible Lewis acids capable of protonating or abstracting a moiety, such as an akyl or aryl, from an analogous metallocene or Group 15 containing transition metal catalyst precursor, resulting in a cationic transition metal species.

In a preferred embodiment, the activators include a cation and an anion component, and may be represented by the following formula:

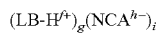

wherein LB is a neutral Lewis base;

H is hydrogen;

$NCA^{h-}$ is a non-coordinating anion having the charge h− f is an integer from 1 to 3, h is an integer from 1 to 3, g and h are constrained by the relationship: $(g) \times (f) = (h) \times (i)$ The activating cation ($W^{f+}$) may be a Bronsted acid, (LB-$H^{f+}$), capable of donating a proton to the transition metal catalytic precursor resulting in a transition metal cation, including ammoniums, oxoniums, phosphoniums, silyliums and mixtures thereof, preferably ammoniums of methylamine, aniline, dimethylamine, diethylamine, N-methylaniline, diphenylamine, trimethylamine, triethylamine, N,N-dimethylaniline, N,N-diethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers and tetrahydrothiophene and combinations comprising at least one of the foregoing activating cations.

The activating cation ($W^{f+}$) may also be an abstracting moiety such as silver, carboniums, tropylium, carbeniums, ferroceniums and mixtures thereof, with carboniums and ferroceniums being preferred. Most preferably ($W^{f+}$) is triphenyl carbonium or N,N-dimethylanilinium.

The anion component ($NCA^{h-}$) includes those having the formula $[T^{j+}Q_k]^{h-}$ wherein j is an integer from 1 to 3; k is an integer from 2 to 6; k−j=h; T is an element selected from Group 13 or 15 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable ($NCA^{h-}$)$_i$ also include diboron compounds as disclosed in U.S. Pat. No. 5,447,895, which is fully incorporated herein by reference.

Additional suitable anions are known in the art and will be suitable for use with the catalysts of the invention. See in particular, U.S. Pat. No. 5,278,119 and the review articles by S. H. Strauss, "The Search for Larger and More Weakly Coordinating Anions", *Chem. Rev.,* 93, 927-942 (1993) and C. A. Reed, "Carboranes: A New Class of Weakly Coordinating Anions for Strong Electrophiles, Oxidants and Superacids", *Acc. Chem. Res.,* 31, 133-139 (1998).

Illustrative, but not limiting examples of boron compounds which may be used as an activating cocatalyst in the preparation of the improved catalysts of this invention are tri-substituted ammonium salts such as:

trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium) tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl) borate,
N,N-dimethylanilinium tetrakis(pentafluorophenyl) borate,
N,N-diethylanilinium tetrakis(pentafluorophenyl) borate,
N,N-dimethyl-(2,4,6-trimethylanilinium) tetrakis(pentafluorophenyl) borate, trimethylammonium tetrakis-(2,3,4,6-tetrafluorophenylborate,
triethylammonium tetrakis-(2,3,4,6-tetrafluorophenyl) borate,
tripropylammonium tetrakis-(2,3,4,6-tetrafluorophenyl) borate,
tri(n-butyl)ammonium tetrakis-(2,3,4,6-tetrafluoro-phenyl) borate,
dimethyl(t-butyl)ammonium tetrakis-(2,3,4,6-tetrafluorophenyl) borate,
N,N-dimethylanilinium tetrakis-(2,3,4,6-tetrafluorophenyl) borate,
N,N-diethylanilinium tetrakis-(2,3,4,6-tetrafluoro-phenyl) borate, and
N,N-dimethyl-(2,4,6-trimethylanilinium)tetrakis-(2,3,4,6-tetrafluorophenyl) borate;

dialkyl ammonium salts such as: di-(i-propyl)ammonium tetrakis(pentafluorophenyl) borate, and dicyclohexylammonium tetrakis(pentafluorophenyl) borate; and tri-substituted phosphonium salts such as:

triphenylphosphonium tetrakis(pentafluorophenyl) borate, tri(o-tolyl)phosphonium tetrakis(pentafluorophenyl) borate, and tri(2,6-dimethylphenyl)phosphonium tetrakis(pentafluorophenyl) borate.

Other suitable activators include those with the formula: $[R'_i ArF-ER_2-H]^+-[An]^-$, where (a) ArF is a fluoroaryl group; (b) E is nitrogen or phosphorous; (c) each R is independently a C1-C20 hydrocarbyl or hydrocarbylsilyl group, or the two Rs may connect to form an unsubstituted or substituted C2-C20 cycloaliphatic group; (d) R' is a C1-C20 hydrocarbyl or halogenated hydrocarbyl; (e) i is 0, 1 or 2; and (f) [An]− is an anion of a strong Bronsted acid, as disclosed in U.S. patent application No. 20020111265, numbered paragraphs [0037] to [0048], which are incorporated by reference herein, as well as those disclosed in U.S. patent application No. 20020115806, numbered paragraphs [0036] to [0046], which are also incorporated by reference herein.

Most preferably, the ionic stoichiometric activator is N,N-dimethylanilinium tetra(perfluorophenyl)borate and/or triphenylcarbenium tetra(perfluorophenyl)borate.

In one embodiment, an activation method using ionizing ionic compounds not containing an active proton but capable of producing an analogous metallocene catalyst cation and their non-coordinating anion are also contemplated, and are described in EP-A-0 426 637, EP-A-0 573 403 and U.S. Pat. No. 5,387,568, which are all herein incorporated by reference.

The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those which are not degraded to neutrality when the initially formed complex decomposes. Non-coordinating anions useful in accordance with this invention are those that are compatible, stabilize the metal cation in the sense of balancing its ionic charge, yet retain sufficient lability to permit displacement by an ethylenically or acetylenically unsaturated monomer during polymerization. These types of cocatalysts sometimes use triisobutyl aluminum or tri-octyl aluminum as a scavenger.

Invention process also can employ cocatalyst compounds or activator compounds that are initially neutral Lewis acids but form a cationic metal complex and a noncoordinating anion, or a zwitterionic complex upon reaction with the invention compounds. For example, tris(pentafluorophenyl) boron or aluminum act to abstract a hydrocarbyl or hydride ligand to yield an invention cationic metal complex and stabilizing noncoordinating anion, see EP-A-0 427 697 and EP-A-0 520 732 for illustrations of analogous Group-4 metallocene compounds. Also, see the methods and compounds of EP-A-0 495 375. For formation of zwitterionic complexes using analogous Group 4 compounds, see U.S. Pat. Nos. 5,624,878; 5,486,632; and 5,527,929.

Additional neutral Lewis-acids including neutral Lewis acid activators are known in the art and are suitable for abstracting formal anionic ligands. See in particular the review article by E. Y.-X. Chen and T. J. Marks, "Cocatalysts for Metal-Catalyzed Olefin Polymerization: Activators, Activation Processes, and Structure-Activity Relationships", Chem. Rev., 100, 1391-1434 (2000).

When the catalyst complex does not contain at least one hydride or hydrocarbyl ligand but does contain at least one functional group ligand, such as chloride, amido or alkoxy ligands, and the functional group ligands are not capable of discrete ionizing abstraction with the ionizing, anion precursor compounds, these functional group ligands can be converted via known alkylation reactions with organometallic compounds such as lithium or aluminum hydrides or alkyls, alkylalumoxanes, Grignard reagents, etc. See EP-A-0 500 944, EP-A1-0 570 982 and EP-A1-0 612 768 for analogous processes describing the reaction of alkyl aluminum compounds with analogous dihalide substituted metallocene compounds prior to or with the addition of activating noncoordinating anion precursor compounds.

When the cations of noncoordinating anion precursors are Bronsted acids such as protons or protonated Lewis bases (excluding water), or reducible Lewis acids such as ferrocenium or silver cations, or alkali or alkaline earth metal cations such as those of sodium, magnesium or lithium, the catalyst-precursor-to-activator molar ratio may be any ratio. Combinations of the described activator compounds may also be used for activation. For example, tris(perfluorophenyl) boron can be used with methylalumoxane.

Non-ionizing Activators

Activators are typically strong Lewis-acids which may play either the role of ionizing or non-ionizing activator. Activators previously described as ionizing activators may also be used as non-ionizing activators.

Abstraction of formal neutral ligands may be achieved with Lewis acids that display an affinity for the formal neutral ligands. These Lewis acids are typically unsaturated or weakly coordinated. Examples of non-ionizing activators include $R^5(R^6)_3$, where $R^5$ is a group 13 element and $R^6$ is a hydrogen, a hydrocarbyl, a substituted hydrocarbyl, or a functional group. Typically, $R^6$ is an arene or a perfluorinated arene. Non-ionizing activators also include weakly coordinated transition metal compounds such as low valent olefin complexes. Non-limiting examples of non-ionizing activators include $BMe_3$, $BEt_3$, $B(iBu)_3$, $BPh_3$, $B(C_6F_5)_3$, $AlMe_3$, $AlEt_3$, $Al(iBu)_3$, $AlPh_3$, $B(C_6F_5)_3$, alumoxane, CuCl, $Ni(1,5$-cyclooctadiene$)_2$.

Additional neutral Lewis-acids are known in the art and will be suitable for abstracting formal neutral ligands. See in particular the review article by E. Y.-X. Chen and T. J. Marks, "Cocatalysts for Metal-Catalyzed Olefin Polymerization: Activators, Activation Processes, and Structure-Activity Relationships", Chem. Rev., 100, 1391-1434 (2000).

Preferred non-ionizing activators include $R^5(R^6)_3$, where $R^5$ is a group 13 element and $R^6$ is a hydrogen, a hydrocarbyl, a substituted hydrocarbyl, or a functional group. Typically, $R^6$ is an arene or a perfluorinated arene.

More preferred non-ionizing activators include $B(R^7)_3$, where $R^7$ is a an arene or a perfluorinated arene. Even more preferred non-ionizing activators include $B(C_6H_5)_3$ and $B(C_6F_5)_3$. A particularly preferred non-ionizing activator is $B(C_6F_5)_3$. More preferred activators are ionizing and non-ionizing activators based on perfluoroaryl borane and perfluoroaryl borates such as $PhNMe_2H^+B(C_6F_5)_4^-$, $(C_6H_5)_3C^+B(C_6F_5)_4^-$, and $B(C_6F_5)_3$.

The combined metal compounds and the activator may be combined in ratios of about 1000:1 to about 0.5:1. In a preferred embodiment the metal compounds and the activator are combined in a ratio of about 300:1 to about 1:1, preferably about 150:1 to about 1:1, for boranes, borates, aluminates, etc. the ratio is preferably about 1:1 to about 10:1 and for alkyl aluminum compounds (such as diethylaluminum chloride combined with water) the ratio is preferably about 0.5:1 to about 10:1. The ratio of the first catalyst to the second or additional catalyst is 5:95 to 95:5, preferably 25:75 to 75:25, even more preferably 40:60 to 60:40.

Formulations

In an embodiment, the inventive composition may include various additives. As such, the elastomer may be combined with, or may also comprise an admixture of various components to produce an elastomeric composition having particular properties. Additives suitable for use in the inventive elastomeric composition disclosed herein may comprise one or more of graft polymers as described below, C2-C40 polymers, other elastomers, random copolymers, impact copolymers, tackifiers, crosslinking agents, antioxidants, neutralizing agents, nucleating agents, fillers, adhesion promoters, waxes, low molecular weight polymers, ester polymers, plasticizers, and/or other such additives.

Graft Polymers

Preferred additives include grafted polymers referred to herein as "POA's" or "POA polymers", which are described in U.S. Ser. No. 10/686,951, filed Oct. 15, 2003, now U.S. Pat. No. 7,524,910, and U.S. Ser. No. 10/687,508, filed Oct. 15, 2003, now U.S. Pat. No. 7,294,681, which are incorporated by reference herein. In particular, pages 23 to 91 of U.S. Ser. No. 10/686,951, now U.S. Pat. No. 7,524,910, and pages 22 to 168 of U.S. Ser. No. 10/687,508, now U.S. Pat. No. 7,294,681, provide specific instruction on how to produce the POA polymers useful herein. In general preferred POA's comprise a polypropylene prepared utilizing two or more catalysts (typically metallocene catalysts), wherein one catalyst is selected as being capable of producing essentially atactic polypropylene (aPP), and the other metallocene catalyst is selected as being capable of producing isotactic polypropylene (iPP) under the polymerization conditions utilized. Preferably, under the polymerization conditions utilized, incorporation of aPP and iPP polymer chains may occur within the in-reactor blend such that an amount of amorphous polypropylene present in the POA polymer is grafted to isotactic polypropylene, represented herein as (aPP-g-iPP) and/or such that an amount of isotactic polypropylene present in the POA polymer is grafted to amorphous polypropylene, represented herein as (iPP-g-aPP).

Elastomers

In another embodiment the elastomeric composition may comprise elastomers other than the syndiotactic rich polypropylene composition. Examples of suitable elastomers include one or more polypropylene copolymers having elastic properties. Such preferred propylene copolymers having elastic properties may be prepared according the procedures in WO 02/36651 which is incorporated by reference here. Likewise, the additive may comprise polymers consistent with those described in WO 03/040202, WO 03/040095, WO 03/040201, WO 03/040233, and/or WO 03/040442. Additionally, the elastomeric composition may comprise polymers consistent with those described in EP 1,233,191, and U.S. Pat. No. 6,525,157.

Other elastomers suitable for use as an additive in the elastomeric composition include all natural and synthetic rubbers, including those defined in ASTM D 1566. In a preferred embodiment, elastomers may be rubber toughened compositions. In a particularly preferred embodiment, the rubber toughened composition is a two (or more) phase system where the rubber is a discontinuous phase within a continuous phase comprising the functionalized amorphous syndiotactic rich polyolefin. Examples of preferred elastomers include ethylene propylene rubber, ethylene propylene diene monomer rubber, neoprene rubber, styrenic block copolymer rubbers (including SI, SIS, SB, SBS, SIBS, SEBS, SEPS, and the like (S is styrene, I is isoprene, B is butadiene, EB is ethylenebutylene, EP is ethylenepropylene), butyl rubber, halobutyl rubber, copolymers of isobutylene and para-alkylstyrene, halogenated copolymers of isobutylene and para-alkylstyrene.

Random Copolymers

In another embodiment, the elastomeric composition may comprise a random copolymer. Random copolymers suitable for use herein may be produced by copolymerizing propylene in a single reactor process with other monomers such as ethylene, butene and higher alpha-olefins, the most common one being ethylene. Ethylene content for these additive copolymers preferably ranges from 3-4 mole %, up to 14-17 mole %.

Impact Copolymers

In another embodiment the elastomeric composition may comprise one or more impact copolymers, also called heterophasic copolymers or block copolymers. Impact copolymers suitable for use herein may be defined to be a blend of isotactic PP and an elastomer such as an ethylene-propylene rubber. In a preferred embodiment the impact copolymer blend is present in a two (or more) phase system where the impact copolymer is a discontinuous phase in the elastomeric composition and one or more of the other additives as described above, is the continuous phase.

Tackifiers

The elastomeric composition may also include tackifiers. Examples of suitable tackifiers may be selected from the group consisting of aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, and hydrogenated rosin esters. In some embodiments the tackifier may be hydrogenated.

In other embodiments, the tackifier may be non-polar, meaning that the tackifier is substantially free of monomers having polar groups. Preferably, the polar groups are not present, however if they are present, they are preferably not present at more that 5 wt %, preferably not more that 2 wt %, even more preferably no more than 0.5 wt %. In some embodiments the tackifier may have a Ring and Ball softening point, as measured by ASTM E-28 of 80° C. to 150° C., preferably 100° C. to 130° C. In another embodiment the resins is liquid and has a Ring and Ball softening point of between 10° C. and 70° C.

Preferred additives include hydrocarbon resins used as tackifiers or modifiers which include resins such as C5/C6 terpene resins, styrene terpenes, alpha-methyl styrene terpene resins, C9 terpene resins, aromatic modified C5/C6, aromatic modified cyclic resins, aromatic modified dicyclopentadiene based resins or mixtures thereof. Additional preferred resins include those described in WO 91/07472, U.S. Pat. No. 5,571, 867, U.S. Pat. No. 5,171,793 and U.S. Pat. No. 4,078,132. These resins may be obtained from the cationic polymerization of compositions containing one or more of the following monomers: C5 diolefins (such as 1-3 pentadiene, isoprene, and the like); C5 olefins (such as 2-methylbutenes, cyclopentene, and the like); C6 olefins (such as hexene), C9 vinylaromatics (such as styrene, alpha methyl styrene, vinyltoluene, indene, methyl indene, and the like); cyclics (such as dicyclopentadiene, methyldicyclopentadiene, and the like); and or terpenes (such as limonene, carene, thujone, and the like).

Also preferred additives include hydrocarbon resins used as tackifiers or modifiers which include resins obtained by the thermal polymerization of dicyclopentadiene, and/or the thermal polymerization of dimers or oligomers of cyclopentadiene and/or methylcyclopentadiene, and/or with vinylaromatics (such as styrene, alpha-methyl styrene, vinyl toluene, indene, methyl indene, and the like).

The resins obtained after polymerization and separation of unreacted materials, can be hydrogenated if desired. Examples of preferred resins for use as additives herein include those described in U.S. Pat. No. 4,078,132; WO 91/07472; U.S. Pat. No. 4,994,516; EP 0 046 344 A; EP 0 082 726 A; and U.S. Pat. No. 5,171,793.

Crosslinking Agents

In another embodiment the elastomeric composition may further comprises a crosslinking agent. Preferred crosslinking agents include those having functional groups that can react with the functional group present on the VMX-g-FG, for example, the anhydride group present on VMX-g-MA. Preferred crosslinking agents include alcohols, multiols, amines, diamines and/or triamines. Particular examples of crosslinking agents useful in this invention include polyamines such as ethylenediamine, diethylenetriamine, hexamethylenediamine, diethylaniinopropylamine, and/or menthanediamine.

Antioxidants

In another embodiment, the elastomeric composition may comprise one or more phenolic antioxidants. Preferred examples of phenolic antioxidants include substituted phenols such as 2,6-di-t-butylphenol in which a hydrogen atom at 2 and/or 6 position is substituted by an alkyl residue. Typical examples of the phenolic antioxidant include 2,6-di-t-butyl-p-cresol, 2,4,6-tri-t-butylphenol, vitamin E, 2-t-butyl-6-(3'-t-butyl-5'-methyl-2'-hydroxybenzyl)-4-methylphenyl acrylate, 2,2'-methylene-bis(4-methyl-6-t-butylphenyl), 2,2'- methylene-bis(4-ethyl-6-t-butyl-phenol), 2,2'-methylene-bis (6-cyclohexyl-4-methylphenol), 1,6-hexanediol-bis([3-(3,5-di-t-butyl[4-hydroxyphenyl])] propionate, and pentaerythrityl-tetrakis-[3-(3,5-di-t-butyl-4-hydroxyphenyl)] propionate. Preferred antioxidants include phenolic antioxidants, such as Irganox 1010, Irganox, 1076 both available from Ciba-Geigy.

Neutralizing Agents/Nucleating Agents

The elastomeric composition of the present invention may also include a neutralizing agent such as calcium stearate, magnesium hydroxide, aluminum hydroxide or hydrotalcite, and/or a nucleating agent such as a salt of benzoic acid, sodium-2,2'-methylene-bis(4,6-di-t-butylphenyl) phosphate and benzyl sorbitol, and the like.

Fillers

In another embodiment, the elastomeric composition may comprise fillers. Suitable fillers include titanium dioxide, calcium carbonate, barium sulfate, silica, silicon dioxide, carbon black, sand, glass beads, mineral aggregates, talc, clay, and the like.

Additional embodiments contemplated include a nanoclay, also referred to herein as a nanocomposite, comprising organo-clay, and the polyolefin of the present invention, preferably the polyolefin comprising stabilization functionality, preferably the stabilization functionality being covalent.

The organo-clay may comprise one or more of ammonium, primary alkylammonium, secondary alkylammonium, tertiary alkylammonium, quaternary alkylammonium, phosphonium derivatives of aliphatic, aromatic or arylaliphatic amines, phosphines or sulfides or sulfonium derivatives of aliphatic, aromatic or arylaliphatic amines, phosphines or sulfides.

The organo-clay may be selected from one or more of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite and/or florine mica.

The organo-clay is preferably present in the nanocomposite at from 0.1 to 50 wt %, based on the total weight of the nanocomposite. The stabilization functionality may be selected from one or more of phenols, ketones, hindered amines, substituted phenols, substituted ketones, substituted hindered amines, and combinations thereof.

The nanocomposite may further comprise at least one elastomeric ethylene-propylene copolymer. The at least one elastomeric ethylene-propylene copolymer may be present in the nanocomposite from 1 to 70 wt %, based on the total weight of the nanocomposite. The nanocomposite may further comprise at least one non-functionalized thermoplastic polyolefin.

Preferably, the stabilization functionality is present in the at least one stabilization functionalized thermoplastic, and the organo-clay is present in the nanocomposite, each in an effective amount such that the heat aged failure of a molded sample of the nanocomposite by 10% when compared to a reference nanocomposite made with a thermoplastic polyolefin containing functionality substantially free of covalently-bonded stabilization functionality. In an embodiment, the stabilization functionality may be present in the at least one stabilization functionalized thermoplastic polyolefin from 0.01 to 15 wt % based on the total weight of the at least one stabilization functionalized thermoplastic.

The non-functionalized thermoplastic polyolefin is preferably miscible with the at least one first stabilization functionalized thermoplastic polyolefin. In such an embodiment, the at least one non-functionalized thermoplastic polyolefin may also be present in the nanocomposite from 1 to 40 wt %, based on the total weight of the nanocomposite, and the organo-clay may be present in the nanocomposite from 0.5 to 40 wt %, based on the total weight of the nanocomposite. Preferably, both the at least one first stabilization functionalized thermoplastic polyolefin and the at least one non-functionalized thermoplastic polyolefin each comprise one of polypropylene or polyethylene.

In another embodiment, a nanocomposite suitable for use in the adhesive of the present invention may comprise:

a) at least one first non-functionalized polypropylene present in the nanocomposite from 10 to 98 wt %, based on the total weight of the nanocomposite;

b) at least one second polypropylene comprising stabilization functionality, the stabilization functionality selected from one or more of phenols, ketones, hindered amines, substituted phenols, substituted ketones, substituted hindered amines, or combinations thereof, and the stabilization functionality present in the stabilization functionalized polypropylene from 0.05 to 15 wt %, based on the total weight of the of the polypropylene comprising stabilization functionality, the at least one second polypropylene comprising stabilization functionality present in the nanocomposite from 10 to 90 wt %, based on the total weight of the nanocomposite;

c) an organo-clay wherein the organo-clay comprises one or more of hexyl ammonium ion, octyl ammonium ion, 2-ethylhexyl ammonium ion, dodecyl ammonium ion, octadecyl ammonium ion, dioctyl dimethyl ammonium ion, trioctyl ammonium ion, distearyl ammonium ion, ammonium salt, pyridinium salt, sulfonium salt, phosphonium salt, or combinations thereof, wherein the organo-clay further comprising a clay selected from one or more of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite or florine mica, and wherein the organo-clay is present in the nanocomposite from 1 to 30 weight %, based on the total weight of the nanocomposite; and d) further comprising one or more of an ethylene-propylene elastomeric copolymer or an isobutylene rubber present in the nanocomposite at 2 to 70 wt %, based on the total weight of the nanocomposite.

Adhesion Promoters

In another embodiment the elastomeric composition may comprise one or more adhesion promoters including polar acids, polyaminoamides (such as Versamid 115, 125, 140, available from Henkel), urethanes (such as isocyanate/hydroxy terminated polyester systems, e.g. bonding agent TN/Mondur Cb-75 from Miles, Inc.), coupling agents, (such as silane esters (Z-6020 from Dow Coming)), titanate esters (such as Kr-44 available from Kenrich), reactive acrylate monomers (such as sarbox SB-600 from Sartomer), metal acid salts (such as Saret 633 from Sartomer), polyphenylene oxide, oxidized polyolefins, acid modified polyolefins, and anhydride modified polyolefins. Examples include silanes, titanates, organosylane, acrylics, acids, anhydrides, epoxy resins, hardening agents, polyamides, methylacrylates, epoxies, phenolic resins, polyisobutylene, aminoalkyl, mercaptoalkyl, epoxyalkyl, ureidoalkyl, carboxy, acrylate and isocyanurate functional silanes, mercaptopropyltrimethoxysilane, glycidoxpropyltrimethoxysilane, aminopropyltriethoxysilane, aminoethylaminopropyltrimethoxysilane, ureidopropyltrimethyloxysilane, bis-.gamma.-trimethoxysilylpropylurea, 1,3,5-tris-.gamma.-trimethoxysilylpropylisocyanurate, bis-.gamma.-trimethoxysilylpropylmaleate, fumarate and .gamma.-methacryloxypropyltrimethoxysilane, aminopropyltriethoxysilane, and combinations and derivatives thereof.

Waxes

Preferred waxes suitable for use in the elastomeric composition include polar or non-polar waxes, polypropylene waxes, polyethylene waxes, and wax modifiers. Particularly preferred waxes may be selected from the group consisting of: polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, amorphous waxes, carnauba waxes, castor oil waxes, microcrystalline waxes, beeswax, carnauba wax, castor wax, spermaceti wax, vegetable wax, candelilla wax, japan wax, ouricury wax, douglas-fir bark wax, ricebran wax, jojoba wax, bayberry wax, montan wax, peat wax, ozokerite wax, ear wax, ceresin wax, petroleum wax, paraffin wax, polyethylene wax, chemically modified hydrocarbon wax, substituted amide wax, and combinations and derivatives thereof. In some embodiments, the polar and non-polar waxes may be used together in the same composition.

Ester Polymers

In another embodiment the elastomeric composition may comprise one or more ester polymers (polyesters). In a preferred embodiment the additive comprises a blend of two (or more) phase system, where the polyester is a discontinuous phase.

Stabilizers

In another embodiment the elastomeric composition may comprise one or more stabilizers. Stabilizers suitable for use herein include hindered phenols, sulfur phenols, phosphorous-containing phenols, 1,3,5-trimethyl-2,4,6-tris(3-5-di-tert-butyl4-hydroxybenzyl) benzene, pentaerythritol tetrakis-3(3,5-di-tert-butyl-4-hydroxyphenyl) propionate, n-octadecyl-3(3,5-di-tert-butyl4-hydroxyphenyl) propionate, 4,4'-methylenebis(4-methyl-6-tert butylphenol), 4,4'-thiobis(6-tert-butyl-o-cresol), 2,6-di-tert-butylphenol, 6-(4-hydroxyphenoxy)-2,4-bis(n-ocytlthio)-1,3,5-triazine, 2,4,6-tris(4-hydroxy-3,5-di-tert-butyl-phenoxy)-1,3,5-triazine, di-n-octadecyl-3,5-di-tert-butyl-4-hydroxybenzylphosphonate, 2-(n-octylthio)ethyl-3,5-di-tert-butyl-4-hydroxybenzoate, sorbitol hexa-(3,3,5-di-tert-butyl-4-hydroxy-phenyl) propionate, and combinations or derivatives thereof.

Plasticizers

Preferred plasticizers also include polyalphaolefins (PAO's), high purity hydrocarbon fluid compositions (HPFC's) and Group III basestocks such as those described in WO 2004/014998 at page 16, line 14 to page 24, line 1. Particularly preferred PAO's include oligomers of decene and co-oligomers of decene and dodecene. Preferred PAO's are available under the trade name Supersyn from ExxonMobil Chemical Company in Houston Texas. In a preferred embodiment, the PAO, HPFC or Group m base stock is present at from 0.5 to 60 weight %, based upon the weight of the polymer and the PAO, HPFC or Group III base stock.

Other Additives

Other preferred additives suitable for use in the elastomeric composition include block, antiblock, pigments, dyes, dyestuffs, processing aids, UV stabilizers, lubricants such as polydimethylsiloxane and calcium sterate, adjuvants, surfactants, color masterbatches, flow improvers, crystallization aids, plasticizers, oils, antioxidants, polymeric additives, defoamers, preservatives, thickeners, rheology modifiers, humectants, fillers, water, and the like.

Polymeric additives may include homo poly-alpha-olefins, copolymers of alpha-olefins, copolymers and terpolymers of diolefins, elastomers, polyesters, block copolymers, ester polymers, acrylate polymers, alkyl acrylate polymers and vinyl acetate polymers.

In another embodiment this invention relates to:

1. An elastomeric composition comprising propylene, the composition further comprising:
    a peak melting point temperature below about 110° C. determined in a first heating cycle using differential scanning calorimetry;
    a tensile set of 40% or less determined according to ASTM D412, and
    greater than or equal to about 60% [r] dyads, based on the total
    number of dyads present in the composition.
2. The composition of paragraph 1, having a tensile set of 35% or less.
3. The composition of paragraph 1, having a tensile set of 30% or less.
4. The composition of paragraph 1, having a tensile set of 25% or less.
5. The composition of paragraph 1, having a tensile set of 20% or less.
6. The composition of paragraph 1, having a tensile set of 10% or less.
7. The composition of any of paragraphs 1 to 6, having a number average molecular weight of about 70,000 to about 1,000,000 g/mol, determined using GPC.
8. The composition of any of paragraphs 1 to 7, having a weight average molecular weight of about 140,000 to about 1,400,000 g/mol, determined using GPC.
9. The composition of any of paragraphs 1 to 8, having a z average molecular weight of about 210,000 to about 2,100,000 g/mol, determined using GPC.
10. The composition of any of paragraphs 1 to 9, having a molecular weight distribution (Mw/Mn) of about 1.5 to about 6.5.
11. The composition of any of paragraphs 1 to 10, having a g' index of about 1.10 to about 1.50.
12. The composition of any of paragraphs 1 to 11, having a melting peak temperature (Tm) of about 60° C. to about 110° C.
13. The composition of any of paragraphs 1 to 12, having a heat of melting of about 30 J/g or less.
14. The composition of any of paragraphs 1 to 13, having a glass transition temperature (Tg) of about −10° C. to about +15° C., determined according to ASTM E1356.
15. The composition of any of paragraphs 1 to 14, having a melt flow rate of about 0.1 to about 500 g/10 min.
16. The composition of any of paragraphs 1 to 15, having 60% to 79% [r] dyads, based on the total number of dyads present in the composition.
17. The composition of paragraph 16, having 65% to 78% [r] dyads, based on the total number of dyads present in the composition.
18. The composition of paragraph 16, having 30% to 65% [r] triads, based on the total number of triads present in the composition.
19. The composition of any of paragraphs 1 to 18, further comprising at least 0.001 wt % of a C2-C40 alpha-olefin.
20. The composition of any of paragraphs 1 to 19, further comprising at least 0.001 wt % ethylene, butene-1, pentene-1, hexene-1, heptene-1, octene-1, nonene-1, decene-1, undecene-1, dodecene-1, tridecene-1, tetradecene-1, pentadecene-1, hexadecene-1, heptadecene-1, octadecene-1, and branched olefins including 3-methylbutene-1,3-methylepentene-1,4-methylepentene-1,3,5,5-trimethylhexene-1,5-ethyl-1-nonene, 4,4-dimethylepentene-1, or a combination thereof.

21. The composition of any of paragraphs 1 to 20, further comprising less than or equal to about 10 wt % ethylene.

22. The composition of any of paragraphs 1 to 21, comprising a mixture of polymers, wherein each of the polymers comprises propylene.

23. The composition of any of paragraphs 1 to 22, further comprising one or more graft polymers, C2-C40 polymers, random copolymers, impact copolymers, tackifiers, crosslinking agents, antioxidants, neutralizing agents, nucleating agents, fillers, adhesion promoters, waxes, low molecular weight polymers, plasticizers, or ester polymers.

24. A process to produce an elastomeric composition comprising the steps of:

A. providing propylene, and optionally one or more additional olefin monomers, a metallocene transition metal catalyst precursor, and an activator to a reactor;

B. catalytic polymerization in the reactor of the propylene and optionally the one or more other olefin monomers at a temperature, at a pressure, and for a period of time sufficient to produce the elastomeric composition, wherein the elastomeric composition comprises a peak melting point temperature below about 110° C.;

a tensile set of 40% or less determined according to ASTM D412; and greater than or equal to about 60% [r] dyads, based on the total number of dyads present in the composition.

25. The process of paragraph claim 24, wherein the catalytic polymerization is conducted at −60° C. to about 150° C.

26. The process of paragraph 24 or 25, wherein the catalytic polymerization is conducted in a fluidized gas bed.

27. The process of any of paragraphs 24 to 26, wherein the catalytic polymerization is conducted in slurry, optionally in the presence of a diluent.

28. The process of any of paragraphs 24 to 26, wherein the catalytic polymerization is conducted in a homogeneous solution.

29. The process of any of paragraphs 24 to 28, wherein the metallocene transition metal catalyst precursor is in combination with an activator as represented by the formula:

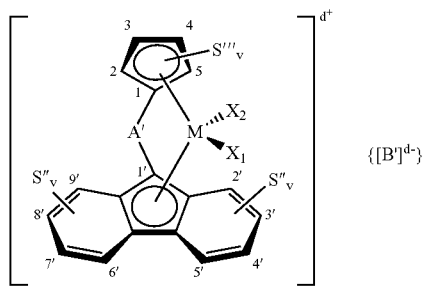

wherein A' is a bridging group comprising a divalent radical;

M is titanium, zirconium or hafnium; $X_1$ and $X_2$ are independently a hydride radical, hydrocarbyl radical, substituted-hydrocarbyl radical, hydrocarbyl-substituted organometalloid radical or halocarbyl-substituted organometalloid radical which radical may optionally be covalently bonded to all or any of M, S" or S"', and provided that $X_1$ and X2 are not a substituted or unsubstituted cyclopentadienyl ring;

S" and S"' are independently a C1-C40 radical group which is a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radical;

subscript v denotes the number of carbon to which each S" or S"' is attached;

d is an integer representing the charge of B'; and

B' is the activator.

30. The process of any of paragraphs 24 to 29, wherein the activator is a non-ionizing activator or an ionizing activator.

31. The process of paragraph 29, wherein the activator comprises aluminum.

32. The process of paragraph 29, wherein the activator comprises a tri-substituted boron atom or a tri substituted phosphorus atom.

33. The process of paragraph 29, wherein the activator is at least one of: trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium) tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl) borate, N,N-dimethylanilinium tetrakis(pentafluorophenyl) borate, N,N-diethylanilinium tetrakis(pentafluorophenyl) borate, N,N-dimethyl-(2,4,6-trimethylanilinium) tetrakis (pentafluorophenyl) borate, trimethylammonium tetrakis-(2,3,4,6-tetrafluorophenylborate, triethylammonium tetrakis-(2,3,4,6-tetrafluorophenyl) borate, tripropylammonium tetrakis-(2,3,4,6-tetrafluorophenyl) borate, tri(n-butyl)ammonium tetrakis-(2,3,4,6-tetrafluoro-phenyl) borate, dimethyl(t-butyl)ammonium tetrakis-(2,3,4,6-tetrafluorophenyl) borate, N,N-dimethylanilinium tetrakis-(2,3,4,6-tetrafluorophenyl) borate, N,N-diethylanilinium tetrakis-(2,3,4,6-tetrafluoro-phenyl) borate, N,N-dimethyl-(2,4,6-trimethylanilinium)tetrakis-(2,3,4,6-tetrafluorophenyl) borate, di-(i-propyl)ammonium tetrakis(pentafluorophenyl) borate, dicyclohexylammonium tetrakis(pentafluorophenyl) borate, triphenylphosphonium tetrakis(pentafluorophenyl) borate, tri(o-tolyl)phosphonium tetrakis (pentafluorophenyl) borate, or tri(2,6-dimethylphenyl) phosphonium tetrakis(pentafluorophenyl) borate.

34. The process of any of paragraphs 29 to 33, wherein the activator is bound to a support comprising silica.

35. The process of paragraph 29, wherein the activator is N,N-dimethylanilinium tetra(perfluorophenyl)borate and/or triphenylcarbenium tetra(perfluorophenyl)borate.

36. The process of paragraph 29, wherein the metallocene transition metal catalyst precursor is at least one of: isopropylidene(cyclopentadienyl)(fluorenyl) zirconium dichloride, isopropylidene(cyclopentadienyl)(fluorenyl) zirconium dimethyl, methylene(cyclopentadienyl)(fluorenyl) zirconium dichloride, methylene(cyclopentadienyl)(fluorenyl) zirconium dimethyl, diphenylmethylene(cyclopentadienyl)(fluorenyl) zirconium dichloride, diphenylmethylene(cyclopentadienyl)(fluorenyl) zirconium dimethyl, di(p-triethylsilylphenyl)methylene(cyclopentadienyl)(fluorenyl) zirconium dichloride, di(p-triethylsilylphenyl)methylene(cyclopentadienyl)(fluorenyl) zirconium dimethyl, di(p-trimethylsilylphenyl)methylene(cyclopentadienyl)(fluorenyl) zirconium dichloride, di(p-trimethylsilylphenyl)methylene(cyclopentadienyl)(fluorenyl) zirconium dimethyl, diphenylsilyl(cyclopenta+dienyl)(fluorenyl) zirconium dichloride, diphenylsilyl(cyclopentadienyl)(fluorenyl) zirconium dimethyl, dimethylsilyl(cyclopentadienyl)(fluorenyl) zirconium dichloride, dimethylsilyl(cyclopentadienyl)(fluorenyl) zirconium dimethyl, methylphenylsilyl(cyclopentadienyl)(fluorenyl) zirconium dichloride, methylphenylsilyl(cyclopentadienyl)(fluorenyl) zirconium dimethyl, isopropylidene(cyclopentadienyl)(fluorenyl) hafnium dichloride, isopropylidene(cyclopentadienyl)(fluorenyl) hafnium dimethyl, methylene(cyclopentadienyl)(fluorenyl) hafnium dichloride, methylene(cyclopentadienyl)(fluorenyl) hafnium dimethyl, diphenylmethylene(cyclopentadienyl)(fluorenyl) hafnium dichloride, diphenylmethylene(cyclopentadienyl)(fluorenyl) hafnium dimethyl, di(p-triethylsilylphenyl)methylene(cyclopentadienyl)(fluorenyl) hafnium dichloride, di(p-triethylsilylphenyl)methylene(cyclopentadienyl)(fluorenyl) hafnium dimethyl, di(p-trimethylsilylphenyl)methylene(cyclopentadienyl)(fluorenyl) hafnium dichloride, di(p-trimethylsilylphenyl)methylene(cyclopentadienyl)(fluorenyl) hafnium dimethyl, diphenylsilyl(cyclopentadienyl)(fluorenyl) hafnium dichloride, diphenylsilyl(cyclopentadienyl)(fluorenyl) hafnium dimethyl, dimethylsilyl(cyclopentadienyl)(fluorenyl) hafnium dichloride, dimethylsilyl(cyclopentadienyl)(fluorenyl) hafnium dimethyl, methylphenylsilyl(cyclopentadienyl)(fluorenyl) hafnium dichloride, methylphenylsilyl(cyclopentadienyl)(fluorenyl) hafnium dimethyl, isopropylidene(cyclopentadienyl)(3,8-di-t-butylfluorenyl) zirconium dichloride, isopropylidene(cyclopentadienyl)(3,8-di-t-butylfluorenyl) zirconium dimethyl, methylene(cyclopentadienyl)(3,8-di-t-butylfluorenyl) zirconium dichloride, methylene(cyclopentadienyl)(3,8-di-t-butylfluorenyl) zirconium dimethyl, diphenylmethylene(cyclopentadienyl)(3,8-di-t-butylfluorenyl) zirconium dichloride, diphenylmethylene(cyclopentadienyl)(3,8-di-t-butylfluorenyl) zirconium dimethyl, di(p-triethylsilylphenyl)methylene(cyclopentadienyl)(3,8-di-t-butylfluorenyl) zirconium dichloride, di(p-triethylsilylphenyl)methylene(cyclopentadienyl)(3,8-di-t-butylfluorenyl) zirconium dimethyl, di(p-trimethylsilylphenyl)methylene(cyclopentadienyl)(3,8-di-t-butylfluorenyl) zirconium dichloride, di(p-trimethylsilylphenyl)methylene(cyclopentadienyl)(3,8-di-t-butylfluorenyl) zirconium dimethyl, diphenylsilyl(cyclopentadienyl)(3,8-di-t-butylfluorenyl) zirconium dichloride, diphenylsilyl(cyclopentadienyl)(3,8-di-t-butylfluorenyl) zirconium dimethyl, dimethylsilyl(cyclopentadienyl)(3,8-di-t-butylfluorenyl) zirconium dichloride, dimethylsilyl(cyclopentadienyl)(3,8-di-t-butylfluorenyl) zirconium dimethyl, methylphenylsilyl(cyclopentadienyl)(3,8-di-t-butylfluorenyl) zirconium dichloride, methylphenylsilyl(cyclopentadienyl)(3,8-di-t-butylfluorenyl) zirconium dimethyl, isopropylidene(cyclopentadienyl)(3,8-di-t-butylfluorenyl) hafnium dichloride, isopropylidene(cyclopentadienyl)(3,8-di-t-butylfluorenyl) hafnium dimethyl, methylene(cyclopentadienyl)(3,8-di-t-butylfluorenyl) hafnium dichloride, methylene(cyclopentadienyl)(3,8-di-t-butylfluorenyl) hafnium dimethyl, diphenylmethylene(cyclopentadienyl)(3,8-di-t-butylfluorenyl) hafnium dichloride, diphenylmethylene(cyclopentadienyl)(3,8-di-t-butylfluorenyl) hafnium dimethyl, di(p-triethylsilylphenyl)methylene(cyclopentadienyl)(3,8-di-t-butylfluorenyl) hafnium dichloride, di(p-triethylsilylphenyl)methylene(cyclopentadienyl)(3,8-di-t-butylfluorenyl) hafnium dimethyl, di(p-trimethylsilylphenyl)methylene(cyclopentadienyl)(3,8-di-t-butylfluorenyl) hafnium dichloride, di(p-trimethylsilylphenyl)methylene(cyclopentadienyl)(3,8-di-t-butylfluorenyl) hafnium dimethyl, diphenylsilyl(cyclopentadienyl)(3,8-di-t-butylfluorenyl) hafnium dichloride, diphenylsilyl(cyclopentadienyl)(3,8-di-t-butylfluorenyl) hafnium dimethyl, dimethylsilyl(cyclopentadienyl)(3,8-di-t-butylfluorenyl) hafnium dichloride, dimethylsilyl(cyclopentadienyl)(3,8-di-t-butylfluorenyl) hafnium dimethyl, methylphenylsilyl(cyclopentadienyl)(3,8-di-t-butylfluorenyl) hafnium dichloride, methylphenylsilyl(cyclopentadienyl)(3,8-di-t-butylfluorenyl) hafnium dimethyl, isopropylidene(cyclopentadienyl)(3,3,6,6,9,9,12,12-octamethyl-4,4,5,5,8,8,9,9-octahydrodibenzyl[b,h]fluorenyl) zirconium dichloride, isopropylidene(cyclopentadienyl)(3,3,6,6,9,9,12,12-octamethyl-4,4,5,5,8,8,9,9-octahydrodibenzyl[b,h]fluorenyl) zirconium dimethyl, methylene(cyclopentadienyl)(3,3,6,6,9,9,12,12-octamethyl4,4,5,5,8,8,9,9-octahydrodibenzyl[b,h]fluorenyl) zirconium dichloride, methylene(cyclopentadienyl)(3,3,6,6,9,9,12,12-octamethyl4,4,5,5,8,8,9,9-octahydrodibenzyl[b,h]fluorenyl) zirconium dimethyl, diphenylmethylene(cyclopentadienyl)(3,3,6,6,9,9,12,12-octamethyl-4,4,5,5,8,8,9,9-octahydrodibenzyl[b,h]fluorenyl) zirconium dichloride, diphenylmethylene(cyclopentadienyl)(3,3,6,6,9,9,12,12-octamethyl-4,4,5,5,8,8,9,9-octahydrodibenzyl[b,h]fluorenyl) zirconium dimethyl, di(p-triethylsilylphenyl)methylene(cyclopentadienyl)(3,3,6,6,9,9,12,12-octamethyl4,4,5,5,8,8,9,9-octahydrodibenzyl[b,h]fluorenyl) zirconium dichloride, di(p-triethylsilylphenyl)methylene(cyclopentadienyl)(3,3,6,6,9,9,12,12-octamethyl-4,4,5,5,8,8,9,9-octahydrodibenzyl[b,h]fluorenyl) zirconium dimethyl, di(p-trimethylsilylphenyl)methylene(cyclopentadienyl)(3,3,6,6,9,9,12,12-octamethyl4,4,5,5,8,8,9,9-octahydrodibenzyl[b,h]fluorenyl) zirconium dichloride, di(p-trimethylsilylphenyl)methylene(cyclopentadienyl)(3,3,6,6,9,9,12,12-octamethyl-4,4,5,5,8,8,9,9-octahydrodibenzyl[b,h]fluorenyl) zirconium dimethyl, diphenylsilyl(cyclopentadienyl)(3,3,6,6,9,9,12,12-octamethyl-4,4,5,5,8,8,9,9-octahydrodibenzyl[b,h]fluorenyl) zirconium dichloride, diphenylsilyl(cyclopentadienyl)(3,3,6,6,9,9,12,12-octamethyl-4,4,5,5,8,8,9,9-octahydrodibenzyl[b,h]fluorenyl) zirconium dimethyl, dimethylsilyl(cyclopentadienyl)(3,3,6,6,9,9,12,12-octamethyl-4,4,5,5,8,8,9,9-octahydrodibenzyl[b,h]fluorenyl) zirconium dichloride, dimethylsilyl(cyclopentadienyl)(3,3,6,6,9,9,12,12-octamethyl-4,4,5,5,8,8,9,9-octahydrodibenzyl[b,h]fluorenyl) zirconium dimethyl, methylphenylsilyl(cyclopentadienyl)(3,3,6,6,9,9,12, 12-octamethyl-4,4,5,5,8,8,9,9-octahydrodibenzyl[b,h]fluorenyl) zirconium dichloride, methylphenylsilyl(cyclopentadienyl)(3,3,6,6,9,9,12,12-octamethyl-4,4,5,5,8,8,9,9-octahydrodibenzyl[b,h]fluorenyl) zirconium dimethyl, isopropylidene(cyclopentadienyl)(3,3,6,6,9,9,12,12-octamethyl-4,4,5,5,8,8,9,9-octahydrodibenzyl[b,h]fluorenyl) hafnium dichloride, isopropylidene(cyclopentadienyl)(3,3,6,6,9,9,12,12-octamethyl-4,4,5,5,8,8,9,9-octahydrodibenzyl[b,h]fluorenyl) hafnium dimethyl, ethylene(cyclopentadienyl)(3,3,6,6,9,9,12,12-octamethyl4,4,5,5,8,8,9,9-octahydrodibenzyl[b,h]fluorenyl) hafnium dichloride, methylene(cyclopentadienyl)(3,3,6,6,9,9,12,12-octamethyl-4,4,5,5,8,8,9,9-octahydrodibenzyl[b,h]fluorenyl) hafnium dimethyl, diphenylmethylene(cyclopentadienyl)(3,3,6,6,9,9,12,12-octamethyl-4,4,5,5,8,8,9,9-octahydrodibenzyl[b,h]fluorenyl) hafnium dichloride, diphenylmethylene(cyclopentadienyl)(3,3,6,6,9,9,12,12-octamethyl-4,4,5,5,8,8,9,9-octahydrodibenzyl[b,h]fluorenyl) hafnium dimethyl, di(p-triethylsilylphenyl)methylene(cyclopentadienyl)(3,3,6,6,9,9,12,12-octamethyl4,4,5,5,8,8,9,9-octahydrodibenzyl[b,h]fluorenyl) hafnium dichloride, di(p-triethylsilylphenyl)methylene(cyclopentadienyl)(3,3,6,6,9,9,12,12-octamethyl-4,4,5,5,8,8,9,9-octahydrodibenzyl[b,h]fluorenyl) hafnium dimethyl, di(p-trimethylsilylphenyl)methylene(cyclopentadienyl)(3,3,6,6,9,9,12,12-octamethyl-4,4,5,5,8,8,9,9-octahydrodibenzyl[b,h]fluorenyl) hafnium dichloride, di(p-trimethylsilylphenyl)methylene(cyclopentadienyl)(3,3,6,6,9,9,12,12-octamethyl-4,4,5,5,8,8,9,9-octahydrodibenzyl[b,h]fluorenyl) hafnium dimethyl, diphenylsilyl(cyclopentadienyl)(3,3,6,6,9,9,12,12-octamethyl-4,4,5,5,8,8,9,9-octahydrodibenzyl[b,h]fluorenyl) hafnium dichloride, diphenylsilyl(cyclopentadienyl)(3,3,6,6,9,9,12,12-octamethyl-4,4,5,5,8,8,9,9-octahydrodibenzyl[b,h]fluorenyl) hafnium dimethyl, dimethylsilyl(cyclopentadienyl)(3,3,6,6,9,9,12,12-octamethyl-4,4,5,5,8,8,9,9-octahydrodibenzyl[b,h]fluorenyl) hafnium dichloride, dimethylsilyl(cyclopentadienyl)(3,3,6,6,9,9,12,12-octamethyl-4,4,5,5,8,8,9,9-octahydrodibenzyl[b,h]fluorenyl) hafnium dimethyl, methylphenylsilyl(cyclopentadienyl)(3,3,6,6,9,9,12,12-octamethyl-4,4,5,5,8,8,9,9-octahydrodibenzyl[b,h]fluorenyl) hafnium dichloride, methylphenylsilyl(cyclopentadienyl)(3,3,6,6,9,9,12,12-octamethyl-4,4,5,5,8,8,9,9-octahydrodibenzyl[b,h]fluorenyl) hafnium dimethyl, di(p-triethylsilylphenyl)methylene(cyclopentadienyl)(3,8-di-t-butylfluorenyl) zirconium dichloride, di(p-triethylsilylphenyl)methylene(cyclopentadienyl)(3,8-di-t-butylfluorenyl) hafnium dichloride, di(p-triethylsilylphenyl)methylene(cyclopentadienyl)(3,8-di-t-butylfluorenyl) zirconium dimethyl, di(p-triethylsilylphenyl)methylene(cyclopentadienyl)(3,8-di-t-butylfluorenyl) hafnium dimethyl, di(p-triethylsilylphenyl)methylene(cyclopentadienyl)(3,3,6,6,9,9,12,12-octamethyl-4,4,5,5,8,8,9,9-octahydrodibenzyl[b,h]fluorenyl) zirconium dichloride, di(p-triethylsilylphenyl)methylene(cyclopentadienyl)(3,3,6,6,9,9,12,12-octamethyl-4,4,5,5,8,8,9,9-octahydrodibenzyl[b,h]fluorenyl) hafnium dichloride, di(p-triethylsilylphenyl)methylene(cyclopentadienyl)(3,3,6,6,9,9,12,12-octamethyl-4,4,5,5,8,8,9,9-octahydrodibenzyl[b,h]fluorenyl) zirconium dimethyl, or di(p-triethylsilylphenyl)methylene(cyclopentadienyl)(3,3,6,6,9,9,12,12-octamethyl4,4,5,5,8,8,9,9-octahydrodibenzyl[b,h]fluorenyl) hafnium dimethyl. 37. The process of paragraph 24, 25, 26, 27 or 28, wherein the metallocene transition metal catalyst precursor is represented by the formula:

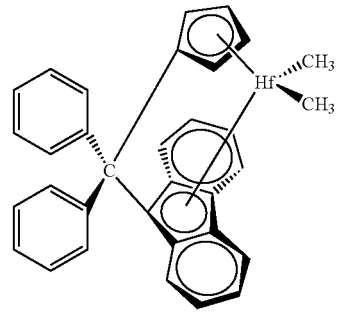

and the activator is dimethylaniliniumtetrakis(pentafluorophenyl)borate.

EXAMPLES

Characterization and Tests

Molecular weights (number average molecular weight (Mn), weight average molecular weight (Mw), and z-average molecular weight (Mz)) were determined using size exclusion chromatography (SEC), with a differential refractive index detector (DRI), an online low angle light scattering (LALLS) detector and a viscometer (VIS). The details of the detector calibrations are described in T. Sun, P. Brant, R. R. Chance, and W. W. Graessley, *Macromolecules*, Volume 34, Number 19, 6812-6820, (2001);

The molecular weight distribution (MWD) is defined for use herein as MWD=(Mw/Mn). The g' index was measured using SEC with an on-line viscometer (SEC-VIS) and is reported as g' at each molecular weight. The g' index is defined as:

$$g' = \frac{\eta_s}{\eta_l}$$

where $\eta_s$ is the intrinsic viscosity of the sample polymer and $\eta_l$ is the intrinsic viscosity of a linear polymer of the same viscosity-averaged molecular weight ($M_v$) as the sample polymer. $\eta_l = K M_v^\alpha$, K and α were measured values for linear polymers and should be obtained on the same SEC-DRI-LS-VIS instrument as the one used for g' index measurement. For polypropylene samples presented in this invention, K=0.0002288 and α=0.705 were used. The SEC-DRI-LS-VIS method obviates the need to correct for polydispersities, since the intrinsic viscosity and the molecular weight were measured at individual elution volumes, which arguably contain narrowly dispersed polymer. Linear polymers selected as standards for comparison should be of the same viscosity average molecular weight, monomer content and composition distribution.

Melting peak (Tm), peak crystallization temperature (Tc), heat of fusion and crystallinity were determined using the following procedure according to ASTM E 794-85. Differential scanning calorimetric (DSC) data was obtained using a TA Instruments model 2920 machine. Samples weighing approximately 7-10 mg were cut from a pressed film that had been aged at ambient temperature at least 24 hours, and placed in aluminum sample pans which were then sealed. The DSC data was recorded by first cooling the sample to −100°

C. and then gradually heating it to 200° C. at a rate of 10° C./minute. The sample was kept at 200° C. for 2 minutes before a second cooling-heating cycle was applied. Both first and second cycle thermal events were recorded. Areas under the curves were measured and used to determine the heat of melting and heat of fusion. For polymers displaying multiple melting or crystallization peaks, the highest melting peak was taken as peak melting point, and the highest crystallization peak was taken as peak crystallization temperature.

Polymerization

Polymerization of the inventive elastomeric composition was performed in a single-stage batch reactor using a metallocene catalyst system. The reactor was a 2.0-liter stainless steel autoclave reactor and was equipped with a stirrer, a water-cooling/steam-heating element with a temperature controller, and a pressure controller. Solvents and monomer(s), were first purified by passing through a three-column purification system. The purification system consists of an Oxiclear column (Model # RGP-R1-500 from Labclear) followed by a 5A and a 3A molecular sieve columns. Purification columns were regenerated periodically whenever there is evidence of lower activity of polymerization. Both the 3A and 5A molecular sieve columns were regenerated in-house under nitrogen at a set temperature of 260° C. and 315° C., respectively. The molecular sieve material was purchased from Aldrich. Oxiclear column was regenerated in the original manufacture.

The solvent, monomers and comonomers if present were fed into a manifold first. Monomers from in-house supply were delivered as a gas solubilized in the chilled solvent/monomer mixture in the manifold. The mixture of solvent and monomers were then chilled to about −15° C. by passing through a chiller before being fed into the reactor through a single tube. All liquid flow rates were measured using Brookfield mass flow meters or Micro-Motion Coriolis-type flow meters. Propylene flow rate was metered through a Brookfield mass flow controller.

Catalyst Preparation

A silica bound activator (SBA) was prepared according to the procedure in Example A of U.S. Pat. No. 6,562,920B2. In a dry nitrogen purged dry box, 28.62 mg of SBA was suspended in dried toluene. To this suspension was added a solution of 15.53 mg diphenylmethylene (cyclopentadienyl) (fluorenyl) hafnium dimethyl dissolved in 2.72 ml of dried toluene. The mixture was stirred for 5 min at room temperature and then loaded into a catalyst transfer tube.

The two liter stainless steel batch autoclave reactor was prepared for the polymerization by putting 0.3 mL of one-tenth diluted triisobutylaluminum (in toluene) into the steam dried reactor. 300 mL of liquid propylene was added to the reactor. The reactor was then heated to 60° C. The catalyst transfer tube containing the slurry of catalyst was connected to the 2 L batch reactor. The catalyst was flushed into the reactor with 100 mL of propylene. The polymerization was run for 60 minutes at 60° C. after which time the reactor was cooled and vented. The polymerization yielded 20.6 g of dried polypropylene.

The properties of the sample were as follows:

Tacticity $^{13}$C NMR Characterization of Sample 1

| Sequence | Sample |
|---|---|
| Pentads | |
| [mmmm] | 0.017 |
| [mmmr] | 0.026 |
| [mmrr] | 0.043 |
| [mrrr] | 0.092 |
| [mmrm + rrmr] | 0.130 |
| [mrmr] | 0.037 |
| [rrrr] | 0.449 |
| [rrrm] | 0.183 |
| [mrrm] | 0.023 |
| Triads | |
| [mm] | 0.086 |
| [mr + rm] | 0.259 |
| [rr] | 0.655 |
| Diads | |
| [m] | 0.227 |
| [r] | 0.773 |

Accordingly, the $^{13}$C NMR shows sample 1 to be syndio-rich.

Strain tensile behavior of the elastomeric compositions was measured at ambient temperature using an Instron 4502 equipped with a Model 4500 Controller. A constant sample strain rate of 2"/min was employed. Dog bones cut from molded plaques were used for these measurements. Dog bone dimensions were: total length: 2.5 cm, total width: 1 cm, neck length: 0.70 cm, neck width: 0.64 cm, dog bone thickness: 0.075 cm.

The Instron was also used to record stress relaxation, elastic recovery, and hysterisis data. Stress relaxation curves were obtained by holding the polymer dog bones at 100% strain for 10 minutes or 150% strain for 15 minutes at ambient temperature, followed by release. Elastic recovery measurements were made by stretching a polymer 150% at 20"/min, followed by a hold for one minute and then relaxation for 2"/min. The tension set (TS) of the sample was then measured, 1 minute, 10 minutes, and 3 days after relaxation, where TS= (ΔL/L)* 100. Recovery is defined as [100-tension set].

Elastomer hysteresis measurements were conducted at room temperature on the samples. Sequential stress-relaxation cycles were conducted at constant strain rate (20"/min) up to strains as great as 1000%. Relaxation time between strain cycles was constant: one minute.

Sample 1, the elastomeric composition was pressed at high temperature (e.g., 100° C.) into an optically clear pad. The pad was flexible and exceptionally elastic. The sample was dry to the touch. The pad was aged for at least 24 hours, then dogbones were cut from it and the dogbones were subjected to repetitive Instron tensile tests at ambient temperature. The results are shown in FIG. 1. Accordingly, the inventive composition possesses excellent elastomeric properties.

All documents described herein are incorporated by reference herein, including any priority documents and/or testing

| Sample | %[r] | % rr | % r$^4$ | Mn (DRI) | Mn VIS | Mw VIS | Mz VIS | g' (vi save) | DSC, first melt* |
|---|---|---|---|---|---|---|---|---|---|
| 1 | 77.3 | 65.5 | 45 | 646,300 | 423,000 | 929,000 | 1,885,000 | 1.382 | 76° C. (weak) |

*no second melt procedures to the extent they are not inconsistent with the specification. As is apparent from the foregoing general description and the specific embodiments, while forms of the invention have been illustrated and described, various modifications can be made without departing from the spirit and scope of the invention. Accordingly, it is not intended that the invention be limited thereby.

I claim:

1. An elastomeric composition comprising a polymer of propylene, said polymer of propylene produced by a metallocene transition metal catalyst precursor and an activator, the composition further comprising:
   a peak melting point temperature 60° C. to about 110° C. determined in a first heating cycle using differential scanning calorimetry;
   a tensile set of 40% or less determined according to ASTM D412, and greater than or equal to about 60% [r] dyads, based on the total number of dyads present in the composition.

2. The composition of claim 1, having a tensile set of 35% or less.

3. The composition of claim 1, having a tensile set of 30% or less.

4. The composition of claim 1, having a tensile set of 25% or less.

5. The composition of claim 1, having a tensile set of 20% or less.

6. The composition of claim 1, having a tensile set of 10% or less.

7. The composition of claim 1, having a number average molecular weight of about 70,000 to about 1,000,000 g/mol, determined using GPC.

8. The composition of claim 1, having a weight average molecular weight of about 140,000 to about 1,400,000 g/mol, determined using GPC.

9. The composition of claim 1, having a z average molecular weight of about 210,000 to about 2,100,000 g/mol, determined using GPC.

10. The composition of claim 1, having a molecular weight distribution (Mw/Mn) of about 1.5 to about 6.5.

11. The composition of claim 1, having a g' index of about 1.10 to about 1.50.

12. The composition of claim 1, having a heat of melting of about 30 J/g or less.

13. The composition of claim 1, having a glass transition temperature (Tg) of about –10° C. to about +15° C., determined according to ASTM E1356.

14. The composition of claim 1, having a melt flow rate of about 0.1 to about 500 g/10 min.

15. The composition of claim 1, having 60% to 79% [r]dyads, based on the total number of dyads present in the composition.

16. The composition of claim 1, having 65% to 78% [r]dyads, based on the total number of dyads present in the composition.

17. The composition of claim 1, having 30% to 65% [r]triads, based on the total number of triads present in the composition.

18. The composition of claim 1, further comprising at least 0.001 wt % of a C2-C40 alpha-olefin.

19. The composition of claim 1, further comprising at least 0.001 wt % ethylene, butene-1, pentene-1, hexene-1, heptene-1, octene-1, nonene-1, decene-1, undecene-1, dodecene-1, tridecene-1, tetradecene-1, pentadecene-1, hexadecene-1, heptadecene-1, octadecene-1, 3-methylbutene-1,3-methylepentene-1,4-methylepentene-1,3,5,5-trimethylhexene-1,5-ethyl-1-nonene, 4,4-dimethylepentene-1, or a combination thereof.

20. The composition of claim 1, further comprising less than or equal to about 10 wt % ethylene.

21. The composition of claim 1, comprising a mixture of polymers, wherein each of the polymers comprises propylene.

22. The composition of claim 1, further comprising one or more graft polymers, C2-C40 polymers, random copolymers, impact copolymers, tackifiers, crosslinking agents, antioxidants, neutralizing agents, nucleating agents, fillers, adhesion promoters, waxes, low molecular weight polymers, plasticizers, or ester polymers.

23. A process to produce the elastomeric composition of claim 1 comprising the steps of:
   A. providing propylene, and optionally one or more additional olefin monomers, a metallocene transition metal catalyst precursor, and an activator to a reactor;
   B. catalytic polymerization in the reactor of the propylene and optionally the one or more other olefin monomers at a temperature, at a pressure, and for a period of time sufficient to produce the elastomeric composition.

24. The process of claim 23, wherein the catalytic polymerization is conducted at –60° C. to about 150° C.

25. The process of claim 23, wherein the catalytic polymerization is conducted in a fluidized gas bed.

26. The process of claim 23, wherein the catalytic polymerization is conducted in slurry, optionally in the presence of a diluent.

27. The process of claim 23, wherein the catalytic polymerization is conducted in a homogeneous solution.

28. The process of claim 23, wherein the metallocene transition metal catalyst precursor is in combination with an activator as represented by the formula:

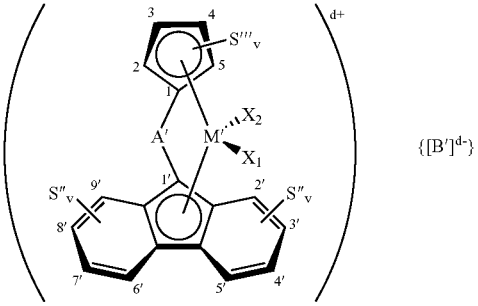

wherein A' is a bridging group comprising a divalent radical;
   M is titanium, zirconium or hafnium;
   $X_1$, and $X_2$ are independently a hydride radical, hydrocarbyl radical, substituted-hydrocarbyl radical, hydrocarbyl-substituted organometalloid radical or halocarbyl-substituted organometalloid radical which radical may optionally be covalently bonded to all or any of M, S" or S'", and provided that $X_1$ and $X_2$ are not a substituted or unsubstituted cyclopentadienyl ring;
   S" and S'" are independently a C1-C40 radical group which is a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radical;
   subscript v denotes the number of carbon to which each S" or S'" is attached;
   d is an integer representing the charge of B'; and
   B' is the activator.

29. The process of claim 28, wherein the activator is a non-ionizing activator or an ionizing activator.

30. The process of claim 28, wherein the activator comprises aluminum.

31. The process of claim 28, wherein the activator comprises a tri-substituted boron atom or a tri substituted phosphorus atom.

32. The process of claim 28, wherein the activator is at least one of:
trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium)tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl-(2,4,6-trimethylanilinium)tetrakis(pentafluorophenyl)borate,
trimethylammonium tetrakis-(2,3,4,6-tetrafluorophenylborate,
triethylammonium tetrakis-(2,3,4,6-tetrafluorophenyl)borate,
tripropylammonium tetrakis-(2,3,4,6-tetrafluorophenyl)borate,
tri(n-butyl)ammonium tetrakis-(2,3,4,6-tetrafluoro-phenyl)borate,
dimethyl(t-butyl)ammonium tetrakis-(2,3,4,6-tetrafluorophenyl)borate,
N,N-dimethylanilinium tetrakis-(2,3,4,6-tetrafluorophenyl)borate,
N,N-diethylanilinium tetrakis-(2,3,4,6-tetrafluoro-phenyl)borate,
N,N-dimethyl-(2,4,6-trimethylanilinium)tetrakis-(2,3,4,6-tetrafluorophenyl)borate,
di-(i-propyl)ammonium tetrakis(pentafluorophenyl)borate,
dicyclohexylammonium tetrakis(pentafluorophenyl)borate,
triphenylphosphonium tetrakis(pentafluorophenyl)borate,
tri(o-tolyl)phosphonium tetrakis(pentafluorophenyl)borate,
or tri(2,6-dimethylphenyl)phosphonium tetrakis(pentafluorophenyl)borate.

33. The process of claim 28, wherein the activator is bound to a support comprising silica.

34. The process of claim 28, wherein the activator is N,N-dimethylanilinium tetra(perfluorophenyl)borate and/or triphenylcarbenium tetra(perfluorophenyl)borate.

35. The process of claim 28, wherein the metallocene transition metal catalyst precursor is at least one of:
isopropylidene(cyclopentadienyl)(fluorenyl)zirconium dichloride,
isopropylidene(cyclopentadienyl)(fluorenyl)zirconium dimethyl,
methylene(cyclopentadienyl)(fluorenyl)zirconium dichloride,
methylene(cyclopentadienyl)(fluorenyl)zirconium dimethyl,
diphenylmethylene(cyclopentadienyl)(fluorenyl)zirconium dichloride,
diphenylmethylene(cyclopentadienyl)(fluorenyl)zirconium dimethyl,
di(p-triethylsilylphenyl)methylene(cyclopentadienyl)(fluorenyl)zirconium dichloride,
di(p-triethylsilylphenyl)methylene(cyclopentadienyl)(fluorenyl)zirconium dimethyl,
di(p-trimethylsilylphenyl)methylene(cyclopentadienyl)(fluorenyl)zirconium dichloride,
di(p-trimethylsilylphenyl)methylene(cyclopentadienyl)(fluorenyl)zirconium dimethyl,
diphenylsilyl(cyclopentadienyl)(fluorenyl)zirconium dichloride,
diphenylsilyl(cyclopentadienyl)(fluorenyl)zirconium dimethyl,
dimethylsilyl(cyclopentadienyl)(fluorenyl)zirconium dichloride,
dimethylsilyl(cyclopentadienyl)(fluorenyl)zirconium dimethyl,
methylphenylsilyl(cyclopentadienyl)(fluorenyl)zirconium dichloride,
methylphenylsilyl(cyclopentadienyl)(fluorenyl)zirconium dimethyl,
isopropylidene(cyclopentadienyl)(fluorenyl)hafnium dichloride,
isopropylidene(cyclopentadienyl)(fluorenyl)hafnium dimethyl,
methylene(cyclopentadienyl)(fluorenyl)hafnium dichloride,
methylene(cyclopentadienyl)(fluorenyl)hafnium dimethyl,
diphenylmethylene(cyclopentadienyl)(fluorenyl)hafnium dichloride,
diphenylmethylene(cyclopentadienyl)(fluorenyl)hafnium dimethyl,
di(p-triethylsilylphenyl)methylene(cyclopentadienyl)(fluorenyl)hafnium dichloride,
di(p-triethylsilylphenyl)methylene(cyclopentadienyl)(fluorenyl)hafnium dimethyl,
di(p-trimethylsilylphenyl)methylene(cyclopentadienyl)(fluorenyl)hafnium dichloride,
di(p-trimethylsilylphenyl)methylene(cyclopentadienyl)(fluorenyl)hafnium dimethyl,
diphenylsilyl(cyclopentadienyl)(fluorenyl)hafnium dichloride,
diphenylsilyl(cyclopentadienyl)(fluorenyl)hafnium dimethyl,
dimethylsilyl(cyclopentadienyl)(fluorenyl)hafnium dichloride,
dimethylsilyl(cyclopentadienyl)(fluorenyl)hafnium dimethyl,
methylphenylsilyl(cyclopentadienyl)(fluorenyl)hafnium dichloride,
methylphenylsilyl(cyclopentadienyl)(fluorenyl)hafnium dimethyl,
isopropylidene(cyclopentadienyl)(3,8-di-t-butylfluorenyl)zirconium dichloride,
isopropylidene(cyclopentadienyl)(3,8-di-t-butylfluorenyl)zirconium dimethyl,
methylene(cyclopentadienyl)(3,8-di-t-butylfluorenyl)zirconium dichloride,
methylene(cyclopentadienyl)(3,8-di-t-butylfluorenyl)zirconium dimethyl, diphenylmethylene(cyclopentadienyl)(3,8-di-t-butylfluorenyl)zirconium dichloride,
diphenylmethylene(cyclopentadienyl)(3,8-di-t-butylfluorenyl)zirconium dimethyl,
di(p-triethylsilylphenyl)methylene(cyclopentadienyl)(3,8-di-t-butylfluorenyl)zirconium dichloride,
di(p-triethylsilylphenyl)methylene(cyclopentadienyl)(3,8-di-t-butylfluorenyl)zirconium dimethyl,
di(p-trimethylsilylphenyl)methylene(cyclopentadienyl)(3,8-di-t-butylfluorenyl)zirconium dichloride,
di(p-trimethylsilylphenyl)methylene(cyclopentadienyl)(3,8-di-t-butylfluorenyl)zirconium dimethyl,
diphenylsilyl(cyclopentadienyl)(3,8-di-t-butylfluorenyl)zirconium dichloride,
diphenylsilyl(cyclopentadienyl)(3,8-di-t-butylfluorenyl)zirconium dimethyl,
dimethylsilyl(cyclopentadienyl)(3,8-di-t-butylfluorenyl)zirconium dichloride,
dimethylsilyl(cyclopentadienyl)(3,8-di-t-butylfluorenyl)zirconium dimethyl,
methylphenylsilyl(cyclopentadienyl)(3,8-di-t-butylfluorenyl)zirconium dichloride,
methylphenylsilyl(cyclopentadienyl)(3,8-di-t-butylfluorenyl)zirconium dimethyl,
isopropylidene(cyclopentadienyl)(3,8-di-t-butylfluorenyl)hafnium dichloride,
isopropylidene(cyclopentadienyl)(3,8-di-t-butylfluorenyl)hafnium dimethyl,
methylene(cyclopentadienyl)(3,8-di-t-butylfluorenyl)hafnium dichloride,
methylene(cyclopentadienyl)(3,8-di-t-butylfluorenyl)hafnium dimethyl,
diphenylmethylene(cyclopentadienyl)(3,8-di-t-butylfluorenyl)hafnium dichloride,
diphenylmethylene(cyclopentadienyl)(3,8-di-t-butylfluorenyl)hafnium dimethyl,
di(p-triethylsilylphenyl)methylene(cyclopentadienyl)(3,8-di-t-butylfluorenyl)hafnium dichloride,
di(p-triethylsilylphenyl)methylene(cyclopentadienyl)(3,8-di-t-butylfluorenyl)hafnium dimethyl,
di(p-trimethylsilylphenyl)methylene(cyclopentadienyl)(3,8-di-t-butylfluorenyl)hafnium dichloride,
di(p-trimethylsilylphenyl)methylene(cyclopentadienyl)(3,8-di-t-butylfluorenyl)hafnium dimethyl,
diphenylsilyl(cyclopentadienyl)(3,8-di-t-butylfluorenyl)hafnium dichloride,
diphenylsilyl(cyclopentadienyl)(3,8-di-t-butylfluorenyl)hafnium dimethyl,
dimethylsilyl(cyclopentadienyl)(3,8-di-t-butylfluorenyl)hafnium dichloride,
dimethylsilyl(cyclopentadienyl)(3,8-di-t-butylfluorenyl)hafnium dimethyl,
methylphenylsilyl(cyclopentadienyl)(3,8-di-t-butylfluorenyl)hafnium dichloride,
methylphenylsilyl(cyclopentadienyl)(3,8-di-t-butylfluorenyl)hafnium dimethyl,
isopropylidene(cyclopentadienyl)(3,3,6,6,9,9,12,12-octamethyl-4,4,5,5,8,8,9,9-octahydrodibenzyl[b,h]fluorenyl)zirconium dichloride,
isopropylidene(cyclopentadienyl)(3,3,6,6,9,9,12,12-octamethyl-4,4,5,5,8,8,9,9-octahydrodibenzyl[b,h]fluorenyl)zirconium dimethyl,
methylene(cyclopentadienyl)(3,3,6,6,9,9,12,12-octamethyl-4,4,5,5,8,8,9,9octahydrodibenzyl[b,h]fluorenyl)zirconium dichloride,
methylene(cyclopentadienyl)(3,3,6,6,9,9,12,12-octamethyl-4,4,5,5,8,8,9,9-octahydrodibenzyl[b,h]fluorenyl)zirconium dimethyl,
diphenylmethylene(cyclopentadienyl)(3,3,6,6,9,9,12,12-octamethyl-4,4,5,5,8,8,9,9-octahydrodibenzyl[b,h]fluorenyl)zirconium dichloride,
diphenylmethylene(cyclopentadienyl)(3,3,6,6,9,9,12,12-octamethyl-4,4,5,5,8,8,9,9-octahydrodibenzyl[b,h]fluorenyl)zirconium dimethyl,
di(p-triethylsilylphenyl)methylene(cyclopentadienyl)(3,3,6,6,9,9,12,12-octamethyl-4,4,5,5,8,8,9,9-octahydrodibenzyl[b,h]fluorenyl)zirconium dichloride,
di(p-triethylsilylphenyl)methylene(cyclopentadienyl)(3,3,6,6,9,9,12,12-octamethyl-4,4,5,5,8,8,9,9-octahydrodibenzyl[b,h]fluorenyl)zirconium dimethyl,
di(p-trimethylsilylphenyl)methylene(cyclopentadienyl)(3,3,6,6,9,9,12,12-octamethyl-4,4,5,5,8,8,9,9-octahydrodibenzyl[b,h]fluorenyl)zirconium dichloride,
di(p-trimethylsilylphenyl)methylene(cyclopentadienyl)(3,3,6,6,9,9,12,12-octamethyl-4,4,5,5,8,8,9,9-octahydrodibenzyl[b,h]fluorenyl)zirconium dimethyl,
diphenylsilyl(cyclopentadienyl)(3,3,6,6,9,9,12,12-octamethyl-4,4,5,5,8,8,9,9-octahydrodibenzyl[b,h]fluorenyl)zirconium dichloride,
diphenylsilyl(cyclopentadienyl)(3,3,6,6,9,9,12,12-octamethyl-4,4,5,5,8,8,9,9-octahydrodibenzyl[b,h]fluorenyl)zirconium dimethyl,
dimethylsilyl(cyclopentadienyl)(3,3,6,6,9,9,12,12-octamethyl-4,4,5,5,8,8,9,9-octahydrodibenzyl[b,h]fluorenyl)zirconium dichloride,
dimethylsilyl(cyclopentadienyl)(3,3,6,6,9,9,12,12-octamethyl-4,4,5,5,8,8,9,9-octahydrodibenzyl[b,h]fluorenyl)zirconium dimethyl,
methylphenylsilyl(cyclopentadienyl)(3,3,6,6,9,9,12,12-octamethyl-4,4,5,5,8,8,9,9-octahydrodibenzyl[b,h]fluorenyl)zirconium dichloride,
methylphenylsilyl(cyclopentadienyl)(3,3,6,6,9,9,12,12-octamethyl-4,4,5,5,8,8,9,9-octahydrodibenzyl[b,h]fluorenyl)zirconium dimethyl,
isopropylidene(cyclopentadienyl)(3,3,6,6,9,9,12,12-octamethyl-4,4,5,5,8,8,9,9-octahydrodibenzyl[b,h]fluorenyl)hafnium dichloride,
isopropylidene(cyclopentadienyl)(3,3,6,6,9,9,12,12-octamethyl-4,4,5,5,8,8,9,9-octahydrodibenzyl[b,h]fluorenyl)hafnium dimethyl,
ethylene(cyclopentadienyl)(3,3,6,6,9,9,12,12-octamethyl-4,4,5,5,8,8,9,9-octahydrodibenzyl[b,h]fluorenyl)hafnium dichloride,
methylene(cyclopentadienyl)(3,3,6,6,9,9,12,12-octamethyl-4,4,5,5,8,8,9,9-octahydrodibenzyl[b,h]fluorenyl)hafnium dimethyl,
diphenylmethylene(cyclopentadienyl)(3,3,6,6,9,9,12,12-octamethyl-4,4,5,5,8,8,9,9-octahydrodibenzyl[b,h]fluorenyl)hafnium dichloride,
diphenylmethylene(cyclopentadienyl)(3,3,6,6,9,9,12,12-octamethyl-4,4,5,5,8,8,9,9-octahydrodibenzyl[b,h]fluorenyl)hafnium dimethyl,
di(p-triethylsilylphenyl)methylene(cyclopentadienyl)(3,3,6,6,9,9,12,12-octamethyl-4,4,5,5,8,8,9,9-octahydrodibenzyl[b,h]fluorenyl)hafnium dichloride,
di(p-triethylsilylphenyl)methylene(cyclopentadienyl)(3,3,6,6,9,9,12,12-octamethyl-4,4,5,5,8,8,9,9-octahydrodibenzyl[b,h]fluorenyl)hafnium dimethyl,
di(p-trimethylsilylphenyl)methylene(cyclopentadienyl)(3,3,6,6,9,9,12,12-octamethyl-4,4,5,5,8,8,9,9-octahydrodibenzyl[b,h]fluorenyl)hafnium dichloride, di(p-trimethylsilylphenyl)methylene(cyclopentadienyl)(3,3,6,6,9,9,12,12-octamethyl-4,4,5,5,8,8,9,9-octahydrodibenzyl[b,h]fluorenyl)hafnium dimethyl,
diphenylsilyl(cyclopentadienyl)(3,3,6,6,9,9,12,12-octamethyl-4,4,5,5,8,8,9,9-octahydrodibenzyl[b,h]fluorenyl)hafnium dichloride,
diphenylsilyl(cyclopentadienyl)(3,3,6,6,9,9,12,12-octamethyl-4,4,5,5,8,8,9,9-octahydrodibenzyl[b,h]fluorenyl)hafnium dimethyl,
dimethylsilyl(cyclopentadienyl)(3,3,6,6,9,9,12,12-octamethyl-4,4,5,5,8,8,9,9-octahydrodibenzyl[b,h]fluorenyl)hafnium dichloride,
dimethylsilyl(cyclopentadienyl)(3,3,6,6,9,9,12,12-octamethyl-4,4,5,5,8,8,9,9-octahydrodibenzyl[b,h]fluorenyl)hafnium dimethyl,
methylphenylsilyl(cyclopentadienyl)(3,3,6,6,9,9,12,12-octamethyl-4,4,5,5,8,8,9,9-octahydrodibenzyl[b,h]fluorenyl)hafnium dichloride,
methylphenylsilyl(cyclopentadienyl)(3,3,6,6,9,9,12,12-octamethyl-4,4,5,5,8,8,9,9-octahydrodibenzyl[b,h]fluorenyl)hafnium dimethyl,
di(p-triethylsilylphenyl)methylene(cyclopentadienyl)(3,8-di-t-butylfluorenyl)zirconium dichloride,
di(p-triethylsilylphenyl)methylene(cyclopentadienyl)(3,8-di-t-butylfluorenyl)hafnium dichloride,
di(p-triethylsilylphenyl)methylene(cyclopentadienyl)(3,8-di-t-butylfluorenyl)zirconium dimethyl,
di(p-triethylsilylphenyl)methylene(cyclopentadienyl)(3,8-di-t-butylfluorenyl)hafnium dimethyl,
di(p-triethylsilylphenyl)methylene(cyclopentadienyl)(3,3,6,6,9,9,12,12-octamethyl-4,4,5,5,8,8,9,9-octahydrodibenzyl[b,h]fluorenyl)zirconium dichloride,
di(p-triethylsilylphenyl)methylene(cyclopentadienyl)(3,3,6,6,9,9,12,12-octamethyl-4,4,5,5,8,8,9,9-octahydrodibenzyl[b,h]fluorenyl)hafnium dichloride,
di(p-triethylsilylphenyl)methylene(cyclopentadienyl)(3,3,6,6,9,9,12,12-octamethyl-4,4,5,5,8,8,9,9-octahydrodibenzyl[b,h]fluorenyl)zirconium dimethyl, or
di(p-triethylsilylphenyl)methylene(cyclopentadienyl)(3,3,6,6,9,9,12,12-octamethyl-4,4,5,5,8,8,9,9-octahydrodibenzyl[b,h]fluorenyl)hafnium dimethyl.

36. The process of claim 28, wherein the metallocene transition metal catalyst precursor is represented by the formula:

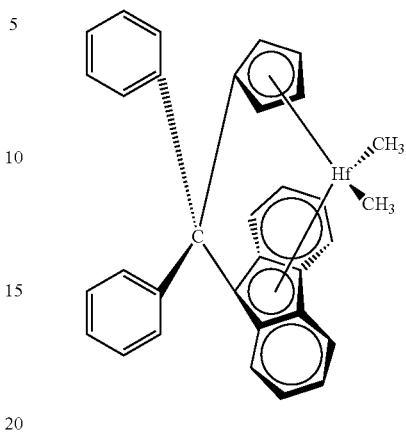

and the activator is dimethylaniliniumtetrakis(pentafluorophenyl)borate.

37. The process of claim 26 wherein propylene gas is introduced into a slurry as a polymerization diluent, in which the catalyst suspension is suspended and the propylene pressures is between 10 and 1000 psig (69-6895 kPa) and the polymerization diluent temperature is between −10 and 160° C.

38. The process of claim 23 wherein the catalytic polymerization is conducted in a slurry polymerization in the presence of a diluent and the propylene pressure is between 10 and 1000 psig and the polymerization diluent temperature is between −10 and 160° C.

39. The process of claim 38 wherein the process is carried out in a stirred tank reactor.

40. The process of claim 38 wherein the process is carried out in a tubular reactor.

41. The process of claim 38 wherein the process is carried out in more than one stirred tank or tubular reactor operated in series or in parallel.

* * * * *

UNITED STATES PATENT AND TRADEMARK OFFICE
CERTIFICATE OF CORRECTION

PATENT NO. : 7,662,895 B2  
APPLICATION NO. : 11/285135  
DATED : February 16, 2010  
INVENTOR(S) : Patrick Brant It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1121 days.

Signed and Sealed this

Thirtieth Day of November, 2010

David J. Kappos  
*Director of the United States Patent and Trademark Office*